Nov. 19, 1963  D. RUBENSTEIN  3,111,569
PACKAGED LAMINATED CONSTRUCTIONS
Filed June 20, 1958  7 Sheets-Sheet 1
Fig. 1
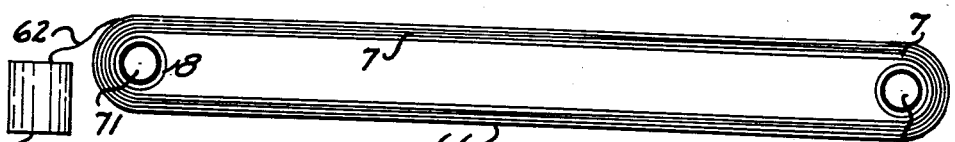
Fig. 2
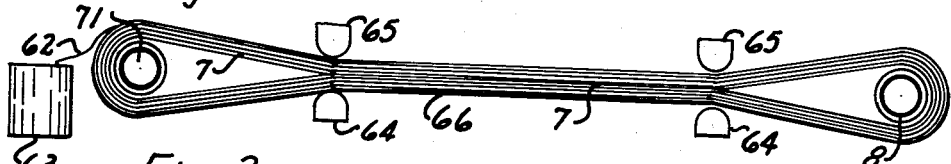
Fig. 3
Fig. 4
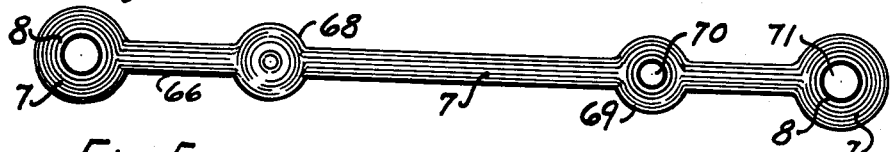
Fig. 5
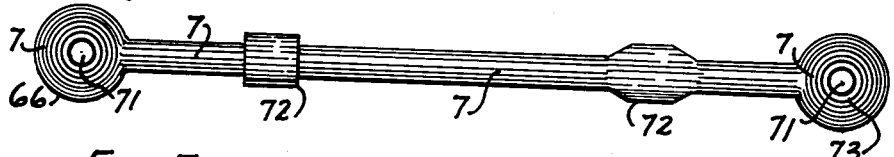
Fig. 7
Fig. 6
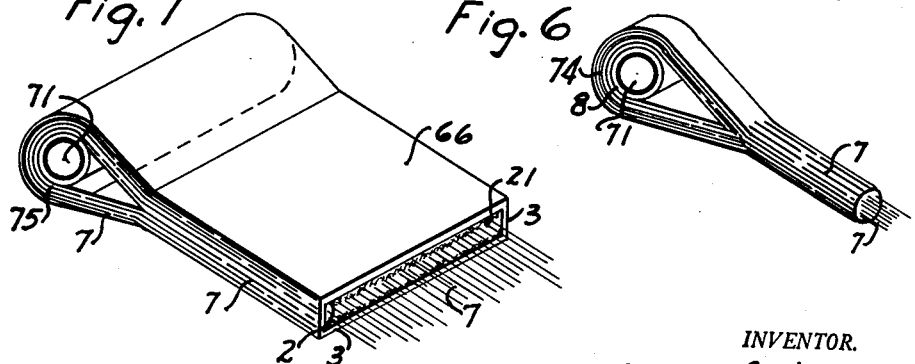
INVENTOR.
BY David Rubenstein Nov. 19, 1963 D. RUBENSTEIN 3,111,569
PACKAGED LAMINATED CONSTRUCTIONS
Filed June 20, 1958 7 Sheets-Sheet 2

INVENTOR.
BY David Rubenstein

INVENTOR.
BY David Rubenstein

Nov. 19, 1963 D. RUBENSTEIN 3,111,569

PACKAGED LAMINATED CONSTRUCTIONS

Filed June 20, 1958 7 Sheets-Sheet 4

INVENTOR.
BY David Rubenstein

Nov. 19, 1963

D. RUBENSTEIN 3,111,569

PACKAGED LAMINATED CONSTRUCTIONS

Filed June 20, 1958

INVENTOR.

BY David Rubenstein

Nov. 19, 1963 D. RUBENSTEIN 3,111,569
PACKAGED LAMINATED CONSTRUCTIONS
Filed June 20, 1958 7 Sheets-Sheet 6

INVENTOR.
BY David Rubenstein

Nov. 19, 1963 — D. RUBENSTEIN — 3,111,569
PACKAGED LAMINATED CONSTRUCTIONS
Filed June 20, 1958 — 7 Sheets-Sheet 7

INVENTOR.
BY David Rubenstein

United States Patent Office 3,111,569
Patented Nov. 19, 1963

3,111,569
PACKAGED LAMINATED CONSTRUCTIONS
David Rubenstein, 2750 2nd Ave., San Diego 3, Calif.
Filed June 20, 1958, Ser. No. 743,464
20 Claims. (Cl. 219—19)

This invention comprises novel and useful constructions and products in packaged plain or decorative-structural laminations for making reinforced plastic integrated structural embodiments and structures for use in or on, or as structural elements of composite constructions, buildings, bridges, pipe lines, military installations and structures, and components. These packaged ready-for-use constructions provide reinforcement to, of, for and in porous structural materials. They can be used wherever porous materials as aggregate components are composed into structural elements, or industrial components, or stone or stone-like structures, e.g., bound light-weight porous aggregates, fire expanded shales or clays, brick, tile, concrete, expanded plastics, etc., in the form of blocks, slabs, tubes, beams, columns, framing members or components for buildings or structures, or pipe and to methods and apparatus for making and using the same.

This application is a continuation-in-part of my copending application Serial No. 340,642, filed January 16, 1953, now Patent No. 2,951,006, and my copending application Serial No. 345,084, filed March 27, 1953, which applications are a division and a continuation-in-part, respectively, of my application Serial No. 267,166, filed December 17, 1951, and now Patent No. 2,671,158, and this application is a continuation-in-part to my copending application Serial No. 229,852, filed June 4, 1951, and now Patent No. 2,850,890.

The present invention provides endless reinforcing having anchorage means enabling the use of plastic resin embedded fibrous reinforcement without crushing the fibrous components thereof. I have found that chemical engineered products of this inclusive invention when packaged in ready-for-use construction elements and used in building and engineering construction and products offer very substantial savings in costs and precise, uniform and structurally reliable constructions and products. The assembly of such elements is an on-site operation whether as blocks or larger pre-fabricated elements.

It is to be pointed out here that while the present invention is described in terms of the building industry and engineering structures no limitation is intended or made to the use of the invention to other constructions, e.g., air-frames, industrial manufacturing components, missile components, bodies or structures, ships, tanks, piping, or in fact any structure wherein the advantageous use of the present invention can be used. The use of the packaged-ready-for-use plastic resin fibrous reinforcements and structural components is intended for wide and substantial use.

The manufacture of the embodiments of this invention are advantageously made under close quality control and chemical engineering controls. In such a manufacture I provide standardized, low-cost mass-produced embodiments of the invention in packaged-ready-for-use goods, forms and constructions.

It is an object of the invention to provide standardized, packaged ready-for-use rapidly placeable and immediately useful reinforcing and decorative-structural embodiments of this invention for use into and upon porous structural materials or bodies, precast concrete, clay products, porous natural rock materials, coral rock, limestone, ceramics, fire expanded shales, fire expanded clays, pumice, vermiculite, mica, volcanic materials, adobe, asbestos, Portland Cement concrete, natural cement concrete, cements, granite, marble, quarried stones, crushed and graded aggregates, naturally sized and/or screened aggregates, or the like, and used alone or in combination with one another or with concrete bodies or clay products, or alone or in combination with expanded plastic resins constructions.

For the purposes of definition in the present invention the word "concrete" is used in its commonly accepted use and it is also used to include and define the other porous structural materials of the present invention. Bound together materials in various forms, e.g., the resin-bound aggregate materials of fire expanded clays or fire expanded shales generally referred to as "resin-crete" or "elastomer-crete" and claimed and described in my copending applications of record are considered as described by the "word" "concrete," i.e., wherein the structural engineering uses and concepts of the present invention are applied to porous structural materials.

An object of this invention is to provide compact, light weight layers of high strength reinforced porous structural material reinforcement, e.g., concrete reinforcement, ready for use in single or multiple layers and all ready to bond and congeal into unitary structural reinforcement securely and permanently bonded and attached to said porous structural bodies, e.g., concrete.

An object of this invention is to make stranded cable-form reinforcements at place of use, coming to said place of use in packaged assembly of necessary component materials or otherwise as a package construction unit.

An object of this invention is to make stranded belt-form reinforcements having suitable end anchorages and portions suitable for anchorage, coming to the place of use in packaged assembly of necessary components and materials, said reinforcements being used as individual members or composite members and having unidirectional or multidirectional reinforcement being capable of being used alone or in combination.

An object of this invention is to make cable-form and belt-like reinforcements having evenly stressed fibers adapted for substantial loads such as tensile loads and with one and the same materials in part or in whole, provide architectural, industrial, functional, specific purpose or decorative finishes and decorative surfaces for specific end uses or esthetically pleasing to the eye.

An object of this invention is to provide means for making cable-form and belt-form reinforcements that insure within practical production limits the mass production of non-metallic reinforcement whose internal stresses within the constituent fibers of the reinforcement, when prestressed in use are of maximum obtainable uniformity within the limits of mass production techniques.

Another object is to provide continuous strand reinforcing made into endless cable-like and belt-form forms.

Another object is to make envelopes and packaging means which can be quickly removed or peeled off by pulling draw cords, pull strings, wires or other means which have been incorporated in the packaging means.

An object of this invention is to make and provide reinforcing having in combination a decorative-structural layer of a belt-form laminated construction and one or more cable-form reinforcements all preformed and packaged in a suitable envelope ready-for-use.

An object of the invention is to provide means and make preformed packaged ready-for-use standardized constructions suitable for assembly into prestressed constructions, which preformed packaged forms and constructions may be partially prestressed before final end use, and upon final placement for end use and upon the polymerization of the resinous materials of the construction be completely prestressed for final end use by the bonding and shrinkage stresses occurring in the polymerization reaction of the materials of the construction.

An object of this invention is to provide means and make packaged catalyst preforms in globule, chain globule, spaghetti-type globule, tape-type globule, wire-type globule assemblies and/or sandwich-type globule assemblies, or the like, in standardized formulations for even distribution or specific distribution into the plastic resins in which it is desired to incorporate catalyst formulations.

Another object of this invention is to provide nonmetallic reinforcement in packaged form with its resins, filler, binders viscosity control agents and catalysts ready for polymerization in which the envelope is waterproof, of soft yet strong material capable of being deformed but not broken when embedded in poured concrete, the strands of the reinforcement being protected against abrasion by the envelope and resins, means for catalyzing the resins contained within the envelope or adjacent thereto and provided with it and the reinforcement when the materials of the type herein described are polymerized forming a construction of substantial strength whose bond with the concrete is achieved by the physical irregularities of surface and physical bond thereof as well as by the bond achieved by the penetration and permeation of the catalyzed resins in or of the envelope, together all forming a unitary construction of substantial strength.

A further object is to make packaged preforms from which to make vessels, tanks and pipe by making the embodiment of tubular and circular or otherwise shaped reinforcement assemblies of discrete materials, plastic resins and fibrous reinforcements coming to the site of use in packaged form and by means provided of liquid pressure, atmospheric, air or vacuum pressure, gas pressure or mechanical pressure or any of these in combination or alone, inflate these assembled materials into desired shapes while in the process of being formed and while undergoing thermosetting or setting by any means and curing of the plastic resin binders contained within the packages and the fixing of fiber glass or other fibrous reinforcements and plastic resins into rigid laminated bodies bonded to and supported against and by precast concrete blocks, slabs and shapes.

An object in pursuant of the above mentioned objects is to make packaged ready-for-use components from which to make vessels, tanks and pipes or conduits by means herein disclosed that are self supporting, strong, lightweight and able to float on water or fluids as pontoons or floating objects or devices, and to make structural load bearing components out of said cellular vessels and cellular materials thereof.

An object of the invention is to provide packaged components ready-for-use and means for their use for lining vitreous clay or concrete or other porous type material pipe lines and similar porous concrete bodies, or the like, with plastic resin fiber reinforced laminations by use of liquid, air, mechanical or gas pressure or the like to connect plastic resin bonds to the said porous materials.

An object of the invention is to provide reinforcing that is packaged in reels or spools or the like in long lengths and assorted widths that can be cut to length or desired shapes, or if long lengths are desired, used as one long length component.

The laminations can be packaged assemblies which make composite structures of great strength and durability. These bodies can be bonded one to the other to form unitary structures and constructions giving high strength structures with normal static loading and yieldingly resistant with flexible and rubber-like absorption of high energy impacts imposed through or externally onto the structure. These constructions will be especially useful in that they will tend to maintain this quality of yielding resistance while maintaining the integrity of the structure, i.e., from pressures and impact forces momentary and moving in character.

The packaged enveloped materials can be provided for embedment into concrete poured in-situ and after the concrete has set and cured the envelope opened by means, one said means being the use of solvents penetrated into the concrete which convert or which enter through the walls of said envelope to activate polymerization of plastic resin compositions contained in the envelope. These solvents may carry catalysts or components of a resinous composition necessary to the completion of the chemical reaction which forms the cured and converted final finished plastic resin reinforcement combined with the concrete or other porous materials or bodies. The catalyst may be carried and distributed in enveloped constructions in the body of the concrete or the like, or it may be carried on a surface of the concrete and when brought into contact with plastic resin components of a packaged construction activate polymerization of said resins. The ability to make precise formulated compositions under quality control conditions makes this invention available to construction and manufacturing personnel who with little or no previous training can make every time they use a packaged enveloped construction a successful unitary combination of the packaged enveloped materials and the concrete, masonry type body or other porous structural material.

The plastic resin compositions used provide reinforcement to the porous structural preformed bodies quickly and economically and in balanced designed engineering constructions with various fibrous materials or used alone, provide high strength structures and skin-stressed reinforced structures of exceptional novel properties. Many different plastic resin compositions are needed and used. Many different stranded and fibrous materials are needed and used.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and I reserve the right to claim in future patents that portion of patentable disclosures which are inadvertently not claimed herein.

In the drawings:

FIGURE 1 is a view showing the preparation of strands of fibers in endless assembly preparatory to packaging;

FIGURE 2 is a view showing strands in endless assembly and being formed through suitable forming devices into single cable form member having at each end eye-like openings;

FIGURE 3 is a view showing strands of fibers, plastic resins, catalysts, colors, and fillers in endless assembly in an envelope ready-for-use as a preformed cable-form reinforcing ready for final end use;

FIGURE 4 shows a packaged preformed reinforcing construction as in FIGURE 3 with the addition of additional anchorage means incorporated therewith;

FIGURE 5 shows packaged preformed reinforcing construction of the type of FIGURE 4, said anchorages thereof being of different types and manufacture;

FIGURE 6 shows an isometric view of one end of a packaged preformed cable-form reinforcement construction;

FIGURE 7 shows an isometric view of one end of a packaged preformed belt-form reinforcement construction;

Figure 24:
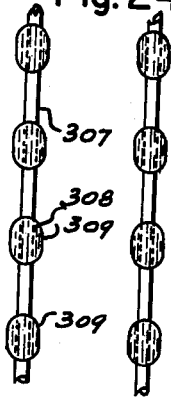
FIGURE 24 is a view of still another example of a packaged catalyst preformed in wire type globule assemblies, said wires also being means for the generation of heat which first melts the globule envelope enclosure and then aids in the polymerization of the surrounding resins by supplying heating means as resistance wires in a suitable electrical circuit.
Figure 27:
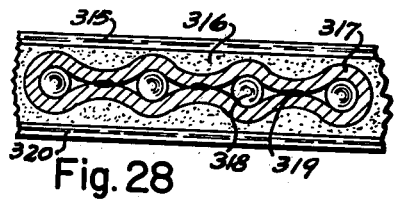
Figure 28:
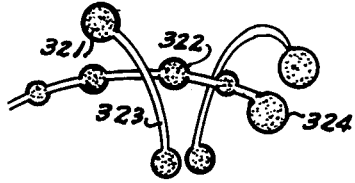
Figure 26:
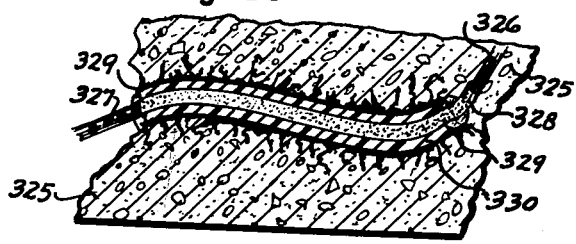
Figure 29:
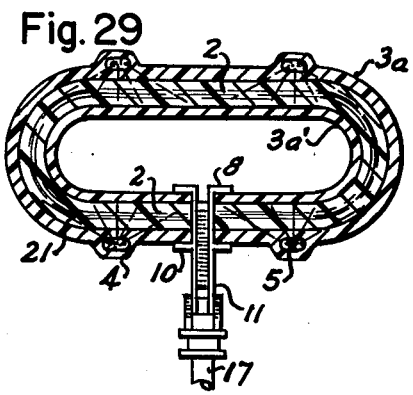
Figure 30:
Figure 35:
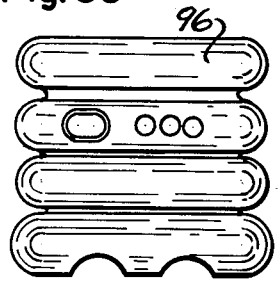
Figure 32:
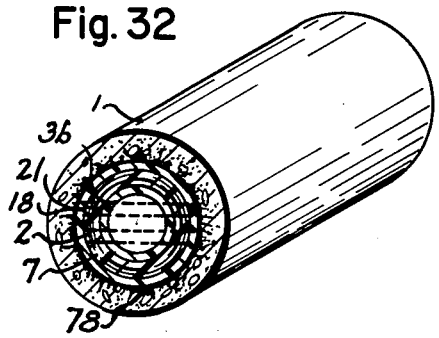
Figure 31:
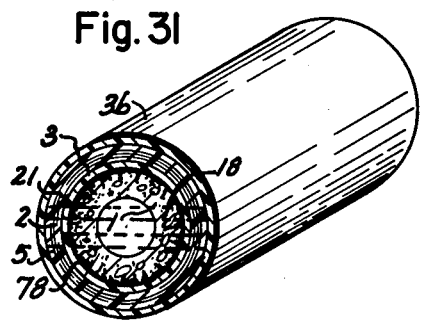
Figure 34:
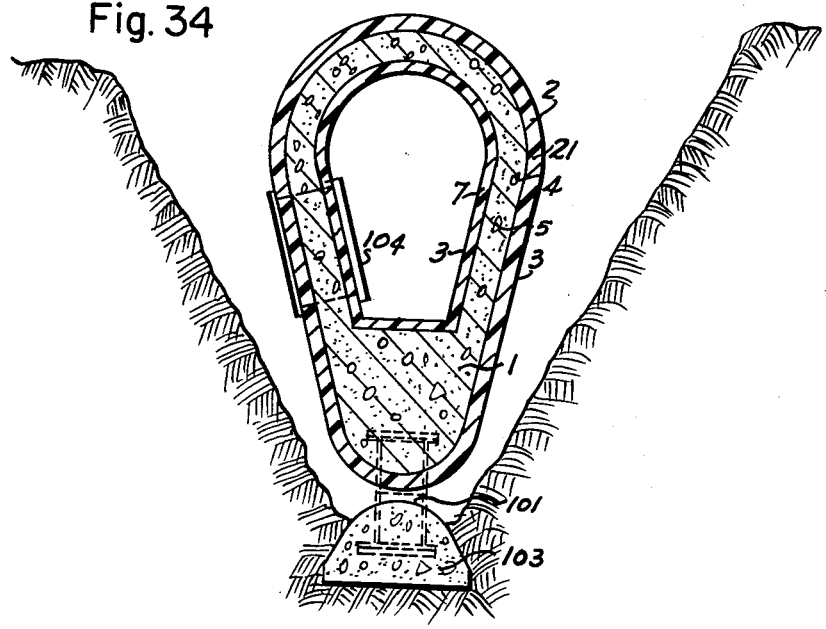
Figure 33:
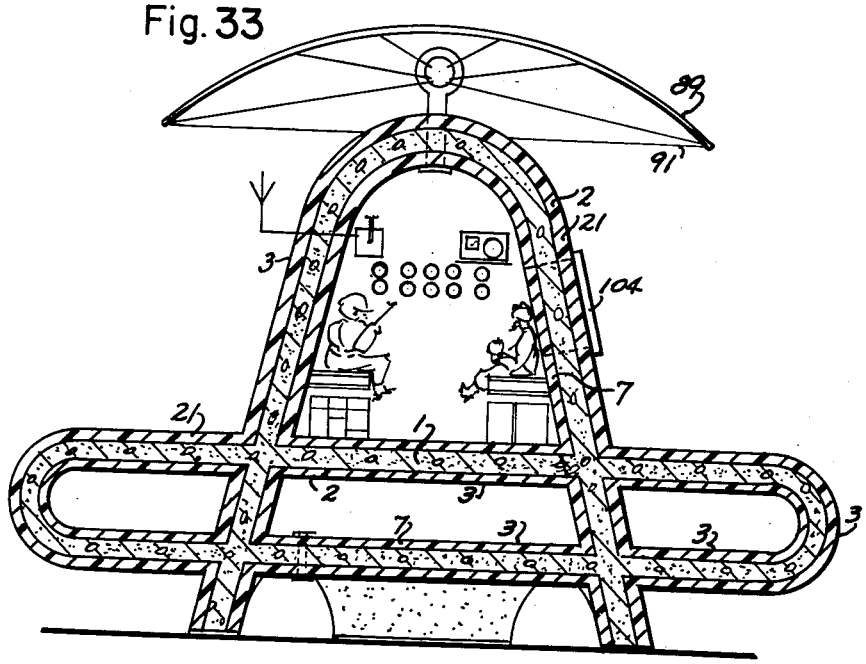

FIGURE 26 is a view of another use of a packaged preformed envelope enclosing cable-form constructions of fibrous materials surrounded by plastic resin composition and in which a packaged preformed catalyst of the type of FIGURE 24 is disposed wherein the deformation of the envelope and its contents prior to polymerization of the plastic resins therein and the fixing of the fibrous materials used provides additional physical bond by deformation after the cure and polymerization of the resins adjacent the concrete;

FIGURE 27 is a cross sectional view of a packaged preformed ready-for-use on site construction;

FIGURE 28 is a view of spaghetti-like catalyst preforms placed at random in which the catalyst is enclosed in an envelope construction;

FIGURE 29 is a cross section of a tubular structure provided in a packaged preformed ready-for-use condition showing another embodiment of the invention;

FIGURE 30 is a tank made for various uses of chemical resistance to various materials corrosive in nature provided by packaged preformed and laboratory controlled useful plastic resin in combination with discrete fibers;

FIGURE 31 is an isometric view of a circular concrete body lined and laminated with a construction provided as a packaged preformed tubular reinforcement;

FIGURE 32 is an isometric view of a circular concrete body covered on its outer surface with a packaged prepared ready-for-use plastic resin laminate;

FIGURE 33 is a cross sectional view of a packaged prepared ready-for-use inflatable reinforcement body for use by air borne personnel as parachute type droppable construction;

FIGURE 34 is a ground version of the construction of FIGURE 33;

FIGURE 35 is a packaged form of the constructions of FIGURES 33 and 34 in ready-for-use state;

Referring to the drawings herein, the fibrous reinforcements used to reinforce the plastic resin composition are designated 2 and 7. The mats and fabrics being designated 2 and the unidirectional fibers and strands being designated 7. The fibrous reinforcement is covered with a plastic resin or resins 21.

Any desired number of strands 7, and/or mat or fabric 2, depending upon the required cross sectional area of unidirectional and multi-directional reinforcement required are laid together in non-abrasive relationship and impregnated and coated with plastic resin composition 21. Polymerization catalyst as provided by various means hereinafter disclosed acts by contact and diffusion through the resin composition which may contain a filler or combination of fillers. The catalyst may act at room temperature or at elevated temperature or by other means or conditions. The fibrous reinforcement 2 may be multi-directional strands, e.g., woven roving, or fiber mats or multi-directional fabrics in combination or either of them and the tensile reinforcement 7 may be unidirectional fibers and/or strands, unidirectional mats or fabrics as required to provide the necessary cross-sectional area of reinforcement to carry the required designed loads. The strands are advantageously oriented in the direction of the greatest required tensile strength of the laminated construction. Compressive, shear and torsion strengths are designed for by orientation and placement of the fibers along the direction of applied loads so that the strength of the plastic resin composition is thus supported and augmented by the strengths of such fabrics, mats and strands.

The process prepares correct formulations and proportions of fibrous and resin composition reinforcement including fibers, resins, catalysts, fillers, colors, adhesives and packages the product for use as a transportable unit completely ready for placement and use in a process in a factory as pre-assembled component or at the site of use. These fibrous mat reinforcements 2 and the fibrous reinforcements as strands 7 may be of sisal, hemp, burlap, cotton, wool, fibers, fiber glass, fused quartz, synthetic fibers of acrylic resin, polyethylene terephthalate, or the like. Fiber glass is preferred in the present invention, but not limited thereto, in its various forms of strands, mats, rovings, cords, strings, cables, and fabrics, etc., because fiber glass is found good for 300,000 p.s.i. ultimate in tension calculated on the actual cross section of the fibers. Preformed members advantageously packaged are compounded ready for placing, fixing and bonding in wholly ready or partially prestressed state.

Prestressed units can be assembled into composite prestressed constructions or other constructions employing this invention. Metallic wires and strands or cables or rods or bars may be used in combination as components of packaged preformed ready-for-use plastic resin fiber reinforced reinforcements.

Fiber glass has an elongation factor of about 3¼ to 3½ percent, nominally called a 3 percent elongation factor at its ultimate load which feature of the reinforcing qualities of fiber glass I find advantageously useful in my invented constructions. Other fibers have more or less elongation factor and more will be disclosed about this feature in the constructions I make. A most important point that I find necessary in the selection and use of any fiber is its integrity of strength and durability in use. The packaged constructions of this invention are in a large part directed to providing this integrity of structural characteristics in the final end use of the materials provided as packaged ready-for-use reinforcement and decorative structural embodiments of the invention.

I use "strand" in this disclosure of invention broadly to include a single long fiber as well as a porous mass of tensile fibers interlaced or intertwined sufficiently to hold together, and without regard to width or cross-sectional form. I use the word "sliver" to identify a strand (in this broad sense) wherein tensile fibers are oriented generally longitudinal of the strand and sufficiently loosely to be readily penetrated and permeated by flowing resin or resin forming monomer.

To get the greatest tensile strength, e.g., from an assembly of fiber glass strands, I have the filaments, strands and fibers orientated and aligned so they may be stressed at a uniform rate, amount or quantity so that maximum tensile values can be derived from all of the fibers in the constructions. By means as shown herein I make endless stranded cable-form or belt-form constructions alone or in combination which may be prestressed or used in other ways to achieve uniformity of structural characteristics on a practical commercial basis.

Prestressing harnesses and holding means are provided in carrying out the processes of this invention so as to achieve the maximum strengths of the individual components of the constructions as well as from composite constructions comprised of packaged plastic resin fiber reinforced reinforcement incorporated into and of and on masonry bodies. These prestressing harnesses and holding means are disclosed and claimed in my copending divisional application.

The envelope 3 and the plastic used is preferably flexibly, but also can be rigid in suitable lengths that are cut to convenient lengths or kept in long lengths folded at intervals for easy packaging and handling. An envelope or enclosing means can be a thin sheet provided for one purpose, e.g. that of containing materials in ready-for-use form or it can be of substantial thickness or of functional characteristics enabling the envelope to become a component of the final end product as a structural element or decorative-structural element or component of the final end product. As a multi-purpose component of the present invention the envelope or enclosure means provides a most important part of the present invention.

The envelope can be made of a film or sheet that can be peeled-off from the laminated construction at the place of final use or other times. Also, the envelope can be made of a material that in part or in whole softens, fuses or melts at a predetermined temperature and time so that the film material or a part thereof comingles with the materials of the laminate. Further, the envelope can be of hydrophilic, water soluble or in fact any soluble material wherein specific soluble materials and solvents meet needs of specific formulations.

As an example, polyvinyl alcohol. It can be had in grades which are impervious to oils, greases and most organic solvents. Standard grades dissolve at 170° F.–180° F. This film is also available in cold water soluble grades. Such an envelope can act as a packaging means and also as a protecting means for the finished product and such an envelope can be removed by water washing or steam washing in the final end use or in a processing use.

The envelope can be made of film materials or enclosures which have substantial strengths as reinforcements and in combination with the other materials of my inventions provide structural strength as laminations in the final constructions.

The envelope can be utilized for at least a portion of the architectural, industrial, engineering, functional components or provide decorative and aesthetic functional characteristics alone or in combination with other characteristics. Such a laminated construction, particularly where metallics such as aluminum foil are used with heat selective objectives in the specific design, such envelopes will be provide uses other than packaging and decorative uses. The envelope can carry heating means such as resistance wires to aid polymerization of resins. Aluminum foil or other metallic sheets of discrete gauge can be formed into envelopes and sealed as for other purposes already known. The foil or sheets can be of a smooth surface, highly polished or matte finish as desired. The foil or sheets can be embossed or indented, textured, preformed or patterned to provide a decorative surface to the laminated surface construction layer or reinforcement being bonded to the concrete body. The aluminum or other metallic materials can be used as decorative means or functional means within the laminate structure. Exceptional and highly decorative means are provided when clear, or color tinted or dyed non-opaque resins are used with the aluminum forming a layer of the laminate. The aluminum foil or metallic sheet can also be surprisingly used for light reflective qualities and purposes and also as insulation reflective constructions. If desired, the same sheet or foil can be used for both purposes.

The combination of a metallic sheet such as e.g., aluminum, with a non-metallic such as polyethylene plastic resin can be used as an envelope wherein the metallic portion can be used as a heat transmission means. By connecting terminals in a known manner to the metallic portion of the envelope, this portion of the envelope can be used for electric current resistance heating to aid in the polymerization of plastic resins contained in the envelope in its functions as a container.

When the envelope or a portion thereof is retained in the finished laminate as a layer thereof and I use a metallic sheet I find it convenient to also install permanent connections to an electrical energy source and use the metallic sheet as a resistance heater for comfort heating.

The envelope when made of formed metallic sheet can be sufficiently rigid to maintain a stamped, pressed, punched or indented pattern which is of sufficient depth to extend from the front to back side of the laminate and a portion of which serve for specific functional use such as an architectural design, or a sign, e.g., a highway safety sign or as a reflective surface.

Polyethylene resin film of discrete type of polyethylene resin is used in the present invention in combination with paper, other plastics, fibers, wire, mesh, fabrics, or metallics as envelope materials. The polyethylene resin being incompatible with many resins and materials readily strips, peels and tears off from cured plastic resin surfaces of e.g., polyester resin compositions or epoxy resin compositions. At times the polyethylene envelope can be of thin gauge or of a layer thickness which can be incorporated into the end product lamination by means, e.g., by the heat of the process means or by the heat of the reaction which polymerizes e.g., a polyester resin composition binder (e.g., a polyester resin binder which cures at about 250° F. with an exothermic heat of reaction reaching about 400° F., the temperatures just now given being for illustration purposes only), which is thus softened or united or melted into combination with other plastic resin materials. Compatibility of various resins of both thermoplastic and thermosetting types is long known in the art and such compatibility is advantageously used in making specific formulated constructions.

The use of envelopes made of polyvinyl chloride resin compositions of formulated specific materials combinations already known, e.g., like the formulations used in making hose or tubing can provide as known or as modified by my invention, envelope materials of a tough, strong thermoplastic construction which can be bonded to porous masonry or concrete bodies by means of heat and/or pressure.

An aluminum foil-polyethylene envelope, as an example of a combination of plastic resin and metallic foil materials can make very strong, completely waterproof, gas tight, vapor proof packaging enclosures of multi-purpose use. The heat sealing features of the plastic resin provides closure means for making packages and is well established in the art. The functional uses, however, as applied herein show new concept wherein the package and its contained materials provide invented constructions in the present invention.

Tubular plastic resin film envelopes and combined materials make advantageously used packaging materials of the instant invention. These tubular embodiments are made by blowing means, heat sealing means, crimping, adhesive bonding, folding, bending and stapling, either alone or in combination of either of them, but not limited to these means.

Tubular plastic resin materials of the envelope can be provided in discrete gauge, e.g., 0.005" to 0.020", or thicker or thinner, in cross section so that functional uses of the envelope can be a part of the finished construction. The tubular envelope can be designed to withstand specific pressures either externally or internally applied during processing of its contained materials while at the same time protecting the packaged polymerizable materials during manufacture, storage or use.

The envelopes are most advantageously used to protect portions of the total construction separately, e.g., fibrous strands, e.g., fiber glass unidirectional strands, can be separately enclosed and packaged in an envelope in designed amounts of fiber reinforcement and combined in use in a mass of plastic resin composition which encloses and protects said packaged fibrous strands.

One such example comprises a plurality of fiber glass strands embedded and surrounded by a mass of unsaturated polyester resin composition containing a filler therefor, e.g., silica sand or aluminum-silicate particles and colored by a discrete pigment, e.g., a mineral oxide, and the combination packaged in a plastic resin film, e.g., polyethylene, Saran, (vinylidene-chloride film), Mylar, (polyester film), cellophane, etc. Adjacent the enveloped fiber glass strands, fiber glass fabric and/or fiber glass mat, spaghetti-like or capsule-like enclosures can be spaced at designed located placement which envelope, glass ampules, or capsules can contain catalyst which e.g., upon heating or crushing or by any other means, can be made to comingle with the plastic resin composition surrounding the fiber glass strands, fiber glass fabric or fiber glass mat, after the resin enclosure is entered into or is dispersed or disposed of by heat or other means.

The catalysts can be of any type or system adapted to the particular resin composition. In the case of unsaturated polyester resins designed into particular resin compositions the catalyst can be e.g., a paste of 50% benzoyl peroxide granules dissolved in tricresyl phosphate, or a paste containing 50% benzoyl peroxide with 50% dibutyl phthalate. A liquid catalyst like 60% methyl ethyl ketone peroxide in dimethyl phthalate can be packaged in envelopes of plastic resin or in thin glass tubes or capsules, crushable in the processing and so spaced in the construction to provide approximately uniform catalysis of the mass of polymerizable resinous materials. Other known catalysts and catalysts systems can be used, the selection of any one system being based upon its functional features in providing finished structure.

Catalysts adapted to being stable at room temperature and activated at above room temperature are known and provide the means for catalysts and catalyst systems for "preimpregnated fiber glass mats and strands, or woven or non-woven fiber glass cloth or fabrics." Other natural fibers, e.g., sisal fibers, or synthetic fibers, e.g., acrylic fibers like Dynel or Orlon, or polyester resin fibers like Dacron, of both organic and inorganic nature also can be made into such preimpregnated fibrous constructions useful as primary reinforcement or secondary reinforcement or as decorative features useful in the present invention.

The advantageous uses of resinous preimpregnated fibrous reinforcements and constructions together with discrete fillers, catalysts, pigments, colors, minerals and bonding adhesives in packaged prepared ready-for-use constructions are provided in many and varied forms. The constant improvement in plastic resins and fibrous materials by the basic manufacturers of such materials provides and will continue to provide the present invention with means and materials of advancement and refinement of the art as herein disclosed.

It is to be pointed out that the feature of 3% elongation with almost no inelastic yield as in the case of fiber glass (other characteristics of and features of stress-strain prevailing in other fibrous materials) if maintained in a state of equality in a group of fibers and protected against adverse influences like abrasion, injurious chemicals, unequal loading of individual fibers or slivers of staple or fibers when thus grouped, provide this invention the feature of resilient resisting and yielding while resisting static and dynamic loadings that is most advantageously used.

As a further example, a belt-form construction as shown in FIGURES 7, 10, 11, 17, 18 and 19, or as now described comprising a given number of stranded cable-like fiber glass unidirectional strands of roving are provided, e.g., 50 rovings to the inch of width of cable and each group of 50 rovings being enclosed in a polyethylene tubular envelope so that they can be handled without damage. The required number of 50 grouped fiber glass stranded reinforcements, e.g., 10 such groups, is placed on a plastic resin sheet or film, e.g., 0.002" gauge polyethylene film and a mass of unsaturated polyester resin composition containing a silica sand filler and in a thickened state to prevent run-off is spread or applied onto and around and about the groups of fiber glass strands. The unsaturated polyester resin composition may be used without a filler but be colored and can contain a mixed in catalyst stable at room temperatures and stable for a known period of time, e.g., three months at room temperature. The catalyst system will activate polymerization of the unsaturated polyester resin composition at e.g., 250° F. and cure the resin in e.g., 2 minutes or e.g., 10 minutes, but not limited to said times depending upon the system used and the amount used, and also depending upon the pressures if any to which the lamination is subjected while under cure. The construction may contain its own heating means, such as e.g., resistance wires or elements as shown in my Patent No. 2,671,158. Resistance wires, metallic tapes, conductive materials of many types can be packaged in functionally designed amounts to provide features of single purpose or multi-purpose use to provide heat for processing and curing the packaged polymerizable plastic resin, e.g., an unsaturated polyester resin composition or an epoxy resin composition.

The cooperating designed assembled materials placed on the plastic resin sheet or film, e.g., the polyethylene film of this illustration, can be covered with a portion of said polyethylene film purposefully left for completing closure of the construction into an inclosed enveloped manufacture and the designed package completed by heat sealing the edges of the upper and lower portions of the said polyethylene sheet to complete closure. The prepared preimpregnated fiber glass polyester resin bulk-filler composition construction can now be packaged further as a flat package or most conveniently it can be placed upon a reel as the reinforcement and/or decorative-structural packaged component of the reel-unit disclosed and claimed in the parent application Serial No. 340,642 of the present invention, and in my Patent No. 2,671,158, Serial No. 267,166, as originally filed Dec. 17, 1951.

The packaged enveloped construction can advantageously have a surplus of plastic resin composition over that needed to fully impregnate the fibrous materials and bulk-filler materials comprising the reinforcement to the said resins in the package. The additional amount of plastic resin composition in such an envelope package is advantageously provided to be used to penetrate and permeate the body of the concrete or the like, through its surface and into its porous structure and pores to purposefully bond and interlock the surface structural lamination contained in the package in ready-for-use-form by the "fingers" of resin in the pores of the concrete. The plastic resin used may be a two or more component system, one component being prepared for use on site and another being preimpregnated into a fibrous mat or strands at the basic point of manufacture of the enveloped construction. Mass produced preimpregnated mat and preimpregnated roving or other stranded fibers comprise elemental components of the present invention and in combination with filler systems of bulk-fillers or fibrous fillers, colors, pigments, fabrics or metallic elements on a selected use basis wherein preimpregnated mat or strands are impregnated with unsaturated polyester resin compositions as packaged together with the surplus of resin above described provides advantageously prepared ready-for-use reinforcement immediately placeable on precast concrete bodies or the like for completing into unitary constructions of reinforced concrete or masonry construction.

Preimpregnated ready-for-use fibrous reinforcement wherein e.g., epoxy resins or epoxy resins combined with other compatible resins like phenolic resins, polyamide resins, nylon resins, polyester resins, and elastomerics like Thiokol rubber, i.e., polysulfide rubber etc., can be combined with other fibrous strands or resins systems in a multi-purpose assembly made in a factory and ready for use for specific engineered structural design uses in the reinforcement of concrete structures. By packaging such combinations of materials in a semi-finished form ready for final compounding and final end use, the concepts of chemically engineered constructions wherein the chemical features and formulations are provided by the facilities and personnel best suited for such work when brought together with concrete bodies and constructions wherein the civil and architectural engineering features are provided by facilities and personnel best suited for such work together make the total construction of plastic resin fiber reinforced concrete or the like a dependable engineered end product and construction. The package concept provides the means for this integrated and combined technology being provided on a mass production low cost basis and places the responsibility for accuracy and integrity of construction upon the facilities and personnel best suited for such work. No limitation is intended to the wide ramifications to such a concept within the confines of this disclosure.

The plastic resin films referred to in the present invention are those made from synthetic resins or polymers or natural polymers and are formable or sealable by heat and pressures. Cellophane, which is technically not a plastic film is for the purposes of description in this invention discussed and described with the film materials. The manufacturers of these film materials are in a state of rapid development and improvement and are developing new and improved films by the blending of resins and the use of nonmigratory or resinous plasticizers.

Improvement in the production of thin films by means of heat and mechanical means directly from base resins without drying or use of solvent is well into pilot production stages and in some cases mass production. Polyethylene films are produced by extruding molten resin and drawing it into thin sections. This method is so low in cost that film makers production research has been directed to making more types of films by this process. Of great importance to the present invention is the fact that such heat-or extrusion-produced films can then be mechanically worked in much the same manner as alloy steels and provide new and unusual properties based upon the mechanical orientation of molecules. Heretofore, changes in the properties of a film have been possible only by changing the molecule's chemical configuration. Packaging and envelopes of the present invention most advantageously make use of this feature of film material to increase the strength of the package as a package and more importantly to provide high strength components functionally useful as structurally engineered constructions wherein the package itself forms the reinforcement or is a portion of a reinforcing means.

The packaging materials of the film type I find useful in the present invention include cellophane, cellulose acetate, polester film ("Mylar"), vinyl, polyethylene, cellulose acetate butyrate, rubber-hydrochloride film "Pliofilm"), vinylidene-chloride film ("Saran" or "Cryovac"), polyvinyl alcohol, but not limited to these films. Of limited use as of the present, polystyrene, (Kel-F) polytrifluoromonochlorethylene, polyamides (nylon), vinyl nitrile rubber must be included in the invention especially in the embodiments I make wherein combinations of resinous film materials make specific constructions. The properties of packaging films are given on pages 118–119 of the 1956 edition of the Modern Packaging Encyclopedia, published by Packaging Catalog Corp., Bristol, Conn.

Aluminum foil and sheet comprise important useful materials in the present invention. For packaging, the most used alloy has a minimum content of 99.45% aluminum and is designated in the industry as alloy 1145. A higher strength aluminum alloy is designated as 3003 and is used in heavier gauges. Aluminum foils range in thickness from 0.00025 in. to 0.005 in. Heavier gauges are considered sheets. Foil comes from the rolling mill in a hard temper, having a light film of oil on its surface. Since foil for most other purposes than in this invention must be soft, the hard foil is annealed by heating at high temperatures. This process makes the foil soft and pliable and removes its surface oils. In some of the embodiments of this invention it is most desirable to have a smooth planar surface or otherwise treated surface but planar. Hard foil in intermediate or full hard grades provides such surfaces and in combination with e.g., polyethylene resin laminated to one side and being cleaned makes an excellent package. The heavier gauges can be used alone and a package sealed by bending over the edge and crimping.

The properties of aluminum foil and sheet make it most useful. Aluminum foil does not have a true moisture permeability rate, because it is an impermeable metal. Unavoidable microscopic breaks however do take place. The water resistance, nonabsorptivity, non-contamination, heat conductivity and heat reflectivity of aluminum finds these features very useful in the present invention. With up to 96% of radiant heat being reflected by aluminum foil and as little as 4% heat being emitted, packages of aluminum foil or having aluminum foil as a component thereof provide maximum protection to the formulated plastic resin-fiber constructions of the present invention.

Laminated constructions such as aluminum foil-waterproof adhesive-paper-heat seal coating; aluminum foil-water resistant adhesive-paper-microcrystalline wax-porous tissue; aluminum foil-paper-foil combination, heat seal coating; cellulose acetate-resinous adhesive-foil-heat coating; and scrim-polyethylene-foil-vinyl film combination are some of the packaging combination laminated materials available. The properties of such laminations are shown on page 136 of the 1956 edition of Modern Packaging Encyclopedia above referred to.

Flexible packaging in the present invention is designed for specific functional uses, e.g., when I need a transparent, stabilized, high moistureproof high seal strength package a laminate of cellulose acetate to rubber-hydrochloride film (Pliofilm) is used to package powdered or granular filler materials.

Catalyst materials as dry powders or as paste compositions are packaged in capsules of glass or designed resistant materials that keeps the catalyst in ready-for-use state. Specific engineered and mass produced sheets, strips, tapes, strings, beads, and fibrous dipped and resin enclosed catalyst packages make possible the control of time and place in means of catalyzing resinous compounds of the invention within a packaged construction or in combination with a package or more than one package. Industrially, the machinery and equipment for automation is well developed and this invention is also directed to means whereby process packaging provides features to lower costs of building and engineering structures as well as other economic goods by means of integration methods and means of production by automation.

Adhesive materials suitable for use in the practice of my invention include synthetic thermoplastic resins and adhesives. These may be used alone or in combination of compatible materials. Some of these materials of the general type of cellulose derivatives can be cellulose nitrate, cellulose acetate, cellulose acetate butyrate, ethyl cellulose, methyl cellulose, and hydroxyethyl cellulose. Acrylics such as methyl methacrylate, isobutyl methacrylate, ethyl acrylate, and vinyl resins such as vinyl acetate, vinyl alcohol, vinyl alcohol acetate, vinyl chloride, vinylidene chloride copolymers, vinyl chloride acetate copolymers, vinyl acetal, and other materials like polyisobutylene, coumarone-indene, and modified waxes can be used for adhesives.

Thermosetting resins can be used for adhesives including phenol resins, alkyd resins, epoxy resins, phenol-formaldehyde, phenol-elastomer, phenol acetal, phenol polyamide, resorcinol-formaldehyde, resorcinol-phenol-formaldehyde, resorcinol-furfural, resorcinal polyamide, furan resins, furfuryl alcohol, urea resins, urea-formaldheyde, urea-furfural-formaldehyde, urea-resorcinol, melamine resins, melamine-formaldehyde, melamine-urea-formaldehyde, polyester resins, unsaturated polyester resins, polyester elastomers, silicone resins and modified polyester resins.

Thermoplastic rubber adhesives, natural rubber, reclaimed rubber, neoprene rubber, butyl rubber, butadiene-acrylontrile rubber, butadiene-styrene rubber, silicone rubber, (Thiokol) polysulfide rubber, cyclized rubber, chlorinated rubber can be used advantageously in the present invention.

Resins softened by a liquid to a sticky flowable condition, e.g., asphalt, shellac, dextrin, casein, blood albumen, soluble dried blood, animal glue, soybean glue and zein alone or in combination can be used in some of the embodiments of this invention.

The laminations of multiple member envelopes, constructions and members of the inventions, joints and joinery, bonding and placement of said constructions and members require materials of an adhesive nature and of varied properties. Varied and functional uses of adhesives are needed and many such adhesives are available as above given but not limited to the herein mentioned materials.

Enclosing materials and adhesive materials specifically used and selected can be packaged with their contained resins, fillers, catalysts, bonding agents, solvents, colors and reinforcements or with other discrete materials and stored and kept ready for use for reasonable periods of time without deterioration, some being stored at room temperatures and some at other predetermined temperatures. I also find it convenient to package resins and fillers in one portion of a package which is heat sealed away from contact with e.g., catalysts, or solvents or discrete particles. Compartmentized envelopes are very useful and insure correct formulation at the site of use. To maintain fibers or roving, e.g., fiber glass roving, in its maximum strength and to protect against abrasion thereof, the fibers may be held in desired orientation in heat sealed envelopes, the fibers being oriented and filled into the package by machine. This eliminates manual handling of fibers and delivers a uniform product. In the manner of joints and joinery, envelopes designed as containers of the joint material also serve as structural components of said joints and joinery.

The catalyst 5 shown in the figures may be incorporated and mixed into the resins or it may be packaged in a separate envelope or container 4 made of a suitable plastic, glass or other container. It may be sort of spaghetti-like in form as disclosed in FIGURE 28. Also the catalysts 5 can be packaged in other spaghetti-like forms in packaged assembly as catalyst preforms, in globules, chain globules, tube and rod-like globules, tape-type globules assemblies, sandwich-type assemblies, wire attached globules, screen wire attached globules, fiber attached globules, spaced and oriented assemblies of globules on foil, sisal, cotton, hemp, burlap, paper, fabrics, mats, metallics or any of the like which provide evenly distributed or specifically placed amounts of catalysts for incorporation into plastic resins and are adapted to polymerize the same. These catalysts 5 thus can be provided in standardized, unitized, amounts for incorporation at the site of use insuring uniform mixing quantities and control with respect to time, environment and chemistry. The catalysts can be soluble in particular solvents at predetermined times and conditions.

The catalysts 5 can be kept separate from the polymerizable material during transit and storage and released into the plastic resin compositions or placed into contact with the plastic resins by physically mixing, by osmosis, pressure means, melting at predetermined temperatures, chemical reactions, adsorption, or absorbtion into adjacent materials or by any known means. Various catalysts 5, e.g., organic peroxides, are used. These organic peroxides decompose in a resin solution to form free radicals which are active in starting and initiating, propogating and terminating and ending chain reactions which result in high molecular weight polymers. It is known that heat alone, or time and light will polymerize resins but in the interest of economy of time it is found practical to use catalysts such as but not limited to, the organic peroxides, cumene hydroperoxide, diacyl peroxides, aldehyde peroxides, ketone peroxides, alkyl hydroperoxide, alkyl peroxides, alkyl acid peresters, alkyl peresters, diacyl acid peroxides, methylethyl ketone peroxide in dimethyl phthalate (Lupersol DDM or Cadox MDP), benzoyl peroxide granules, benzoyl peroxide in paste form with tricresyl phosphate, benzoyl peroxide compounded with dibutyl phthalate, 2,4-Dichlorobenzoyl peroxide compounded with dibutyl phthalate, cyclohexanone peroxide compounded with dibutyl phthalate or as mixed ketone peroxides.

In the epoxy resins, e.g., curing is accomplished by several means and mechanisms, in the epoxide groups being cured by reaction with amino, carboxyl or hydroxyl groups and inorganic acids to give secondary hydroxyl groups and a bond from the remaining epoxide carbon atom to the nucleus of the donor. The secondary hydroxyl group undergoes typical reaction with acids and anhydrides. Various amines, acid anhydrides, dibasic acids, and resins including phenol-formaldehyde, urea-formaldehyde, polyamides, and melamine-formaldehyde are available as commercial curing agents.

Sunlight also acts as a catalyst for some resins so that stripping off of an opaque package or cover such as e.g., metal foil, may serve to initiate the setting of the resin. In certain military and industrial embodiments of the present invention e.g., FIGURES 5, 2, 17 and 19 of my co-pending and parent application Serial No. 340,642, filed January 16, 1953, a portion of which is now Patent No. 2,951,006, a division of my application Serial No. 267,-166, filed December 17, 1951, and originally shown therein, and now Patent No. 2,671,158, and as shown in FIGURE 33 of the present invention, packaging of this type and in which the combined materials of the lamination contain a catalyst activated by sunlight, experience in such matters indicates important uses in field military or construction operations.

A very important construction advantageously used in this invention comprises a thermoplastic resin fiber glass, or other fibrous materials, reinforced packaging means wherein the fibrous reinforcement is protected by the resin encasement about the fibers and affords a very high strength package. The fibrous material may be of tensile, compression, shear or torsion reinforcement types and is advantageously oriented in the resin encasement to provide resisting strengths in accordance with a structural design. The resin may be of a resilient rubbery type adapted to the features I require in my shock resistant and dynamic loading type of constructions. The resin may be adapted to penetration and permeation of the adjacent concrete or the like, to reinforce the concrete and still be in sufficient amount to cover and protect the fibrous reinforcement from injury of any type. The combination can form the package for additional reinforcement combined in packaged form in a factory or the resin may be added to the combination in the field.

A variation on this means is the use of a thermosetting resin like a polyester resin impregnated fiber glass reinforcement in a polymerizable state and adapted to provide packaging means for additional components of the specific construction then being made. The outer face of such a combination can be cured entirely or cured partially to provide it as a high strength protective cover and still have inner laminations in a fully polymerizable state to be completely cured upon the complete assembly of all the components of any given construction.

Figure 20:
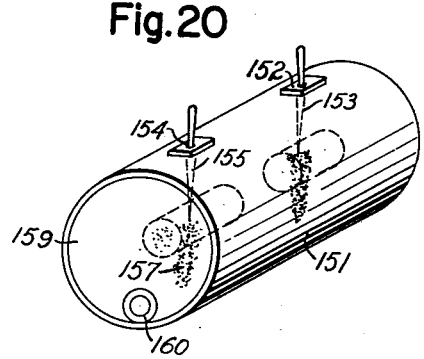
FIGURE 20 is an isometric view of a vessel or tank or drum for packaging materials of this inclusive invention in combination, and having vessels or compartments inside of the vessel, tank or drum containing predetermined amounts of materials suitable for formulation and ready mixing.
Figure 21:
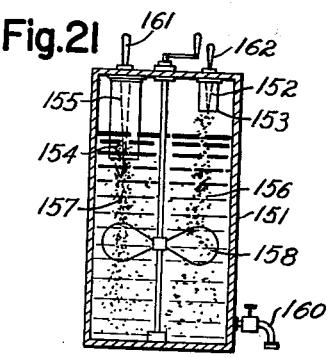
FIGURE 21 is a sectional view of a similar tank showing vessels inside of the tank opened by external means and a mixing device externally operated all adapted to combine packaged components at a convenient time and place.

As another example of packaging of catalysts and resin compositions which is advantageously used in field construction alone or in combination with packaged prepared-for-use laminated fibrous reinforcements is shown in FIGURES 20 and 21. Catalysts packaged in plastic resin envelopes, metal cans, or other material packages are placed inside of a drum or vessel and perforated from the outside at the desired time. Thus catalyst material is released into the resin composition, etc., in the drum and activates it ready to use.

I have already disclosed in general terms features of heating wherein the package contains the elements for heating. Means for heating the materials of the present invention wherein heat is used as applied heat as a component as differentiated from exothermic heat which is provided and produced by a chemical change or reaction which is accomplished by a liberation of heat can be provided by direct convection and/or radiation from burning fuels, by ovens, heated platens, heated molds, heating blankets or pads, i.e., rubber-like sheet, such as silicone rubber, fabric reinforced or fiber reinforced which contains electrical heating elements, heating pads, chemical heating means, steam heat, hot air heat, electrical radiant heating panels, plastic-resin-fiber-glass-electrical heating devices, infra-red heat rays, far infra-red heating devices, induction heating devices, or in fact any known practical heating source which can be used alone or in combination with other means. The heating means can be used together with a pressure means. Such pressure may be effected by pulling a vacuum on the concrete body or reinforcing mat or other material or fabric so that atmospheric pressure drives the plastic into the concrete body or the like or by externally applied air pressure means or by physical pressure applied mechanically, or even internal pressure derived from chemical reactions which induce expansion or contraction. The package is so provided that that these features may be accomplished externally or internally of the package, i.e., by one or more of the pressure means directed to specific embodiments.

Heating means can be used together with the forces of chemical reactions, e.g., polymerization such as shrinkage forces, in combination, to make chemical and physical bonds, attachments and adhesions between, to and of the materials of the present invention.

Heating means can be used together with designed characteristics in the concrete or masonry component of any given structure in combination with the packaged prepared ready-for-use elements of the present invention to secure features, maximum potentials and uses of capillary forces in a designed and engineered manner in the chemical prestressing of the materials used in the end product of the present invention. Also, heating means can be used to thermally prestress the packaged materials and simply induce preload forces into components, members and structures and the constructions made. Heating means are useful in sequence staging and processing techniques.

Heating means can be used in combination with mechanical means to prestress some of the materials of this invention. Packaged cable-like reinforcements and belt-like reinforcements like FIGURES 1-7 advantageously are mechanically prestressed into a state of tension (preload) and the concrete or the like is expanded thermally in a process of the invention. For example, the preheating of concrete bodies removes not only the moisture to provide maximum capillary forces but serves in certain features of the invention for prestressing by thermal expansion and contraction. Mechanical prestressing by loading in compression by means of hydraulic jacks may be utilized to induce forces which can be retained and fixed as permanent loadings in the construction by plastic resins and by fiber reinforcements enclosed by plastic resins bonded to the construction, and which comes to the site of use in a packaged ready-for-use engineered reinforcement adapted to make the whole assembly of materials into a unitary structure provided for substantial static and dynamic loading.

Thus heating means can be used as direct means of prestressing of concrete bodies and the like, the materials for prestressing in part at least being ready-for-use packaged constructions and in which the prestress forces are fixed by anchorage and/or bonding and integration means before the materials return to ambient temperature.

The joinery and the surface constructions provided as laminated layers advantageously can be compacted, compressed and provided with prestressed preload by the use of flexible film materials used to package the materials of said layers. Rubber-hydrochloride film can be plasticized by heating and then stretched under controlled conditions to give the functional requirement for prestressing. The stretching process greatly increases the toughness and strength in the direction of the stretch and permits the film to be shrunk around an object by applying moderate heat. Vinylidene-chloride film can be used for the same purpose of inducing prestressed preload where stronger film is required. This film is able to tolerate temperatures up to 300° F. for short periods so that reactions of chemicals like for e.g., unsaturated polyester resins in which exothermic heat is liberated, can be done, especially when the packaged envelope is a combination of vinylidene-chloride film and aluminum foil. Other films like the acrylics can be used advantageously for their shrinkage, e.g., Dynel, or fiber like Acrilon.

Foil or resistance wires in the wall structure of a package may serve not only as heating means but also the reinforcing means to the package or the structure, or both, or as decorative means visible when the laminations at the site of use are completed. Heating means can be expendable units or components or they can be reusable units.

Heating means can also be provided as components of multipurpose forms which also act as packages. Such heating means can thus be provided as rubber-like or sheet-like flexible, semi-rigid or rigid layers laminated with the materials and removeable for reuse. Also these heating devices can be so designed as to become a constituent part of the resulting laminated construction and perform a functional use such as comfort heating.

Aluminum in various forms, e.g., foil or metallic sheets, carbon black, and other fine particle carbons, resistance wires, plates or sheets having electrical current carrying properties and compatible with the resins, fillers, binders, colors, etc., as herein disclosed are examples of heating means for my invention that are advantageously provided as components of the package or envelope.

The fillers used in my invention are many and varied. They are provided in the present invention as components of formulated mixtures of resin and filler in liquid mixtures, paste mixtures or blended solids mixed and packaged as components of the packaged reinforcements of the invention. The packaging means in certain instances and embodiments are used to control shrinkage of plastic resins by providing the filler materials during processing in sequence staging. Filler characteristics in some cases impart toughness or other desired functional features. Fillers such as silica impart texture and finish of a stone like character. Clays of various kinds furnish smooth surfaces and may be used to reduce sheen and glary finishes. By packaging many embodiments are made possible which otherwise could not be done on an economical basis. The measurement of quantities alone in many of the constructions I make justifies the expense of the packaging film, because of the machines available for precise measurement and simultaneous packaging.

In the practice of my invention I have found what I believe to be novel fillers for the decoration and finish of precast-prestressed concrete components and in general, of precast concrete bodies. For example, powdered onyx provides finishes comparable to the finish of fine marbles and the like. Well washed ocean beach sand in various screened sizes from dust or about 1200 mesh on up to about $\frac{1}{16}''$ mesh with or without coloring with mineral colors makes beautiful finishes. Pumice in various sized particles makes attractive finishes that are also highly resistant to heat. The volcanics such as tufa, obsidian, and mixtures of finely ground rocks provide many useful, functional and decorative textures and finished surfaces. Limestone, marble, granite are examples of minerals which can be used as fillers compatible with other components of the inventions. Colors and textures are matters of design and aesthetic tastes and when used in architectural and design concepts are exampled by formulations of combinations of minerals that I use to achieve various colors, designs and textures. These formulations are exampled in copending applications. The packaging of these formulations as provided in the present invention insures accuracy of measurement and consistent features adapted to mass production techniques which makes possible low cost production of the products I make.

Packaging provides means of using the advantages of fillers, e.g., silica type filler improve fire resistance of heat resistant resins. Aluminum-silicate particles or fibers provide high heat resistant values. By placing the laminated layers in the designed place in a construction, e.g., at the surface, or in a joint, packaged enveloped materials can be utilized efficiently and structurally productive. Antimony trioxide ($Sb_2O_3$) and Chlorowax 70, a chlorinated wax containing 70% chlorine and sold by the Diamond Alkali Co., Cleveland, Ohio, or triallyl cyanurate in an unsaturated polyester resin, e.g., Laminac 4233 with 5% antimony trioxide added, the Hetron resins supplied by Hooker Electrochemical Co., Buffalo, N.Y., are likewise useful to make tough fire resistant structures. Silicone resins also provide heat resistant and water repellant qualities. By packaging compatible resinous compositions in laminated layers or in compounded separated multipackages for later combination the benefits of mass production packaging equipment can and does provide me with many novel features of this invention.

By packaging the catalyst, or combination of catalyst and accelerator as e.g., benzoyl peroxide crystalline particles in a container separate from cobalt naphthenate which contains 6% of cobalt metal in another container, the safe handling of otherwise dangerous materials can be effected so that they can be added to resinous compositions in correct sequence staging as is known in the art but of which the construction personnel on for example, a bridge job, would normally have little knowledge. By using plainly marked packaged components of a multi-package or assembly of prepared ready-for-use reinforcements the user does not have to know chemistry, and with reasonable care in following instructions can make a very effective use of the present invention in its several features.

The catalyst 5 may be incorporated in the resin, e.g., an unsaturated polyester resin composition comprised of a resinifying mixture comprised of e.g., a polyester resin dissolved in a liquid vinyl monomer, e.g., styrene monomer or vinyl acetate or vinyl toluene, etc., said polyester resin being a polyester resin of dihydric alcohol and a mixture of dicarboxylic acids including maleic acid, and said dicarboxylic acids may include an ethylenically unsaturated dicarboxylic acid. The catalyst 5 may be packaged in a separate envelope 4 made of a suitable plastic resin or other tight container, e.g., spaghetti-like in form, and completely sealed, but subject to osmotic action, or adapted for crushing or puncturing when properly impacted or otherwise handled, so as to release the catalyst 5 into the resin 21 when it is desired to polymerize or "cure" the resins 21. The catalyst 5 can be of a type that requires substantial heat to complete the reaction between resin 21 and catalyst 5 or the resins 21 can be of a type which sets at room temperature.

Among the useful various resins in the present invention, but without limitation, the following types can be mentioned: Polyester resins; unsaturated polyester resins; epoxy resins; vinyl resins which include resins made from vinyl derivatives of vinyl; indene resins; lignin plastic materials and substances; sulphonamide resins; phenol aldehyde resins; resins from sugar; alkyd resins; aminoaldehyde resins; polyester resins containing triallyl cyanurate (heat resistant); polyester resins made from triallyl cyanurate and specially selected modified maleic alkyd; polyester resins containing fireproofing additives such as antimony oxide and (Chlorowax 70) chlorinated parafine having 70% chlorine; silicone resins; ethoxyline resins; vinyl resins containing trinitrobenzene complex or containing zinc dimethyldithiocarbamate cyclohexylamine complex (rodent resistant properties); polymonchlorotrifluoroethylene; polytetrafluoroethylene; nylon-fabric phenolic-resin resistant to micro-organisms such as *Aspergillus niger, Penicillium lutem, Rhizopus negricans, Monilia,* and *Aspergillus amstelodann*; Melamine-nylon resins and phenolic-nylon combinations suitable where high electrical insulation is important; compatible combinations of thermosetting and thermoplastic resins.

The synthetic and natural latices also will provide usable materials and they include as herein mentioned for illustrative purposes but not including all of the latices usable, illustrated as follows:

Buna and Perbunan (polymerized butadiene); neoprene (polymerized chloroprene); Pliofilm (rubber hydrochloride); Thiokol (polymethylene polysulfide); Tornsit (chlorinated rubber); Pliform (isomerized rubber); any latex of above; Polyfilm (polyethylene); and styrene and styrene homologues obtained from the fractionations of the so called "crude solvent" from "light oils" scrubbed out of coke oven or gas house gas. These styrene resins are soluble in aromatic hydrocarbons and are permanently thermoplastic.

Epoxy resins are exceedingly useful because of high bonding strengths and surface finish characteristics. Polyester resins are constantly being improved and also better ways of using them are being found. The epoxy and polyester resins make fine components for my inventions and are in plentiful supply and are readily available. It is to be pointed out that all resins do not meet my needs of specific products and I use the knowledge of the art and that of my own invention to so use the resinous materials of the invention to make permanent useful embodiments of the invention. The plastic resins used comprise the bonding and binding materials as well as integrating and stressing materials and each specific plastic resin formulation as compounded into the embodiments of my invention are used as elements and building components of the structures made. The particular features of some resins, e.g., polyester resins and epoxy resins provide not only components adapted to structural engineering design but in one and the same compositions, provide decorative and aesthetic features at no additional cost. The resins and component materials of resinous compositions I use are studied and related to the porous structural materials or to the end use of any specific designed structure embodying the resinous compositions to effect compatibility and finished constructions that if stressed, do not de-laminate or deteriorate or fail because of not using all possible "know-how" in the art. Generally, resinous compositions of a "tough," resilient nature are preferred over brittle compositions and I modify commercial resins to meet the needs of any specific product on the basis of its structural engineering characteristics, workability and economy in multi-purpose uses.

In order to more fully explain the invention there is shown in the accompanying drawings illustrations of embodiments of the invention, illustrative of concept but not limited to the illustrations shown:

FIGURE 1 shows strands of fiber 7 in endless assembly made up around a pair of fixed round supports 8 whose diameter is of sufficient size to keep the strands from being sheared or damaged. The strands made up as roving 62 comes in convenient packages 63 and when made up forms a stranded reinforcement 66 which is oriented and can be stressed to maximum values utilizing all commercially practical strength of the reinforcement.

FIGURE 2 is illustrative of the next step in forming roving 62 into stranded reinforcement 66 and shows the roving 62 from package 63 passing through rounded forming frames 64 and 65 and being formed into a single member with two end loops or enlargements. The winding and forming is done under an even tension on the roving so that each fiber of the roving and a strand made therefrom within commercial limits is adapted to a uniformly applied tensile load and the fibers act as a unit in response to loading.

FIGURE 3 is a view showing strands of fiber 7, plastic resins 21, catalysts 5, colors, and fillers in endless assembly in an envelope 3 ready-for-use as a preformed packaged cable-form reinforcing member 66. A shaft of substantial strength 71 is shown inserted into an eye-like form 8 at each end (also shown in FIGURES 1 and 2), said shaft being of sufficient strength to be in slight excess of the greatest applied prestressed forces to be applied to the reinforcing member 66, and this with an allowable factor of safety for reasonable working loads. The shaft 71 is supported in a prestressing means or harness shown in FIGURES 37 and 38. When desired the eye-like forms 8 can be coated with plastic resins or impregnated and cured to make them into a firm solid body for ease in handling of the preformed reinforcement 66. The envelope 3 may be made out of any one of a number of materials or combinations of materials as herein disclosed and may be a prepared-in-advance member to be put on after the strands are formed into the cable-form constructions. It may be applied by brush or spray gun or any other known means such as dipping or roller coating, which material when formed makes an envelope.

The strands may be inorganic, organic or metallic material used alone or in combination. The strands may be separately wrapped or enclosed so multiples of units make up a preformed package cable-form reinforcement. To insure uniformity of stressing ability of such a reinforcement it is important to orient and place the fibers, strands, rovings and members in uniform assembly in an endless arrangement so that all parts of the member work in restraint of imposed forces equally, or at least to a degree of equality obtainable in commercially practical production of such reinforcements. Obviously, the member can be made to predetermined strength and length and diameter or shape and suitable for many requirements of reinforcement.

FIGURE 4 is a view of a construction similar to FIGURE 3 but in addition shows two types of intermediate anchorage means or enlargements 68 and 69. A solid member 68 of any desired shape is formed around the cable-like member to increase its size at a particular place on the cable-form formed reinforcement, said solid member 68 acting as an anchorage member when the reinforcement is prestressed or stressed at the final place of use or in processing in a manufacturing sequence.

An eye-like member 69 is also shown with a shaft 70 passed through the eye. The end-eye-like loops or forms-of-enlargement and the intermediate-eye-like loops or forms-of-enlargement built into and upon the cable-form or belt-form reinforcements I make are used as anchoring means to implements used to pretension or post-tension prestress forces as preloads into said reinforcements and also act as permanent anchorage devices.

FIGURE 5 shows another way of making formed bodies in a preformed cable-form construction; a solid member 72 of any desired shape being wrapped around the cable-form construction and laminated thereto by strong adhesives. Such members can be made of additional layers of roving of e.g., fiber glass and the whole member later impregnated with thermosetting or thermoplastic resins. In this figure is shown member 73 which can be a hollow laminated paper tube suitable for withdrawing from a make-up shaft which is part of a make-up machine, said machine being shown in divisional application from this application. Member 73 can be of other materials such as plastics, wood, impregnated fabrics or metallics and of substantial strength. Member 73 can be reusable or disposable at the will of the designer. The adhesives can be selected from the examples above given and when e.g., I want a particularly strong member, epoxy resin composition without a filler or with a filler and fiber glass roving applied in a stressed condition under a uniform tensile pull makes a construction for members 68, and 72, that approximates the strength of steel. Polyester resin composition containing a fine silica filler modified with a little fine particle clay, like Edgar Bros. ASP 100 or 400 aluminum-silicate (Metuchen, N.J.), or sand washing tailings from a sand washing operation in San Diego County, or on the Salt River near Phoenix or Tuscon, Arizona, provides a strong binder to wrapped tapes, strings, or rovings whether of fiber glass or other fiber.

The reinforcement can be completed as a finished "cured" laminated member or advantageously it can be provided as a "preform" package ready-for-use all assembled and the plastic resin composition in at least a part of the member in its polymerizable state in a semi-process or finished state. The plastic resin composition can have a predetermined shrinkage so that upon polymerization the forces occurring during the reaction of polymerization can be used to structurally engineered advantage as captured prestressed preload in and of the construction.

FIGURE 6 is an isometric view of one end of a packaged preformed cable-form construction suitable for reinforcing of a prestressed-precast or precast-prestressed or prestressed-poured concrete body. This view is shown for clarification of FIGURES 1-5 that are shown above.

FIGURE 7 is an isometric view of a belt-form construction wherein 7 represents the strands of fibers, member 71 being a shaft, member 75 being an eye-like form at the end of the construction and similar to member 74 in FIGURE 6. The laminated construction is enclosed in an envelope 3 thus making the reinforcement member 66.

The belt-form construction can be made as a preimpregnated plastic resin fiber glass reinforced construction as a standardized unit e.g., 4″ wide and of various thicknesses, e.g., 1/8″ to as much as 7″ or more in laminated layers substantially uniformly tensioned and to any desirable length adapted to any specific adapted use, e.g. 8 feet in length, 50 ft. in length or even 16″ more or less in length. The belt-form construction can be 20′ 0″ wide and adapted as use for the decorative surface finish as well as the structural reinforcement as a skin-stressed prestressed preloaded surface construction layer in unitary bonded interlocked and integrated combination with a concrete slab, e.g., a tilt-up slab of poured pre-cured concrete which may or may not include into its design other reinforcement, e.g., steel rods or again e.g., prestressing steel cable or wire or rods. The standardized unit advantageously can be used in multiple use in both thickness and width and in lengths. The standardized unit is very useful in making laminations of plastic resin composition, e.g., self-extinguishing polyester resin composition laminated to elastomeric resilient layers of e.g., neoprene rubber or epoxy-polysulfide rubber or any other combination of materials as herein disclosed or as available. The combination can be one in which the exterior face laminated layer is finished and "cured" in a decorative color and/or texture and the inner layer or layers can be in a prepared-for-use-state for integration and bonding to a masonry member. When I want a particularly tough and strong finish an epoxy resin composition filled with an aluminum-silicate of high heat resistant qualities and a hardness on Moh's scale of 5-9 makes such a construction. Similar constructions can be made as cable-form units 1/4″ to 1″ more or less in diameter or shaped as squares or other shapes, e.g., flats, ovals, etc. The dimensions given are illustration purposes only, no limitation being intended or to be inferred from any dimension given herein. The cable-form and belt-form constructions can contain two or more laminations wherein the fibrous materials are designed for different functional objectives, e.g., a joint construction as disclosed and claimed in my Patent No. 2,950,576 can advantageously be made to meet different structural needs. As an example, a fifty foot long joint comprises a strong tensile center layer of fiber glass strands made up as in FIGURE 7, e.g., 8″ wide and containing 100 fiber glass rovings to the inch in a uniformly tensioned layer and being impregnated with an unsaturated polyester resin composition having a shrinkage feature of 6.5% and filled with 25% fine silica powder of from 100 to 250 mesh. The central layer has on each side a strong but highly resilient layer of 6 oz. multi-directional mat of fiber glass impregnated with an unsaturated polyester resin composition and with a surplus over that needed for complete impregnation so that the surplus can be penetrated and permeated into the adjacent concrete or masonry precast beams which in this particular case I am laminating together. The resin composition can be for example, a heat resistant resin like the Hetron resins made by the Hooker Electrochemical Co., of Buffalo, N.Y., and in this case I used a beneficial blend of Hetron 93 and a Vibrin 151 as made by Naugatuck Chemical Co., Naugatuck, Conn., the blend being about 85% of Hetron 93 and 15% Vibrin 151. A small amount of styrene monomer up to 3% to 10% of the Hetron 93 aids in certain uses in getting better penetration into a particular concrete. Such a three layer combination packaged ready for use joint materials concept can be added to with more layers of the same or of different functional plastic resin fiber reinforced constructions. The reinforcement can be packaged in polyethylene film of discrete guage. A variation I sometimes use is a thick layer of polyethylene e.g., up to 1/2″ thick more or less, but not limited thereto, which being resilient and inert acts as an expansion and contraction member by its resilient quality and also packages the construction. This 1/2″ thick layer e.g., can become a permanent part of the construction and finds its first use as a package material in a multi-purpose fashion.

In my impact resistant structures wherein the concrete is impreganted into its porous structure by rubbery plastic resins or elastomerics I find that packaged ready-for-use enveloped resin filled constructions made in a factory under controlled chemical conditions make up reliable and commercially and substantially uniform impregnants for the zone-of-strength such impregnation is designed for. The plastic may be in a thermoplastic state which upon the addition of heat or of addition of a contact chemical or other means becomes adapted to a state for impregnation. A thermoplastic resin like polyvinyl chloride resin or a thermosetting resin like an unsaturated polyester resin Selectron 5405 or the equivalene type in other makes of resin can be rubbery or paste-like and made flowable by heat. In combination with a single central web reinforcement or a plurality of similar reinforcements each being encased in its wrapping or envelope of a resinous material having a structural significance, e.g., fiber glass unidirectional strand covered and impregnated with an epoxy or unsaturated polyester resin composition, to which is laminated a layer of compatible resin impregnant carried as a surplus over the amount needed to substantially completely impregnate and fill in between the strands of e.g., a polyester fine stranded mat of Dacron, or of acrylic fiber, Orlon, or sisal fiber mat, etc., I provide a laminated construction particularly adapted to joinery and to being firmly and resiliently bonded to the concrete by resins or a resin impregnant carried in the outer layers of a multiple laminated member.

The envelope of such a construction can be a thin walled plastic, e.g., polyethylene having a low melting point preferably above ambient temperatures, or of a nature that by means it can not when incorporated into the resin composition materially structurally affect the degree or amount of bond designed into the construction of the impregnant plastic. The envelope can be a peel-off type as herein shown.

Such an enveloped construction can be used in industrial products or constructions or can be used in stressed frames for bodies of trailers, trucks or even airframes. The advantageous use of the prestressed preload provided by chemical reactions of expansion or contraction make exceptionally strong members. The FIGURES 1-7 show constructions adapted to prestressed preloads induced by mechanical means by stressing in tensile pull and using the eye-like, loops or enlargements for stressing anchorage. The same constructions can have designed amounts of prestresed preloads induced by chemical reactions, e.g., polymerization.

Various types of apparatus can be used to make endless strand members and include single strand winding devices as well as multiple strands winding and tensioning devices. I use the knowledge of the art as well as that of my own invention and such apparatus is disclosed and claimed in companion divisional application of this application.

Figure 8:
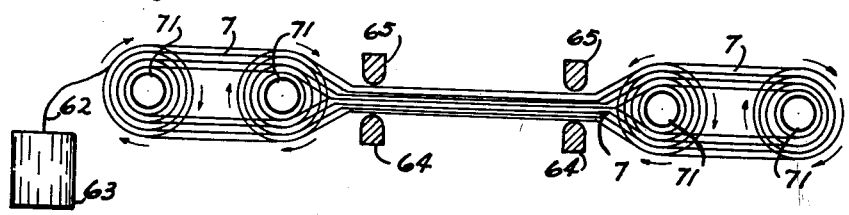
FIGURE 8 is a view showing the method of forming endless cable-form and belt-form forms and constructions with double eyes and anchorages.

FIGURE 8 is a view showing the forming of endless cable-like and belt-like forms of reinforcement having double eyes and anchorage enlargements. Roving 62 is taken from a package of roving or in multiple winding from a plurality of packages or roving 63 and is wound in the fashion shown by the arrows around four shafts 71 and through forming means 64 and 65. These forming means 64 and 65 are adjustable for guaging the thickness of a prestressed reinforcement in the making of the same. When completed to the required cross section and designed strength, the construction is enclosed in an envelope 3.

Figure 9:
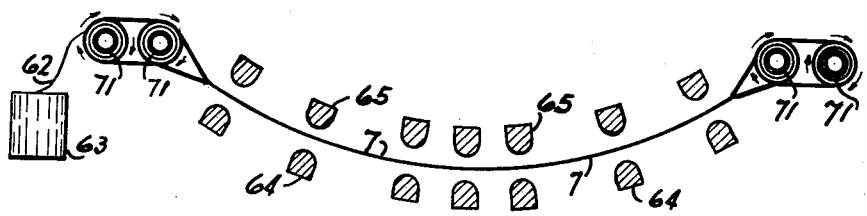
FIGURE 9 is a view showing the method of forming endless cable-form and belt-form reinforcement preformed into curved, true catenary or parabolic curved arrangement.

FIGURE 9 is a view showing the method of forming endless cable-form and belt-form preformed constructions into curved, or catenary or parabolic arrangement or any curved or angular arrangement. Multiple forming means 64 and 65 are spaced to form the desired shape, parabolic or otherwise, and the rovings 62 in and of the strands 7 are pulled therebetween. In the making of tensile reinforcement which stays e.g., in a parabolic shape or in fact any type of reinforcement, it is vital that the fiber arrangement be oriented to secure maximum strengths from the fibers. In multiple strands of fibers arranged e.g., in parabolic shape, when stressed, apply the stresses uniformly against all the fibers since by this invention they are of equal length. In a straight stranded construction when bent into e.g., a parabolic shape, this does not prevail with the strands being under unequal stress and/or strain.

Figure 10:
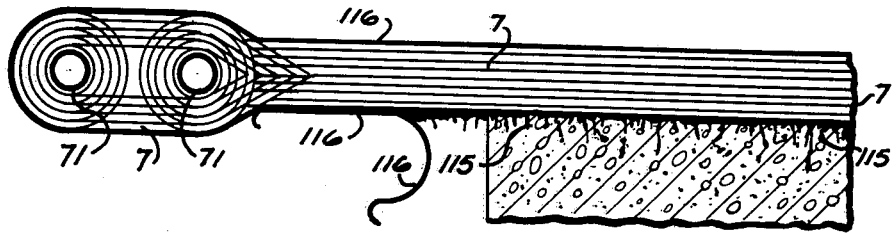
FIGURE 10 is a view of a portion of a cable-form or belt-form reinforcement in process of bonding to a concrete body, that portion of the package enclosing materials having been removed and showing the endless construction of the reinforcement fibers.

FIGURE 10 is a view of a section of a cable-form or belt-form construction in process of bonding to a concrete body and showing the endless construction of the reinforcement fibers. In this example of my invention envelope 116 is pulled or peeled off from the lower face adjacent the concrete surface and allows the sticky bonding resins contained in the envelope to stick the contents of the envelope to the concrete as a convenience in holding fiber mats 2 and fibers 7 and the other materials of the incompleted polymerization reaction until said reaction is completed and the product "cured." The concrete surface 115 is permeated and penetrated by the sticky bonding resins in accordance with designed bonding requirements which can be e.g., 1/32" deep into the concrete, 2" deep into the concrete or even all the way through the concrete and locked in bond on the opposite side. The structural engineering requirement for bond as well, as the "zones-of-strengh" I make in the various concrete or masonry materials in their pre-cast form, are related to the penetration and permeation features of the invention. Various resins, e.g., epoxy resins or polyester resins are used for their specific properties in this use.

Figure 11:
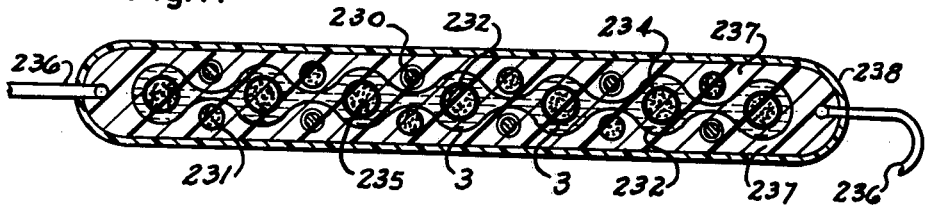
FIGURE 11 is a cross section of a quick opening peel-off type envelope containing the materials of a lamination packaged and ready-for-use as a prestressed reinforcement as a component of a skin-stressed structure or as a component for a joint, said envelope having means for opening said envelope contained in its construction.

FIGURE 11 is a cross-section of a quick opening peel-off type of envelope containing the materials of a lamination, packaged and ready-for-use as a prestressed reinforcement or a joint, said envelope having means for opening the envelope contained in its construction. In the drawing member 232 represents a mass of fibers 7 and/or 2 enclosed in an envelope 3 or just held together by preforming means and in which also are cable-like members 235 of substantial strength disposed at spaced intervals. Plastic resins 237, e.g., unsaturated polyester resin composition, surround and penetrate and permeates members 232 and 235. The packaged envelope construction may contain resistance wires or heating means 230 and also catalysts 231 contained in packaged globules in one of the forms disclosed elsewhere herein. My Patent No. 2,671,158 shows the resistance wire type of construction but this invention shows other types of enveloped construction having other heating means. Envelope 234 can be of a plastic resin that is soluble in the plastic resin 237 or it can be a coating which is soluble. Its purpose is to provide means for handling fibers 7 and fibrous mat 2 without damage to the same fibers 7, and/or fibrous mat 2 and is particularly adapted to fiber glass fibers and strands of fibers or roving, a preferred fiber in many of the constructions I make, but not limited to fiber glass. Member 236 represents a pull cord or draw string or drawn or fine wire which can cut the envelope 238 so that envelope 238 can be peeled off or away from the lamination without delay and quickly. The member 236 can also be used to make openings in an envelope 238 without its being removed so that the bonding resins contained within the envelope can be permitted to exude to the outer face of the envelope and act as sticky bonding resins which adhere easily to concrete bodies. The envelope 238 can be any one of the materials disclosed, as metallic foil or sheet as aluminum laminated to kraft paper and coated with polyethylene resin which makes a heat sealable envelope suitable for the purpose. Many variations of this type of envelope are possible but this example is sufficient for explanation of my concept.

Figure 12:
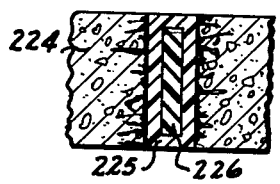
FIGURE 12 is a cross section of a packaged preformed reinforced plastic joint.

FIGURE 12 is a cross section of a packaged preformed reinforced plastic joint having structural load bearing construction and be adapted for prestressing.

Figure 13:
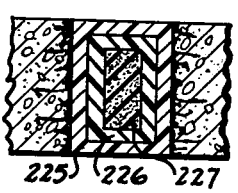
FIGURE 13 is a cross section of a packaged preformed reinforced plastic resin joint having structural load bearing construction and being adapted for prestressing.

FIGURE 13 is a cross section of a packaged performed reinforced plastic joint having structural load bearing construction and being adapted for prestressing and including substantial strength members.

Figure 14:
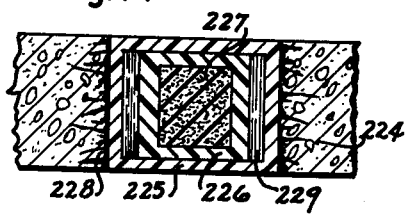
FIGURE 14 is a cross section of a packaged preformed reinforced plastic resin joint having structural load bearing and resistantly resisting and yieldingly resisting components of substantial strengths and a part or all of the construction being adapted for prestressing and being used in combination and conjunction with other prestressed members.

FIGURE 14 is a cross section of a packaged preformed reinforced plastic joint having structural load bearing and resistantly resisting, resilient and yieldingly resistant components of substantial strengths and a part or all of the construction being adapted for prestressing and being used in conjunction with other prestressed members in structural relationship thereto.

Figure 15:
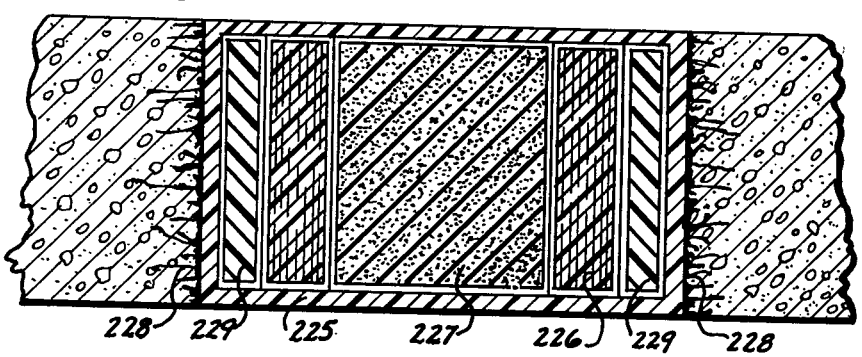
FIGURE 15 is a cross section of a packaged preformed reinforced plastic resin joint made as in FIGURE 14 but having in additional construction substantial amounts of multi-directional reinforcement.

FIGURE 15 is a cross section of a packaged preformed reinforced plastic joint as in FIGURE 14 but having in additional construction substantial amounts of multi-directional reinforcement.

In the drawings of FIGURES 12, 13, 14 and 15 member 224 represents the concrete body next adjacent to the face of the joint. Member 225 represents the envelope and member 226 the reinforcement fibers. Member 227 represents a resilient resistant and yieldingly resistant construction which can have many capabilities, among which is the ability of the joint having member 227 therein to be prestressed to a substantial amount, said prestressed preload being retained in the construction by the plastic resins, binders, bonding agents and other materials disclosed in my inventions.

When the member 227 is made of a cellular but strong material and the cells are partially filled with hydraulic fluid, like e.g., silicone fluid, the joint construction will serve as a hydraulic shock absorber when the member is impacted with impulse-impact loads. This concept is disclosed in my copending application Serial No. 229,852, filed June 4, 1951, a portion of which is now Patent No. 2,850,890, and Serial No. 267,166, filed December 17, 1951, and now Patent No. 2,671,158. The concept was first disclosed in my application Serial No. 210,803, filed February 14, 1951, the application for which was abandoned but the invention disclosed therein not being abandoned. Mechanical means as disclosed can be used in such a joint system as shown in the above applications and combinations of methods of chemical bonding, prestressing and joinery can be used as already disclosed. Member 228 shows the penetration and permeation of the adjacent concrete body by the plastic resins and plastics. A.S.T.M. Laboratory approved tests have shown 2,000 to 3,750 p.s.i. in direct shear when such joints were loaded to failure, the concrete always failing so that no ultimate loading was obtained upon the joinery member itself.

Member 229 can be multi-directional reinforcement, e.g., fiber glass mat or oriented strands with the whole joint construction being packaged in a ready-for-use state.

Of particular reference, I find that the use of sticky bonding resins or rubbery elastomerics capable of supporting the joint packaged construction in any position is a very valuable concept. Factory produced units can thus have the joints attached to one side of a member and ready for bonding the two or more members together.

The hydraulic concept is of particular importance as expansion and contraction forces, earthquake, tornado, flood, and blast loadings have been a problem in the design of structures wherein the joinery does not join in amounts of strength equal to that of the members being joined. Failure occurs in current concepts of joinery because of loads for example, being imposed in shear on materials of low shear value and having virtually no adhesive or unitary bonding as shown in the present invention. Also packaged prepared ready-for-use joinery can be made having strengths in excess of the materials being joined in at least one strength. The packaged constructions of the present invention inherently prevent waste of material and in mass produced quantities are provided at low cost.

Figure 16:
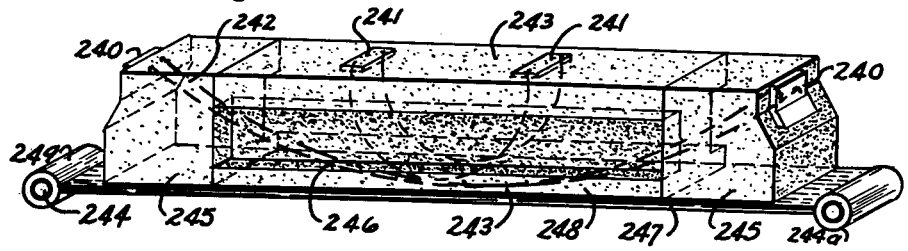
FIGURE 16 is an isometric view of a precast concrete beam made from a precast concrete set of elements and a packaged preformed ready-for-use plastic resin fibrous reinforcement.

FIGURE 16 is an isometric view of a precast beam which is prestressed in accordance with one example of this inclusive invention. In the drawing member 240 represents anchorage and bearing plates to which prestressed cable-form constructions provided as packaged ready-for-use reinforcement are attached. Member 240 can be made of steel, iron, plastics, or any of a variety of materials so long as sufficient bearing value is present in the materials to support prestressed preloads. If I make member 240 out of plastic resin fiber and/or filler laminated combinations, I can supply them as preimpregnated preforms ready to polymerize and cure in bond in place. Member 241 represents another type of bearing of similar materials which is placed intermediate of the ends of the beam or member. Member 245 represents the precast end block of such a beam and member 243 represents intermediate blocks, which may be of an I shape or any other convenient shape. Member 244 represents pull shafts inserted through prepared eye-like members 224a of a reinforcement of a belt-form formed lamination represented by member 247. End blocks 245 and intermediate blocks 243 are placed upon the reinforcement 247 so that the lower flange of the beam 248 is in intimate contact with the reinforcement 247. Cable ways 242 are shown on the interior of the members 245 and 243 in curved catenary or parabolic shape in position for prestressing and anchoring or binding and bonding by permeation and penetration of resins of the package in which they are provided.

Figure 17:
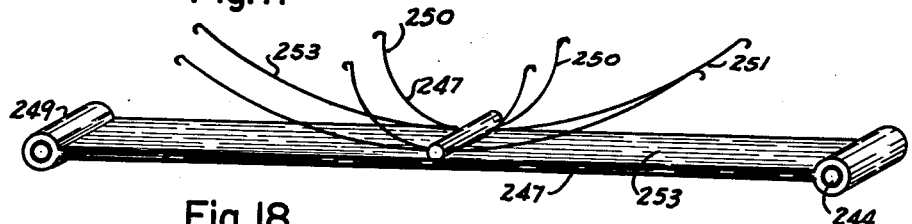
FIGURE 17 is an isometric view of a packaged preformed reinforcement adapted for prestressing comprising a mat and a cable-form construction suitable for use in making a beam similar to FIGURE 16.

FIGURE 17 is an isometric view of a packaged preformed reinforcement adapted for prestressing comprising a mat and a cable-form construction suitable for use in a beam similar to FIGURE 16. In the drawing member 247 is enclosed in envelope 253 and a portion of said envelope 253 also encloses members 250, 251 and member 252. The entire assembly is a reinforcement construction packaged and made of non-metallic materials such as fibers 7 of fiber glass. The fibers 7 are oriented into unidirectional reinforcements in members 250 and 251. Member 252 is fixed within the envelope and can be a member adapted for holding the stranded construction in place and also provide restraint so that the strands can assume a curved, catenary or parabolic shape when the strands are prestressed and fixed in final restraint.

Figure 18:
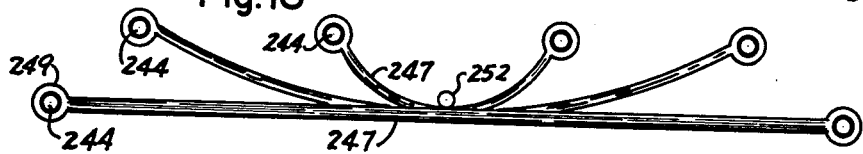
FIGURE 18 is an elevation of a packaged preformed reinforcement adapted for prestressing comprising a mat-like and a cable-form construction, said reinforcement constructions having eye-type end anchorage enlargements.

FIGURE 18 is an elevation of a packaged preformed reinforcement adapted for prestressing at the site of use comprising a mat-like and a cable-form construction, said mat-form and said cable-like constructions having eye-like end anchorages or enlargements. In the features already shown member 244 is a shaft-like member to which the prestressing forces are initially induced and put for transfer into the mat-form reinforcement and prior to the placing of the concrete bodies thereon. Member 247 represents the reinforcement as fibers 7 which are stressed and member 249 represents the eye-like construction at the ends of the reinforcement that are adapted for both anchorage purposes during the prestressing and for final anchorage when the polymerization reactions of the bonding resins and contained resins in the packaged construction are cured. Such a reinforcement can be made to designed lengths and sized to designed strengths with qualities tested prior to bonding to concrete bodies. Decorative-structural values are provided when the envelope contains "finish" materials as well as structural materials thus providing a multi-purpose construction.

Figure 19:
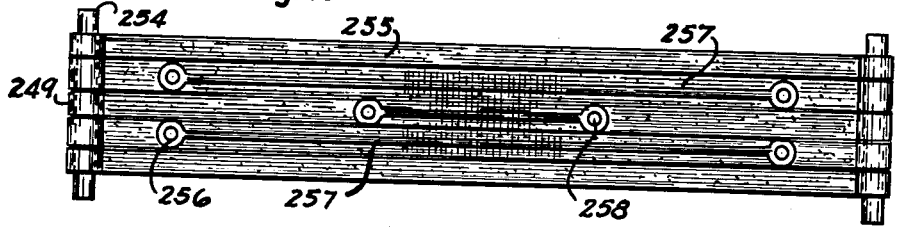
FIGURE 19 is a plan view of FIGURE 18 and shows a portion of a prestressing device passed through the end loops of the end anchorage enlargements, the reinforcement being provided in standardized packaged individual packages adapted for combination.

FIGURE 19 is a plan view of such as above described in FIGURE 18 and in the drawing, member 254 represents a pull shaft and member 249 represents an eye-like body anchorage. Member 255 represents a mat-like construction of multi-directional strength as well as unidirectional strength. Member 256 represents the end anchorage enlargement eye-like forms of the unidirectional cables 257. Attachment at the middle portion of the construction into a unitary body is also illustrated in the drawing, same attachment being an easy means of insuring the use of the entire reinforcement in a unitary member. The enclosing envelopes for such a construction can be any of the envelopes as disclosed herein or other materials that are found satisfactory under particular environments or conditions.

FIGURE 20 is an isometric view of a vessel or tank or drum for packaging materials for lamination in combination and having vessels inside of the tank containing predetermined amounts of materials adapted for formulation and ready mixing. This device is particularly useful in providing the additional bonding resins I sometimes specify in specific constructions and is most advantageously used in joinery formulations. In the drawing the vessel 151 has in its body shell an exterior operated opening device 152 for opening a container 153 which is connected to the vessel 151 and the opening device 152. Another such combination is shown as members 154 and 155. The contents of members 152 and 154 could be catalysts and accelerators adapted for polymerizing resins 159 contained within the vessel 151. On opening port 160 a ready mixed catalyzed resin is ready for use on site. Accurate compounding of formulations independent of field personnel can be done in a centralized controlled factory operation and avoid, effectively, field errors occurring on site. This vessel or tank can be used for any type of product requiring such control on formulation.

FIGURE 21 is a sectional view of a similar tank showing vessels in and of the tank 151 which are opened by external means and a mixing device 158 is also externally operated. Sharp instruments 161 and 162 are used to pierce containers 153 and 155 and whose knife-like parts as 152 and 154 are usable repeatedly when said containers are refilled. Member 156 and member 157 show the contained materials being mixed with the contents of the large vessel 151. Again, this type of vessel as a packaging means insures accurate compounding for various uses of the present invention.

Figure 22:
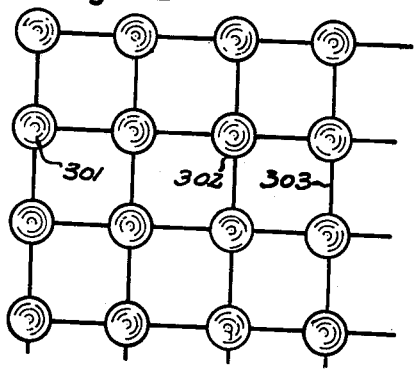
FIGURE 22 is a view of a packaged catalyst embodiment of the invention preformed in a suitable envelope in Chain globule type packaging.

FIGURE 22 is a view of packaged catalysts preformed in suitable envelope e.g., polyethylene resin envelopes or gelatin capsules or glass amples, and made up in chain-globule types. In the drawing, globules of catalyst 301 which are enclosed in envelopes 302 are interconnected in chain fashion by one of several means, one of which could be a fiber glass string or strands, or cotton string, or inorganic fibers or organic fibers, or plastic resin tubes or rods of pliable resin bodies, string-like or chain-like in form. Many suitable materials are available for making these chain-like bodies which can be single string-like members or can be multiple chain-like members as shown in the drawing. A preferred construction is made by filling a soluble plastic tube that is filled at spaced intervals with catalysts adapted to aiding in the polymerization of plastic resins, e.g., polyester resin compositions said soluble plastic tube being chain-like in appearance and being of a plastic, e.g., polyethylene, that will melt at a temperature above ambient and below the heat of polymerization of the plastic resins in which the catalysts are placed for mixing and combining. Polyethylene can be provided which melts around 175° to 180° F. which is adapted to the invention as polyester resin of the type sometimes used in this invention cures at about 250° F.

Another preformed catalyst in this form is made so that the envelope package 302 is of a material that can be readily crushed or ruptured and thus release the enclosed catalysts 301 into the plastic resins. Glass ampules can be thus used. Another material for making envelopes 302 can be one that will release the catalyst by osmotic action. The globules of catalyst can also be released from envelope 302 by using the chain forming means such as the string above mentioned as a pull string that cuts through or tears the envelope and thus disperses the catalyst into the resin mixing the same as the string is pulled.

Figure 23:
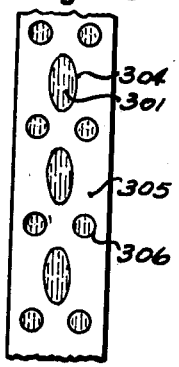
FIGURE 23 is a view of a packaged catalyst preformed in an insoluble envelope suitable for perforation for emiting the catalyst at a desired time, the same being a tape-type globule construction.

FIGURE 23 is a view of a packaged catalyst preformed in an insoluble envelope adapted for perforation for emitting the catalyst at a desired time, the same being a tape-type construction. In the drawing, catalyst 301 is enclosed in an insoluble envelope which is attached to a tape made of a material that serves as reinforcement and conveying means for the catalyst 301, and if desired, also serve another functional purpose in the laminated construction of which it is a part. Catalyst 301 can be packaged in capsules and the capsules placed in an insoluble envelope at spacings to insure an even distribution of the catalyst when released into resins 21. The envelope may be heat sealed to accurately locate the catalysts used. The capsule envelope 304 may be an insoluble material when contained in the resin that requires pressure or rupture for it to release the catalyst contained. The tape 305 may be coated with an adhesive material that will attach the tape to components of the laminations, for example, to the fiber glass reinforcement of a particular layer of a laminate, or to the concrete surface which is to be reinforced and/or decorated by a laminated construction. Capsule 306 may be a catalyst or it may be a catalyst accelerator which affects the polymerization reaction with respect to any one of a number of desired results, such as e.g., increasing the speed of a reaction and at the same time controlling exothermic heat. The tape may be in narrow strips as shown in the drawing or it may be in wide strips that are as wide as the member which makes up the reinforcement. The globules of catalyst materials can be activated within an enclosed body such as a concrete beam to aid in polymerizing a reinforcement contained therein, e.g., an unsaturated polyester resin composition or an epoxy resin composition, as well as be activated upon a surface of such a body.

In reinforcing precast slabs already erected into place envelopes containing non-metallic reinforcement, e.g., fiber glass strands, or metallic reinforcement, e.g., steel cables, may be applied to the precast slabs in combination. The tape-like construction carrying the catalysts may serve as an initial supporting means and be attached by means of an adhesive coating, prepared, packaged and ready for use on site carried on the tape and applied with the pressure of a workman's hands. Such a method insures accurate locating of a prestressing laminated construction with a minimum of time when it is applied to a vertical or non-horizontal surface or even to a horizontal surface. The slabs of precast concrete may be factory finished with laminated constructions a part thereof and still require additional field reinforcement and this means provides for this contingency or need. Tape 305 may also be a fiber reinforcement of the laminate and have two specified uses with the same material.

FIGURE 24 is a view of still another example of a packaged catalyst preformed in wire type globule assemblies, said wires also being means for the generation of heat which first melts the globule envelope enclosure and then aids in the polymerization of the surrounding resins by supplying heating means as resistance wires in a suitable electrical circuit. In the drawing, member 307 represents an electrical current carrying means such as an insulated electrical wire or an uninsulated electrical wire. Member 308 represents a catalyst material packaged in an envelope 309. Disclosures made herein with respect to catalysts are applicable to this variation and designed construction.

Figure 25:
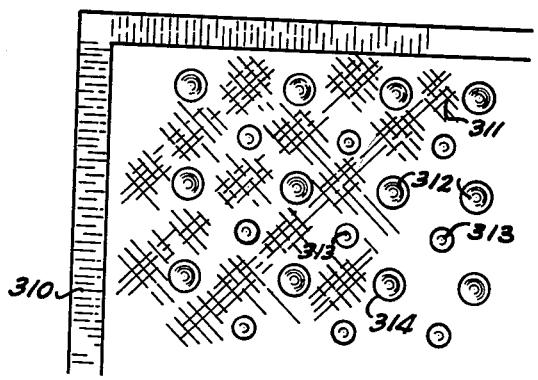
FIGURE 25 is a sandwich type globule assembly of packaged catalyst preformed in an envelope and suitable for dispersion of the catalyst into the surrounding resin by pressure means or by osmosis.

FIGURE 25 is a view of a sandwich type globule assembly of packaged catalysts preformed in an envelope and suitable for dispersion of the catalyst into the surrounding resins by applying pressure means to spread the catalysts into the resins and also as a sandwich type globule assembly of packaged catalysts that can be dispersed by osmotic means or the process of osmosis. In the drawing, member 311 represents the union of two faces of the enclosing envelope by means such as heat sealing in spaced regularity which retains catalysts 312 and e.g., accelerators 313 in desired position. Envelope 314 containing a catalyst can be one of the several forms already disclosed. The entire sandwich construction can be heat sealed 310 or it can be crimped, glued, stuck shut or fastened together by any one of a number of means. Such an envelope can be rapidly made on machines known and suitable for packaging these products. Disclosures made herein with respect to catalysts and accelerators and envelopes and also reinforcement by fibers and fabrics are applicable to this disclosure.

FIGURE 26 is a view of another method of using a preformed envelope type enclosed cable form construction wherein the deformation of the envelope and its contents prior to polymerization provides additional physical bond to the adjacent concrete. An enveloped reinforcement which envelope is insoluble in water can be layed into place in a concrete form and in the placing of the concrete the enclosure of the reinforcement, the said envelope and its contents be slightly or substantially deformed so that when the resins enclosed within the packaged construction are polymerized, the deformations in the surface of the envelope will provide additional anchorage and securement of the reinforcement when it is put to work in the carrying of its designed loadings. The catalyst used to activate the polymerization reaction can be any of the types above given. In the drawing, member 325 represents a concrete body which is poured around an envelope 330. Member 326 represents one form of catalyst preform in chain-globule type while member 327 represents fibers and stranded reinforcement, e.g., fiber glass unidirectional fibers. Member 328 represents a resistance wire for heating the mass and member 329 represents a deformation in the surface of the envelope by which additional bond and anchorage is secured in the resulting construction. The drawing shows the envelope in an uneven alignment, that is, not in a straight line as one would ordinarily think of a short piece of concrete reinforcement. This unevenness is to show that not only is the surface of an envelope deformed in concrete placement but to an extent controllable by the rigidity of the envelope, so may the reinforcement contained in the envelope itself be deformed in place by the concrete and thus gain anchorage.

FIGURE 27 is a cross sectional view of a packaged preformed ready-for-use on-site construction. In the drawing the envelopes 315 and 320 made of materials disclosed herein contain plastic resins 316 which permeate and surround fibers, e.g., fiber glass reinforcements 317 which are shown in two layers and contained in an envelope which is heat sealable 319 and which envelope melts at a temperature below that required in the polymerization of resins 316. Enclosed between the two layers 317 at spaced intervals a catalyst 318 is secured in such spaced intervals by the heat sealed enveloped construction 317. Envelope 315 may be made of a resin that provides decorative-structural qualities to the resulting laminated prestressed concrete construction. Envelope 320 may be made of a resin coated aluminum and paper packaging material that upon perforation and bonding to a concrete construction forms a heat reflective construction that is securely bonded to the adjacent concrete. In my concept of this invention the envelope is multi-purpose. It can be a decorative means at the same time that it can be a structural means with one and the same combination or formulation serving both purposes or serving multi-purposes.

FIGURE 28 is a view of spaghetti-like catalysts placed at random in which the catalyst 321 is enclosed in envelope 324. Member 322 may be a catalyst or an accelerator packaged as disclosed herein. Member 323 could be strands of fibers or resin strands that are pulled in the forming means so that on setting they become string-like or tube-like with the enlarged portion 324 containing the catalyst. These catalysts can be activated by solvents dispersed in the resins, by heat, by pressure means, by vacuum pressures, by weight pressure such as a concrete body crushing the members 342 and releasing member 321 when the concrete body or masonry body is prestressed or when it is placed upon a platen or forming bed. The envelope can be of sufficient strength to handle easily in processing and be able to withstand shipment and temperatures at the will of the designer. This drawing shows one spaghetti-like means. Long tube type spaghetti-like means are similar and may contain a continuous charge of catalyst in the tube or may contain catalyst charges spaced at predetermined intervals.

FIGURE 29 is a cross section of a laminated plastic-resin fiber glass reinforced tube made in the flat and inflatable into a vessel or tank or the like. The plastic envelope 3a and 3a' being made in two layers between which is located fiber glass 2 impregnated and permeated by plastic-resin 21. A spaghetti-like pliable container 4 containing catalyst 5 is adapted upon applied pressure or perforation to expel catalyst 5 into the resin plastic 21 to be dispersed and comingled therewith. Valve stem 11 serves for inflating the inner core 3a. Pressure flanges 8 and 10 are bonded to inner and outer walls of envelope 3. A pipe closed by screw cap 17 may serve as an inlet or outlet instead of or in addition to the valve stem 11. Obviously, many different types and kinds of such means of inlet and outlet are available.

FIGURE 30 made with the device of FIGURE 29 illustrates one type of vessel or tank. The port 13 is securely fastened to the plastic resin fiber reinforced envelope, and the latter integrated as a liner in a tank or vessel, the exterior face of which is also covered with a reinforced plastic layer 16. As packaged ready-for-use construction in a polymerizable state this, when polymerized and cured, closed vessel has many uses.

FIGURE 31 shows a cross section of a concrete pipe or circular body externally laminated with a prepared plastic resin envelope 3 containing plastic resins 21 and fiber glass reinforcements 2, catalysts 5 and containing resistance wires 19. If I use other means of aiding polymerization than incorporated heating means like wires 19 these are not included in the construction. The flat packaged envelope 18b shown in dotted line is placed over the outside of the concrete pipe and pressed against the body to make the circular enclosure. The outer envelope 3b' can be made of a film such as cellophane or a plastic having substantial shrinkage when heated to a predetermined temperature so as to exert substantial pressure upon the laminated structure during "cure" and polymerization. Particular reference is made to the bonding and prestressing of the concrete 1 by the penetrating and permeating and fixing the resin plastic 21 with finger-like tentacles 78 extending within the normal pores of the concrete 1 which are converted by curing the resin plastic at a predetermined temperature to a strong reinforcing structure. On completion of the cure the prestressed concrete body is completed. The concrete is advantageously preheated and the retained heat kept in the concrete used to assist in curing the plastic resins. Additional prestressed preload can be obtained by the heat placed in the concrete by the inducing of additional prestress when the concrete shrinks to room or ambient temperature. The packaged ready-for-use reinforcement in its packaged form can be of any convenient size and thickness, e.g., ⅛″ thick or even 1″ thick more or less, and provide a very substantial reinforcement. Large conduits can thus be strengthened. The features of FIGURES 29 and 30 advantageously can be used in the construction of such conduits.

FIGURE 32 shows a cross section of a concrete pipe or similar circular body 1 and which is internally laminated and bonded with a prepared plastic envelope 3b containing plastic resin 21 and fiber glass reinforcements 2 and also containing electrical resistance wire heaters 19. The envelope 18 received flat as shown in dotted lines is inflated as shown in FIGURE 29 to make the circular lined body. The use of an envelope which encloses a sticky bonding layer which can be removed prior to insertion into the pipe and which layer can become sticky when a hot air blast raises the temperature within the pipe provides me with a rapidly placed and surely bonded plastic resin fiber reinforced pipe lining. Preimpregnated fiber glass mat 2 without or with fiber glass strands 7 and inclosed in a body of unsaturated polyester resin composition with a surplus over that required for complete impregnation of the glass fibers is one resin and fiber system I use. As an example, but not limited thereto, a 60% resin composition of which about 40% is required in the impregnation of the fiber glass and which leaves about 40% in the fibers when cured and leaves 20% of the resin for permeation and penetration into the body of the concrete. A 40% glass fiber ratio of a total packaged composition thus when cured provides a 50/50 ratio of glass fiber to plastic resin in the finished product. This ratio is a matter of structural design and materials engineering design because e.g., each concrete must be studied for its end use characteristics and the zone-of-strength of integrated and bonded concrete be designed for a type and kind of structural bond related to the needs of the final structure. The preparation of the enveloped construction being done on a mass production basis can provide a low cost means of pipe reinforcement.

FIGURE 33 illustrates a military or exploration use of the invention. A parachute type plastic resin-fiber glass personnel protective construction which may be dropped or pushed from an airplane or missle or rocket is shown. The construction is packaged in flat packages 96 and contains all the elements ready for assembly at the place of use comprising the inflatable plastic resin 21, fiber glass reinforcing 2 and 7, in a plastic envelope enclosure 3. It may contain the food supplies, ammunition, water, medicine, radio, radar, Geiger counter and other required items. The parachute 89 connected to the body by suitable fastening can be of a camouflage type and conceal the protective construction on the ground by covering same through control of parachute cords 91 from the interior of the construction by pulling said parachute about the vessel. Entrance 104 and exit 104 and view port 104 is made through suitable gasketed ports as shown.

Variations as suggested by military necessities or other uses will come about but the essential device is an inflatable device of substantial strength made of plastic resin 21 fiber reinforced and strengthened by mats 2 and fiber strands 7, compactly packaged into a construction which when prepared for use in a plane or other carrying means by actuating the means 99 not shown for inflating the construction makes it into usable military form, and when the electrical means or other means are actuated, polymerizes and cures the plastic resins 21, fixing and curing said resin 21 and fiber glass 2 and 7 and other flexible reinforcements into a strong protective military personnel structure. By using quick curing means and plastics practical protective structures can be dropped or pushed from carrying means by parachute with personnel within the same or can be dropped independently of personnel as required.

The device may be made with a landing skirt flared out so if dropped on water the skirt acts as a pontoon or boat. The shape may be bullet-like or round or egg-shaped and it can take advantage of known laws of aerodynamics for its best designed shape. If personnel are dropped within such a construction many can be saved from casualties from small arms fire because such a construction can deflect much fire power when made of resin plastics 21 and fiber glass reinforcements 2 and 7, especially if made in thicknesses of the order of one-half inch to one inch and more especially when backed up with concrete laminations or other materials as herein disclosed. The resilient resisting and yieldingly resistant constructions disclosed in my copending applications of record provide constructions that very effectively live under large amounts of dynamic loading and this disclosure can and does include resistance features to dynamic loading.

FIGURE 34 is a ground version of the construction described above in FIGURE 33 with an added element of a shock absorbing impact resisting connector attached thereto and fastened to a poured concrete base 103 set in a fox hole or other convenient site. Impacts will move the resistive structure in any direction by means of the connector 101 which is more fully explained in my copending application Serial No. 582,614, filed April 25, 1956, and now a portion of which is Patent No. 2,950,576, as a continuation-in-part of my prior application, Serial No. 211,011, filed February 15, 1951, the specification for which is now abandoned but not the invention, and Serial No. 211,705, filed February 19, 1951, also now abandoned as to the specification but not the invention.

The egg shaped structure is a very strong elastic body. Witness any fowl's egg which for its size and make-up is a very strong structural unit. The outer shell frequently can be broken to find the inner membrane intact, especially in fresh eggs, which membrane while flexible still is resilient and requires considerable pressure to break it. The above described structures utilize nature's proportions to achieve a relatively simple construction which is made by the packaging method and inflation of said packaged construction as herein described.

FIGURE 35 is a view of such constructions in a deflated condition representing the construction in a packaged form with envelope 96 enclosing all elements packaged within the construction.

The above figures show illustrations of structural concept but are not limiting of such concept as obviously the constructions mentioned in the objects of this invention may require many other structural designs and forms. Packaged reinforcement is applicable to use at the site of use for many building constructions, bridge constructions, military and non-military protective constructions, both as housing and as fortifications, piping and conduits of any size and especially large sized conduits of the order of two feet in diameter to e.g., twenty feet in diameter, in tunnel construction, mine support constructions, tanks, vessels of many kinds and shapes, electrical construction constructions and particularly underground vaults and tunnels, piling, docks and wharfs and wharfage subject to impact-impulse dynamic loadings or sea water deterioration of concrete, airfields both in slabs and in construction of hangers and buildings, and in fact alone or in all places were concrete is used in construction or where suitable porous bodies are so used. The advantages of reinforcement fibers such as fiber glass fibers, slivers and strands in being placed in positions of required strength much more easily than other materials in achieving maximum efficiency of strength from orientation of the fibrous material provides structural design possibilities limited only to the sound engineering concepts and imagination of the designer. Further, with the many plastics that are available architectural, esthetic and decorative embodiments are available at one and the same time that reinforcement is accomplished and in part or in whole with the same materials. Also because of the characteristics of plastic resins many special surfaces and formulations can be made to meet exacting specific use conditions. I have found that particular characteristics of resins, fibers and especially fillers provide novel construction features of the present invention when provided in packaged and ready-for-use condition.

The plastic resins that may be used are many and varied but certain characteristics such as waterproof qualities, acid and alkali resistant qualities, elasticity, freedom from self generated internal strains that determine length of life or that deteriorate progressively, termite, insect, fungus, vermin and bacteria proof qualities, or decay brought on by bio-chemical means, maintaining integrity against oxidation or light or other rays, free chemicals, gases and the like are desirable in part or in whole or in combination as required to complete the designed needs of the constructions.

Using the polyester resins as an example and recognizing that other resins must be considered in the same manner the ability to "tailor-make" resin structures in accordance with the knowledge of the chemistry of the art, makes possible many controllable features in the present invention. The structural considerations of e.g., polyester resin-bulk filler-fiber reinforced compositions generally include considerations of the make-up of the composition comprising its acid components, glycol components, the molecular weight of the polyester, the catalyst system, the inhibitor system, the cross-linking agent, the bulk-filler materials and the fiber reinforcements. The basis for such considerations of structure comprise physical attributes related to mechanical strength, flexibility, viscosity, chemical resistance, flame resistance, melting point, electrical properties, crystallinity, thermal stability, clarity and light stability, water or other solvent stability, air-drying properties, curing characteristics, adsorption and absorbtion features of the materials of composition and the effect of the variation of the ingredients used in the commercial production of resins.

The most important unsaturated polyester materials comprising unsaturated dicarboxylic acids that are used are maleic acid (anhydride) and fumaric acid which may have alpha, beta unsaturation. Fumaric acid polyester resin while not as easily prepared as maleic acid polyesters are more crystalline. The difference is apparent in polyesters prepared from glycols which possess a symmetrical structure and which are free from oxygen bridges. Such glycols include neopentyl glycol, ethylene glycol, trimethylene glycol. If ethylene glyco is used, e.g., the fumaric acid polyesters tend to crystallize from styrene solution on standing, but the maleic acid polyesters are more likely to be stable in fluid form. This property of fumaric acid polyesters in styrene in being paste-like consistency provides a useful polyester resin for this invention because of the thrixotropic features such resins possess. The fumaric polyesters are also made into free-flowing granules which I find useful. Fumaric acid-propylene glycol polyesters have a higher heat distortion point than their maleic acid counterparts. Polycarboxylic acids having a functionality greater than two like aconitic acid, may be added to reaction mixtures to obtain polyesters with increased viscosity in the liquid state and increased resistance to hydrolysis. Adducts of maleic anhydride with certain conjugated dienes have been reported as being reacted with glycols to form polyesters. Endomethylene tetrahydrophthalic acid from cyclopentadiene and hexachloroendomethylene tetrahydrophthalic acid from hexachlorocyclopentadiene (Hetron Resins by Hooker Electrochemical Co., Buffalo, N.Y.) provide two features useful to me in the invention in that the first used in polyester resins improves air-drying properties and the second which contains over 50% by weight of stable chlorine makes excellent flame resistant compositions of resin.

Increased strengths, higher melting points and other advantages are made by the substitution of e.g., isophthalic or terephthalic acids for phthalic anhydride. Cured isophthalic resins have higher heat distortion temperatures, better impact and flexural strengths and properties than similar resins prepared from phthalic anhydride. The resin chemist "tailor makes" the desired structural or finish characteristic sought by me in any particular resin composition design. The packaged ready-for-use products of this invention require many considerations particularly in storage and handling features of prepared packages. The selection of resin to be used is a vital consideration not only from the storage standpoint but from the resulting strengths, etc., required of the end structure or product. The design of resin structures in the present invention is done by blending known commercial resins as well as by specifying to manufacturers of basic resin products the nature of properties needed in any given designed entity. My companion copending applications bring out features of this in the examples given. The preimpregnated fibrous constructions I make advantageously use crystalline type polyesters such as fumaric acid-ethylene glycol polyesters which because of their solid state are sufficiently inhibited to be mixed with a catalyst and used for impregnating glass fiber or mat that can be stored several weeks or months and then be molded at elevated temperatures.

In other examples of the invention, resins not adapted to pre-catalyzation are packaged as impregnated into glass fibers and packed together with the catalyst packed constructions disclosed herein. Specialized packaging techniques like "blister" packs, vacuum formed packages, heat sealed packaging, and other means known in the art are made use of, each method as adapted to a specific construction of the invention. Packaged catalysts, accelerators and promoters also are used in particular combinations. Fibrous reinforced packaging also finds use in the invention to make multi-purpose use of the materials with one imput of labor on-site use.

It is to be understood that it is recognized that although some of the embodiments and examples set forth herein are substantially identical with those given in companion cases covering related but distinct inventions, it will be understood by those versed in patent law and practice that this is because there practical articles and methods embody several inventions, each or some of which can be used with or without the others, i.e., some of the inventions thus used together may be considered optional or can be replaced by alternatives.

The following examples show features of the present invention but over a period of research and invention of several years leading to the present invention I have made many variations and formulations adapted to the practice of the invention. Because masonry products and concrete products are of such diversified nature it is to be understood that modifications and adjustments can be and are made in the mass production of the products of the invention. Of interest and of fact is the rapid development of improved resins, catalysts, fibers, colors, pigments, fillers and packaging materials adapted to the present invention. No limitation is implied or intended in the use of materials of the invention available now or in the further development of useful materials.

*Example I*

In this example I make a stranded ready-for-use cable. A plurality of strands of fiber glass roving are wound on a winding machine, in this case, 100 rovings, looped around supporting pins as shown in FIGURES 1, 2, and 3 and on the machine shown in my companion divisional application. With the fibers 7 in a taut condition to keep the available strength uniform for later use I next cover the strands with an envelope, e.g., polyethylene slipping the strands into the envelope by removing one end of looped strands from the pin support and carefully pulling the envelope over it. If I want to use the strand shortly I mix a catalyzed mixture of polyester resin composition as follows and pump the composition into the polyethylene envelope after sealing one end of the envelope so that I have an impregnated mass of fiber 7 with e.g., a ratio of 65% fiber glass to 35% resin:

| | | |
|---|---|---|
| Selectron #5003 (a Pittsburgh Plate Glass Co., polyester resin) | 70 parts | 1814.4 grams. |
| Selectron #5208 (a Pittsburgh Plate Glass Co., polyester resin) | 30 parts | 200.0 grams. |
| Styrene Monomer | 200 grams | |
| Luperco ALC (a benzoyl peroxide in tricresyl phosphate, Wallace & Tiernan Co., Lucidol Div., Buffalo, N.Y.) | | 90.0 grams. |
| Cab-O-Sil, a finely divided colloidal silica | | 20.0 grams. |

The resin composition being mixed and catalyzed has a "pot-life" of about 24 hours at temperature not over about 65° F. For a longer pot-life the storage of the packaged reinforcement at e.g., 40° F. permits several months in storage. Improved catalyst and inhibitor systems wherein the catalyst is stable at ambient temperatures and will "cure" at elevated temperatures, e.g., 250–260° F. is available in the art.

For convenience in some constructions I cure the ends of the cable which comprise the looped portions to make a strong bearing out of the looped enlargement so I can more easily use it with apparatus for prestressing prestressed preloads into the cable in its specific use.

*Example II*

In this example I make a belt reinforcement adapted to prestressing as is shown in FIGURE 7 but include in the reinforcement a decorative-structural embodiment adapted to make a wearing surface and colorful architectural finish. The first member comprises an envelope material 3 made of an aluminum foil laminated to a kraft paper which is laminated to a polyethylene film of a heat sealable type. The foil-paper-polyethylene envelope 3 starts out as a roll of material on a shaft at one end of a make-up table and is drawn from the roll which e.g., is 10″ wide to the desired length of the desired package, in this case 12 feet. The table top can have a slight depression in it to receive the envelope and I find it convenient to make it narrower by about an inch on either side so that the envelope can be formed into a trough-like unit for processing. I place the foil side up and treat it with a mold release but not at the edges which I want to later heat seal. The first layer of reinforcement comprises a sheet of surfacing mat which has been completely filled and with a surplus of clear reinforcing resin like in Example I. This layer conveniently is pulled from a roll at one end of the table through a dip tank and over gauge rolls to measure the resin content and out onto the foil surface and evenly smoothed and placed so no wrinkles appear. This surfacing mat can be 0.010 mil to 1.5 mils, any thickness adapted to the purpose. On top of this layer I next laminated the bulk-filler and spread out on the top of the surfacing mat about ⅛″ thick layer of thixotropic polyester resin composition comprised of the following:

| | Parts | Grams |
|---|---|---|
| Selectron #5003 | 70 | |
| Selectron #5208 | 30 | |
| Styrene monomer | 100 | 1814.4 |
| Luperco ATC | | 200.0 |
| Calcium Carbonate 325–400 mesh—precipitated | | 90.0 |
| Calcium Carbonate—complex—"Perdonyx" | | 100.00 |
| Silica—30 mesh—Crystal Silica (ocean sand-washed) | | 1134.0 |
| Ferro yellow pigment | | 436.6 |
| American Cyanamid Co. white paste TiO₂ | | 5.0 |
| | | 15.0 |

Depending upon the temperature of surrounding air and the humidity I add finely divided silica, colloidal silica, like Cab-O-Sil to the mix to get the non-flowing "non-soupy" characteristic to the mixed resin composition so it will "stay put" on the packaging material. On top of this layer I lay a layer of 2 oz. treatment #19 Owens-Corning Fiberglas Co. fiber glass mat which has been saturated by being run through the fiber glass mat dip tank and it is thus impregnated and filled with a resin composition like that of Example I or some other kind of the present invention. The 2 oz. mat is embedded on the bulk-filler layer and comingles with it. On top of this layer I next place a plurality of stranded reinforcements as made in Example I but without the polyethylene envelope. In this example I plan to prestress preload the stranded reinforcement prior to combination with the concrete components which will form a reinforced concrete beam so I leave the end enlargements exposed and through which I run a shaft for attachment to the pulling and stressing device, e.g., a hydraulic jack and apparatus as shown in my companion divisional application. The number of strained reinforcements is a predetermined amount of tensile reinforcement provided in accordance with a structural design. The placement of this stranded reinforcement in this example is lengthwise of the intended beam. In other constructions the stranded reinforcement can be placed at acute angles or obtuse angles to the length of the member or of the width of the member depending upon the structural engineering requirements of the designed unit. In either case the tensile reinforcement is laminated to the mat reinforcement in layer fashion and embedded in the resin composition which lays above the mat. It is well to inspect the combination of materials making sure that enough resin composition is present to cover and embed the fibrous reinforcement. On top of the last layer of fibrous stranded reinforcement I next roll out and on top of the layer, a packaging cover comprised of the same material as the first packaging layer placed on the table or in this case I placed a thicker polyethylene film over the materials of the laminate and heat sealed this film to the underlying polyethylene-kraft paper-foil packaging material, this being done on the edges on the one inch portion left for this purpose. The ends were heat sealed shut the same as the sides and I had a completed packaged ready-for-use on-site decorative-structural embodiment of the invention. In a mass production set-up many units can be made up in an organized fashion and economically and taken to the site of a construction, for example a building site or a bridge, and the packaged construction then united with a precast concrete beam or a plurality of concrete blocks used to form a beam by bonding, integrating and laminating the packaged reinforcement and decorative surface to the concrete. By reason of the aluminum foil-paper-polyethylene packaging composite the concrete laid on the reinforcement has a smooth finished surface after the polymerization and "cure" of the resin composition to the concrete. Since the present example is one using a heat convertible resin composition, the benzoyl peroxide catalyst used requiring heat to activate the polymerization reaction, I use a heated platen apparatus upon which to place and cure the member.

When the plastic resin composition fiber glass reinforced and decorated concrete is completed, the packaging may be left on until it is placed in its final end use or it may be pulled off as soon as the curing is completed. In this case I complete a beam from the placing of the package to completion in thirty minutes.

*Example III*

The manufacture of prestressing cables of fiber glass reinforcement for use in constructions of my invention wherein I want to use a thermoplastic resin is made as follows:

Fiber glass roving is oriented and aligned in a taut condition as shown herein and wound until I have the required cross-section of reinforcement e.g., 50 pieces of plastics reinforcing roving comprising a product made by combining 60 ends of 140's continuous strand, treated with a chrome complex sizing and wound without twist or binder yarn. This is a standard roving and comes for general use in ball-type packaging of about 35 lbs. per package and contains about 235 yds./lb. average. The strands separate freely when cut and dropped from a height of six feet. I consider the ability to separate important because I find that for structural reinforcement it is important to cover substantially completely all the surface of each fiber, especially the outer fibers, of a construction to protect against deleterious substances.

I next prepare a resin composition as follows:

| | Parts |
|---|---|
| Polyvinyl chloride polymer (Diamond PVC–50) (mfg. by Diamond Alkali Co., Cleveland, Ohio.) | 100 |
| Paraplex G62 (mfg. by Rohm & Haas Co., Philadelphia 5, Pa.) | 5 |
| Stearic acid | 0.5 |
| DIDP (Di-iso-decyl-phthalate) | 35.0 |
| BDP (Butyl decyl phthalate) | 16.0 |
| Cadmium Stabilizers (Harshaw 2V4) | 2.0 |

To improve the resin composition I can add:

| | |
|---|---|
| DOP (Di 2-ethyl hexyl phthalate) | 35.0 |
| DOA (Di 2-ethyl hexyl adipate) | 10.0 |

The above formula is like that used for making a garden hose and is a tough strong envelope material in my use. Being an extrusion compound it can be extruded as a hose and slit and slipped over the fiber glass roving to cover it or advantageously it can be heated to a fluid condition and the fiber glass roving being pulled through a bath of the fluid resin can be completely impregnated and covered. The cable can be finished by extruding through apparatus known to form a smooth finished cable. It is important to maintain centering in this operation so that an even layer of resin composition is formed as an outer protective layer about the fibers. The thickness of this layer is also important in that I design a predetermined quantity for penetration and permeation of the concrete or other porous bodies which I reinforce with the cable, e.g., I have used a wall section of the resin composition of $3/16''$ to $1/4''$, but not limited thereto which I bond to the concrete by means.

One such means is to make the cable as above and incase it in another envelope made as follows:

Resistance wires in an amount to provide 350–400 degrees of heat evenly over a given surface are embedded in the wall of an extruded hose like member which is placed over the above manufactured cable. The cable enclosure hose can be of the same material so that upon the heating of the mass to a fluid state inside of a cable-way in a prestressed concrete member the entire mass bonds to itself and to the concrete when heated to its melting temperature. In casting of precast concrete members I can and do sometimes place the first layer containing the resistance wires in the form and pour the wet concrete mix about them and thus have a ready-for-use cable-way when the concrete is cured. When combination reinforcement is desired that is a steel cable or rod and fiber glass stranded reinforcement wherein the 3% elongation feature of the fiber glass reinforcement is required in an impact-impulse load resistant structure, the steel rod can be used to provide the heat whereby the resin composition is melted. In combination thermal prestressing of the steel also can be done as taught by Billner in his Patent No. 2,414,011 by the use of the steel as the resistance element and from this heat bond and integrate the resin composition by penetration and permeation into the adjacent concrete. By packaging resin reinforcement of the type herein disclosed, zones-of-strength having particular structural engineering properties can be made at the same time that the reinforcement is being bonded by the heating means of this example.

The formula given is only examplary as I have many other formulated specific purpose resin compositions approximating the properties of the above. Of particular importance in this use of the invention is a careful check on the chemical constituents of the concrete or masonry member to be sure that the resin composition used is compatible or that self deteriorating conditions are not created by the union of the materials made.

Obviously the cable can be made in various shapes, oval, flat, square, rectangular, T-shaped, L-shaped, etc. When I want to use it in a curved fashion as e.g., a parabolic or catenary curve, the forming means herein disclosed is used so that an even cross-section of cable strength is achieved. The values to be derived from a resilient bonding of the fibers also insures a full measure of practical use of the inherent strengths of the fibers. While fiber glass is generally preferred for it seconomy and strength, other fibers like e.g., Dacron, Orlon, Dynel, sisal, cotton, aluminum-silicate (Fibrafrax), asbestos, and ceramic fiber can be used alone or advantageously in combinations which provide various features. By the packing of such components low cost mass produced products are made and which can be used only because they are packaged in many of the construction designs of the present invention.

In hospital and clinic construction I have found that it is desirable to provide bacteriostatic and fungistatic "germ-fighting" characteristics to plastic resin constructions of this invention. Vinyl film materials useful in packaging and in the end product construction can contain "Corobex CAV" a product of Bex Industries, Inc., New York, N.Y. One part of Corobex to 500 parts by weight of vinyl film is added to the plasticizer used in the vinyl compounding. "Corobex CA" in the ratio of one part to 1000 parts by weight can be used in rubber compounding. Other resins and rubbers can be similarly treated with known bacteriostatic and fungistatic agents. The packaging materials thus made may be used in many places.

*Example IV*

In this example I make a preformed, shaped ready-for-use "preform" packaged on a mass production basis. In FIGURES 16, 17, 18, and 19, I show embodiments of the invention wherein concrete members like beams and beams are reinforced by plastic resin fiber glass reinforced laminated surface construction layers. In FIGURE 16 I show a pressure means provided by the concrete component of the beam for laminating such layers of reinforcement and decorative structural embodiments to concrete components.

The preparation of such components as "preforms" is done as follows:

Long rolls of fiber glass surfacing mat, e.g., 0.010 mil thickness, 2.0 oz. multidirectional surface reinforcement mat, e.g., Treatment 19 from Owen-Corning Fiberglas Corp., and High Modulus HMR-29 woven fiber glass roving from J. P. Stevens & Company., Inc., New York 36, N.Y. are disposed on reels above a make-up apparatus. A roll of polyethylene-kraft paper-aluminum foil is also disposed on a reel, the aluminum foil being of an un-annealed type which enables it to maintain a stiff posture and keep its smooth surface from wrinkling.

The apparatus includes a pony mixer, dispensing means and material storage for resin compounding as shown in companion copending applications and is generally known in the art. Heat sealing apparatus is provided as is a fabric shear adapted to cut both the raw stock and the finished preform.

To start the make-up I roll out a length of packaging material, the polyethylene-kraft paper-aluminum foil to a desired length, in this case 20'0" and place it in a trough-like depression in the make-up apparatus. The roll of packaging material is ready-cut to a width 2" wider than the finished member, in this case 24". I next apply a coat of mold release to the aluminum foil, it being the side facing up. On this surface I next apply a layer of surfacing mat which I have run through an impregnating tank and measuring rolls. In this case the tank contains a clear water white catalyzed mix of propylene maleate phthalate-methylacrylate with 0.015% phenylhydrazine hydrochloride which has been light stabilized with ortho-hydroxy-benzophenone derivatives or phenyl salicylate. (The manufacturers' of these resins are very cagy and do not generally give out details on their improved methods.) Other resin compositions could be used and resins containing glycols which do not contain oxygen bridges and compounds having a high index of refraction such as high-boiling allyl compounds like allyl diglycolate and diallyl phenyl phosphonate are particularly suitable because they can be used as cross-linking agents. I make sure that the fiber glass surfacing mat is well saturated and with a surplus with the resin face against the aluminum free of air pockets. The catalyst system comprises benzoyl peroxide crystals in styrene monomer and the inhibitor system is such that the resin composition gels in about 3 minutes and cures in about 7 minutes which permits time to inspect for air pockets. Quaternary ammonium salts of trimethyl benzyl ammonium chloride as covered in U.S. Patent No. 2,593,787, the work of Dr. E. E. Parker of Pittsburgh Plate Glass Co. provides gelation inhibitors and still permits rapid cure. The catalyst and inhibitor system can be balanced to meet production requirements and each operation requires its own analysis in the present state of the art. I have been able to adjust the production cycle by trying out many combinations, particularly in my early work, which are now accepted practice. By using a manufacturer's resin in the manner he has found it to be best used is always the best starting point but because of the diversity of materials combined with the resin as fillers, fibers or other composition constituents, and particularly the concrete to which the resin composition is applied, at this point in the development of my inventions care must be exercised to be accurate and precise in formulations to get repeatable results. The variables outside of the resin composition alone preclude generalities or hit and miss methods.

I allow the resin composition to gel sufficiently so that subsequent layers will not disturb or affect the face which because the resin is water white is open to inspection at this stage of the manufacture. In the next layer I want to develop a feature of the decoration so in this case I use a polyethylene terephthalate synthetic fiber mat 4.5 oz. per 9 square feet or .5 oz. per sq. ft. which is supplied by Troy Blanket Mills, New York, N.Y., and to which I adhere prior to this use gold metallic staple fibers in random pattern which simulate gold veins in marble, i.e., in the finished product. This layer of fiber is run through the resin impregnating tank and filled with a surplus of the same resin as above and run out over and onto the first layer.

In a separate mixing tank I have prepared a polyester resin composition of semi-rigid polyester resin for which I use e.g., Selectron 5083, Plaskon 9500, or Bakelite BRS 262 and which I have filled with a "Perdonyx" Mexican Onyx #0 filler 35% by weight on the resin and to which I also add 2% by weight bentonite clay and 12% by weight of fine silica of 200–325 mesh. "Perdonyx" is a golden onyx flecked with green, black and red particles. For accent I use black alundum crystals of about 60 mesh sparsely spaced.

With the above colored mix ready to use, i.e., catalyzed with about 1% benzoyl peroxide, and an inhibitor for use at ambient temperature, I next place at least one layer of HMR-29 woven roving (J. P. Stevens & Co., New York, N.Y.) with the major reinforcement longitudinal of the member and on this fiberglass woven roving I place about .3875 lbs. of the above resin mix per square foot, at least enough so that a surplus comes through the mat and is available for later bonding to concrete etc. At times I add a layer of 2 oz. Treatment #19 mat. This method places the tensile reinforcement in a protected position in the laminate and the fiber glass being transparent in a general way permits the onyx and other filler to show through and also provides a depth and feeling to the construction that when it is finished it looks like a polished marble.

The make-up can now be covered with another layer of polyethylene-kraft paper-aluminum foil packaging and heat sealed shut and placed in storage preferably at 40° F. or lower until it is ready to be used, or a catalyst system may be used that is stable in the resin in its unpolymerizable state at ambient temperature but converts and polymerizes and cures at an elevated temperature.

Obviously many different resin and filler systems can be used. The structural engineering features of the laminate can meet about any reinforcement problem projected in building or the like. More or less tensile, shear, torsion reinforcement can be used. Two fundamentals must however always be considered. The surface finish resin composition should be carefully placed and without air pockets and the reinforcement oriented in accordance with the structural design.

When the concrete members are cured and ready for lamination I apply heat to them to remove water and proceed in the manner wherein the packaged construction is laminated to the concrete by pressure means. At times it is convenient to pre-bend the placed packaged reinforcement prior to placement into the shape of the finished concrete.

I always pre-bend the laminate in its polymerizable state and bond in the prepared ready-for-use cable as I describe in FIGURES 1–3 and as the make-up is shown in Example I. As pre-bent I sometimes insert a quick setting fiber reinforced resin central joint between the halves above the cable to further reinforce the member and next bond in the precast blocks forming the compression chord of the member. Variations in method naturally occur in various embodiments.

At times for specific embodiments the aluminum foil-paper-polyethylene packaging material is reinforced with a heavy cardboard to form the hollow core about which to form the laminated construction. The aluminum can be a sheet of rigid form and reusable and used in at least one surface component of the package.

The end concrete components of these beams is advantageously of solid concrete with cableways cast-in in predetermined locations so that the cable reinforcements can be stressed in tension in conformance with the structural design.

*Example V*

In this example I make a packaged reinforcement of the type shown in FIGURES 16, 17, 18, 19, comprising a surface construction laminate adapted to prestressing in combination with a plurality of prestressing and energy absorbing cables. The beam construction of the present example is for a span of 75'0". The precast concrete used is an 8,500 p.s.i. vibrated concrete, with allowable design stresses of 1,850 p.s.i. in compression and 100 p.s.i. in tension. The fiber glass is figured at 300,000 p.s.i. yield strength; the allowable design stress will be 120,000 p.s.i. and the creep limit, 156,000 p.s.i. For illustration purposes the structural engineering analysis of a Prestressed I Section, page 83 "Theory of Design of Prestressed Structures" can be used to understand the method of using steel reinforcement from which this example is drawn for comparison purposes. Prestressing steel is considered to have a yield strength of 180,000 p.s.i. in the illustrative problem of Komendant's book.

The exampled beam is designed to carry the moment $M_T = M_D$ plus $M_L = 6.15 \times 10^6$ plus
$8.35 \times 10^6 = 14.50 \times 16^6$ in.-lb.

The depth of the section while figuring 65.5 in. is taken as 60 in.

A cross section having the required radius of gyration and area as illustrated in FIGURE 49 of said book shows area $A_c = 360$ p.s.i, and the area of the steel $A_s = 3.05$ sq. in.

The required prestressing force = $3.655 \times 10^5$ lb.

This brief outline of structural engineering considerations points to the field of use for the embodiments of this example of the present invention.

In making a ready-for-use fiber glass reinforcement of this type I combine the features of Example I and Example II and make a surface construction layer which also provides finish decoration to the face of the underside of the beam when in place and also acts as tensile reinforcing. Since I need the equivalent of 3.05 sq. in. of steel to be provided in glass fiber reinforcement and the given width of the bottom of the beam is 12" for illustration's sake I assume a cross sectional area of the belt reinforcement as equivalent glass fiber to 1 sq. in. of steel and assume 2.05 sq. in. of cable reinforcement equivalent to 2.05 sq. in of steel. By test I have evaluated such comparisons and have found related characteristics of equivalency useful in structural design. A.S.T.M. approved laboratory test support prestressed preloaded fiber glass reinforcements, i.e., of the present invention.

As an improvement over the surface construction of Example II I can use as the first layer of reinforcement fiber a mat of "Orlon" acrylic fiber exposed at the face or sanded to expose the surface on the completion of the laminate. With the resin composition bonding the Orlon, acrylic fiber sanded away and leaving fibers of the acrylic fiber standing, a wipe-seal comprised of 75% ethylene carbonate and 25% propylene carbonate wiped over the exposed fibers and surface will form a smooth, satin-like surface, which will accept a regular automotive type paint finish. Ethylene carbonate is a solvent for "Orlon" and becomes slightly crystalline in form at room temperature so by adding 25% propylene carbonate the solution stays liquid at room temperature. (Ethylene carbonate and propylene carbonate are available from the Jefferson Chemical Co., Houston, Texas.) The materials are non-toxic.

In large concrete members the danger of damage is increased by workman in the field so this means of finish insures getting a good final finish on the product. The packaged preformed combination cable and belt type reinforcement is made as in Examples I and II or as otherwise shown in the present application and shipped to the site of assembly with the concrete components of the beam. On-site the cables are fed through prepared cable-ways in the precast concrete and the beams component of concrete are set upon the belt-like bottom laminating layer. Heat if required by the particular catalyst system used is supplied and the member integrated, bonded and combined into a prestressed member. In this example the cables are prestressed in prestressed preload by hydraulic jack apparatus known in the art. The resin composition of the belt-like construction is designed to have a 5.0% shrinkage which force system is combined with mechanically induced forces of preload on the belt-like construction reinforcement. Handling apparatus and equipment for such use of packaged reinforcement is shown in companion copending applications of record.

Obviously many variations of structure are obtainable by this ready-for-use packaged preformed construction. Transportation and weight features of the constructions make large savings in space and cost of transport.

*Example VI*

In this example I make a mass produced packaged "preform" adapted to provide a decorative wall or ceiling construction. On a polyethylene-kraft paper packaging material I lay down a layer of "Mylar" metallized 0.0005 mil film (polyethylene terephthalate-polyester film as made by E. I. du Pont de Nemours Co., Wilmington, Del.) and metallized by Coating Products, Englewood, N.J., laminated to a vinyl backing which in turn is laminated to a 2 oz. fiber glass mat. The mat is impregnated with an epoxy resin in a polymerizable state. On this layer I place a layer of preimpregnated roving having an epoxy resin composition adapted to flow when applied to a concrete member and in surplus over that required to completely fill the roving. On this layer of resin composition I place a covering of polyethylene-kraft paper packaging material and heat seal the package shut. This type of packaging can be run as a continuous process in long lengths and cut to dimensional lengths as required in the manufacturing plant or in the field.

The cut lengths can be preformed into shapes. The members can have the electrical circuits preformed in them provided ready for use by field connections.

An interesting variation in this method is to send the Mylar film through a cutting die after it is metallized and die cut architectural or other designs like intricate tracery or filigree patterns so that light can be transmitted through the openings and form a highly decorative ceiling. The Mylar provides a tough strong wearing surface so that concrete members to which such a laminate is bonded can need little maintenance.

Aluminum foil can be used in place of Mylar, or aluminum sheets of die stamped aluminum can be used. Forming is done in dies to proper desired shapes so that field erection is largely assembly of precision cut pieces.

The vinyl sheet type of unit can be made with a heat stabilizing and light stabilizing vinyl stabilizer. A barium-cadmium vinyl stabilizer called Thermolite 112 provides a single package, liquid barium-cadminum stabilizer that is completely free of any fatty acids such as octoates which are the basis for most liquid barium-cadmium stabilizers. This stabilizer is made by Metal & Thermit Corp., Rahway, N.J.

A clear film and sheeting formulation can be made as follows:

| | Parts |
|---|---|
| Polyvinyl chloride resin | 100 |
| Primary plasticizer | 30–40 |
| Phosphate plasticizer | 3–15 |
| Epoxy plasticizer | 3–10 |
| Thermolite 112 barium-cadmium stabilizer | 2–3 |
| Stearic acid | 0.5 |

An extrusion adapted for envelopes to encase reinforcement is made as follows:

| | Parts |
|---|---|
| Polyvinyl chloride resin | 100 |
| Primary plasticizer | 30 |
| Primary low-temperature plasticizer | 12–15 |
| Epoxy plasticizer | 3–5 |
| Thermolite 112 barium-cadmium stabilizer | 2–5 |
| Stearic acid | 0.5 |

To lower the cost of the above formulation 0.5 part of Thermolite 112 can be replaced with 0.3 to 0.5 part of Thermolite 166 (zinc) in the above formulation. For opaque extrusions similar stabilizer combinations can be used, namely 2 to 3 parts of Thermolite 112 with or without 0.5 part of Thermolite 166 (zinc). Generally highly filled compounds will require more lubricant and the stearic acid can be increased to 0.75 to 0.85 part. Fillers vary and have an effect on the amount of stearic acid used. A basic filler like calcium carbonate needs more stearic acid in the mix than acid type of neutral type fillers. Check the pH if in doubt. The above is only illustrative as many polyvinyl formulations are known and the variations of structure require the "know-how" of the art. Polyvinyl chloride packaging can provide multi-purpose features as disclosed herein. Polyvinyl chloride resin as a structural component being thermoplastic can be formed advantageously and many such formulations used in other uses like for example vinyl floor tile, hose, etc., can be adapted for use in the present invention and bonded and integrated and laminated to concrete members and provided as a preformed packaged ready for use resin composition fiber reinforced construction.

*Example VII*

In this example I make a fire resistant prestressed preloaded concrete construction on-site from a packaged ready-for-use plastic resin-fibrous reinforcement. The concrete is itself of a fire resistant type made of heat resistant cement and fire expanded clay aggregate. Fire expanded shale or pumice aggregate can be used. The concrete elements can be any shape, e.g., beams, wall panel, roof panel, commercial concrete blocks, columns, trusses, frames or industrial components. The packaged preformed ready-for-use laminated constructions are made of sizes and shapes to fit the concrete elements or is provided in reeled packages adapted for cutting into size at the place of use.

As an example, I place a packaging sheet comprised of aluminum foil-kraft paper-polyethylene of substantial strength on the make-up table apparatus and covered this sheet with a layer of catalyzed Hetron #93 polyester resin in which I have mixed about 50% 200–300 mesh $Al_2O_3$ Alundun to a depth of at least $\frac{1}{8}''$. The instant sample was colored light pink with a Ferro mineral color. On this layer I next layed down a fibrous mass of Hetron #93 impregnated aluminum-silicate fiber wherein this layer was fully and completely filled with said resin and with a surplus. In this case the laminated layers of aluminum-silicate fiber measured $\frac{1}{8}''$ thick. On top of this layer I rolled out 3 layers of impregnated unidirectional mat, 2 oz. per layer per sq. ft. and oriented the mat in the direction to oppose tensile forces of the finished construction when under load. The resin composition, an unsaturated polyester resin composition, was designed for a shrinkage of 7%. On top of this layer I layed a 2.0 oz. treatment 12 Owens-Corning Fiberglas Co. multi-directional mat which I had impregnated with a Hetron #93 polyester resin composition in which about 25% aluminum powder was mixed and in which enough Cab-O-Sil was also mixed to make the mix thrixotropic. On top of this layer I placed a packaging material like the first layer and heat sealed the package shut. This forms a basic component for other constructions.

For example, a sandwich construction adapted for use in making embodiments of the invention like FIGURE 33 is made as follows:

A resin-crete mix of my invention comprising fire expanded clay aggregate sized in balanced design may be combined with polymerizable expandable resin in a mixer and the mass layed down on the opened package as made above or made in process before packaging. The fire expanded clay particles are very light in weight and have a closed skin about the particles and are fire expanded selected clays processed at about 2150° F. in a tunnel kiln from compacted pellets of said clay. The mesh size selected ranges from $\frac{1}{16}''$ diameter to about $\frac{1}{2}''$ diameter and can be round or longer bodies somewhat tube-like in shape. The clay is inert after firing and assures minimum contamination to a process mix.

The resin can be any one of a number or type of expandable resin composition and have varying degree of expansion, e.g., from 4 lb. to 10 lb. per cu. ft. and preferably is a flame resistant resin as is known in the art. A phenolic type, polyester type, silicone type, etc., resin may be used. In this case I use a polyester type "polyurethane" e.g., a two package system of isocyanate forming resins (Isothane, Surface Chemicals, Inc.). The packages of discrete size can be placed in the mix of fire expanded clay aggregate so that upon activation a combination mix is obtained. The resin binds the fire expanded clay aggregates and a lightweight concrete layer results.

Tolylene diisocyanate is commonly used but much experimentation and research now in progress will afford improved materials. A variety of compounds containing two or more "active hydrogen" groups, e.g., hydroxyl, amino, and carboxyl, may be used to react with the di-isocyanates to produce polymers. Polyesters as liquids of moderate molecular weight, e.g., 1000 to 2500, terminate principally in hydroxyl groups. In reacting with the polyesters the diisocyanates ($R(NCO)_2$) combine with the hydroxyl groups in the polyester ($R'(OH)_2$), joining polyester molecules together with urethane linkages as formula:

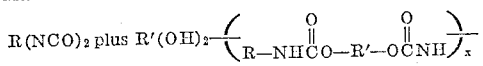

For applications where films, solid plastics, or solid elastomers are desired, this is the principal reaction. However, when foam is desired, an excess of diisocyanate and water are added. In this case the diisocyanate serves both as a cross-linking agent and as a blowing agent. The reaction with water furnishes the gas for foaming, as is illustrated for a monoisocyanate in formula:

The outstanding feature of polyurethane foams is that they can be "foamed in place" without the application of heat or pressure. The foaming reaction is exothermic and of sufficient driving force to complete the curing of the foam. In the present example, when packaged between two layers of laminated fibrous materials in which the fibrous materials are embedded in a resinous material in a polymerizable state, and the edges of the two layers are heat sealed or otherwise held together, or the layers are laminates circular in diameter and one of smaller diameter than the other, a polyurethane foam composition activated in between such layers advantageously very easily provides the heat for curing the outer layers and the expansion forces of the polyurethane resin composition provides the stressing forces to prestress preload the fibers in the outer layers. By materials engineering a balanced structure can be designed and made wherein the forces and the heat of polymerization complete and prestress a structure. Such a construction is described in my copending application Serial No. 229,852, filed June 4, 1951, a portion of which is now Patent No. 2,850,890.

The known art of preparing urethane foams includes the use of castor polyols as base materials. Preparation of a non-shrinking, semi-rigid, lightweight foam of urethane can be made on formulation based on 85% DB Castor Oil/15% $Estynox_R$ 300 mix (Castor Oil products of The Baker Castor Oil Co.).

The polyols used in such a urethane foam contains one or more secondary (slow reacting) hydroxyl groups in their molecule adapted to the prepolymer method rather than a one-shot method for the preparation of the foams of this nature. An isocyanate to hydroxyl equivalent ratio of 2.5/1 can be used for formulating such a prepolymer. A. Erlich, M. K. Smith, T. C. Patton of The Baker Castor Oil Co. report as follows:

"A prepolymer preparation was charged into a three neck, one liter flask fitted with a stirrer, thermometer, and condensed with attached drying tube. The toluene di-isocyanate, as 5 equal portions of Hylene TM (Du Pont) as gradually added over a 15 minute period with moderate agitation until 2.5 equivalents of TDI, corresponding to each equivalent of charged castor polyol, was introduced (batch size held to 500–600 grams). After completion of the initial exotherm (15–30 minutes), the reactants were heated for an hour at 110° C. The prepolymer which formed was cooled to 65° C. and packaged in a sealed container (1 quart tin can).

"In the case of solid castor polyols, the material was first heated to its melting point, after which the TDI was added and the reaction started at that temperature. In those cases where the exotherm started to exceed 100° C., the reaction products were cooled by immersing the flask and contents in cold water until no further exotherm was noted. The reaction mass was then heated to 110° C., for an hour. This cooling treatment permitted the preparation of prepolymers which otherwise could not be prepared. It is reported that it became apparent that some of the polyols could not be used alone in the preparation of the prepolymer. Hence, formulations were made including combinations of $DB_R$ Castor Oil (85%) with each of several castor-based polyols (15%) in turn, with the conditions of prepolymer preparation unchanged. It was further reported that it was discovered that aged (stored) prepolymers (in which a viscosity increase has occurred) gave foams with altered physical properties. A foam preparation was made as follows:

"0.5 gram of dimethyl siloxane fluid (Dow Corning DC 200 (50 cp.)) was hand-mixed into 100 grams of the prepolymer. To this mixture was added 4.4 grams of buffered diethylethanolamine (Du Pont Isofoam I; diethylethanolamine 42 grams, 36.5% HCl 24 grams, distilled $H_2O$ 34 gr. (mixture adjusted to a pH of 9.8±.1; $H_2O$ content 49.1%), together with sufficient additional water to react stoichiometrically with the remaining excess of tolylene di-isocyanate. The blend was manually mixed to a point where incipient foaming became observable (about 45 seconds), after which it was poured into a waxer paper container (3⅝" x 6⅝" x 4") to foam.

"A non-shrinking castor polyol based urethane foam is made as follows:

Prepolymer preparation—

| | Weight (gr.) |
|---|---|
| $DB_R$ castor oil | 305 |
| $Estynox_R$ 300 | 53 |
| Hylene TM | 242 |
| | 600 |

"Charge DB Castor Oil and Estynox 300 to a three neck-one liter flask fitted with a stirrer, thermometer and condenser with drying tube attachment attached. Slowly add tolylene diisocyanate (Hylene TM) to charge with moderate agitation over a 30 minute period. Then heat reactants to 110° D. for one hour. Cool to 65° C. and package in one quart tin can. Variations in preparation may find it necessary to slightly increase the Estynox 300 by a few grams (and correspondingly increase the Hylene TM) to give a non-shrinking foam.

"Foam preparation is as follows—

| | |
|---|---|
| DB/E–300/TDI prepolymer | 100.00 |
| DC 200 (50 cp.) | .50 |
| Buffered diethylethanolamine | 4.40 |
| Distilled water | .35 |

"Charge prepolymer to 12 oz. paper cup. Add DC 200 at once to charge with stirring (spatula). Then mix in amine catalyst and water and continue to stir for 45 seconds (incipient foaming becomes observable and preparation takes on a milky appearance). Pour mix quickly into waxed paper container to form foam.

"Foam properties—

| | |
|---|---|
| Density (lb./ft.$^3$) | 3.0 |
| Shrinkage (%) | Nil |
| Compression modulus, p.s.i.: | |
| Original | 21.5 |
| Humid aged | 21.5 |

"Obviously many formulations are found in the art and depending upon the end use of such a foamed product as indicated by disclosure in the instant application, features may be arrived at by the above reported knowledge of the art."

The use of a resin-crete or elastomer-crete aggregate concrete wherein the resin or elastomer comprises the binder for the intermediate layer provides the compression member for balanced design with the tensile member comprised of the outer skin-stressed laminated construction above described. In using water reactive polyester resins wherein water affects the cure the packages can be filmed sealed against water penetration to the polyester resin composition and in some constructions this is an advantage as the inner and outer layer can compensate different stress characteristics arising in each layer in their use and still work as a unitary reinforcement does because of the prestressed preload existing in the construction. If the waterproofing layer is also a shock absorbing layer of resilient rubbery thick layer of e.g., epoxy-polysulfide rubber valuable shock absorption features are added to the construction. The fire expanded shale or clay and resin binder make excellent shock absorbing media.

The layer of resin-crete can be one inch thick or it can be 12″ thick there being no limitation on thickness intended but subject to design, and designed as a structural load bearing construction adapted to many uses. The lightness of such a construction enables it to float on water and its buoyancy can be designed by the density of the resin-crete mix. Its skin-stressed surface can be a high strength construction rigid in its final make-up and adapted to large loads as in a tank or vessel or even a boat or it can be a high strength construction adapted to absorb fire power of small arms fire. The laminated layers can have functional use characteristics other than strength characteristics and in their packaged form combined from mass produced packaged components brought together at the site of use for final integration and combination. The cost of final constructions thus made are benefited by the mass production techniques of chemical engineered constructions whose final assembly and composition can be made by relatively unskilled personnel. Large concrete structural elements and constructions can be filled with polyurethane cores and be bonded by joinery of the type of laminated construction herein disclosed to combine the features of large precast panels e.g., 20 ft. by 30 ft. and whose joinery comprises multi-functional columns of such resin-crete and fibrous reinforced plastic resin joints. Such joints are shown in FIGURES 11, 12, 13, 14 and 15 of the present application.

By employing laminated constructions of this type wherein the bonding together of various components is completed in regards to the packaging so that the product is completed in the primary manufacture for its shape and other useful features but in which the construction is in its polymerizable state and subject to completion at a later date or place away from its primary manufacture, by using e.g., inflation means as shown herein, constructions like those of FIGURES 33, 34 and 35 can be constructions adapted for field use and manufacture. As shown for FIGURE 33 the useful embodiments of the present invention can even be made in an airplane or other carrying means and dropped or pushed from as a parachuted construction. In underground tunnel or in mines where space is a premium packaged ready-for-use constructions of the type herein disclosed can find ready use as they can be packed in in small volume packaged constructions and inflated by means to make finished useful elements and structures.

*Example VIII*

In this example I make a packaged ready-to-use catalyst construction. A web of sisal fiber or fiber full of open spaces like a window screen made of fiber glass fibers, or cotton screen, etc., is placed on a thin heat sealable plastic sheet like e.g., polyethylene on a make-up table. Above the table an apparatus adapted to form droplets of paste-like catalyst, e.g., benzoyl peroxide in tricresyl phosphate (Lupersol ATC) is provided and advanced over the fiber screen in a predetermined manner to drop substantially equal sized droplets at equidistant spaces on the screen until it is covered as designed. A sheet of polyethylene film is advanced over this and the construction heat sealed.

Another means I use is to place a strong pull string across each row of catalyst droplets so I can at a later date tear open the film and disturb and mix the catalyst into a resin layer in which the catalyst preform is placed.

If the catalyst preform is of large size it is advantageous to use a starch bonded carrier sheet or other type of stiffened sheet so that it lays evenly.

When I want to use benzoyl crystalline particles as catalyst I "salt" a fiber glass mat to the required even distribution required and package this mat in a film ready for combination on-site at a later date with a resinous composition. An adhesive like starch or in fact any compatible adhesive can be used in a very thin holding sheet upon which to "salt" the benzoyl peroxide. When it is desirable to combine the benzoyl peroxide with a vinyl monomer, e.g., styrene monomer, I fill spaghetti-like or sausage-like film. e.g., polyethylene tubes with styrene monomer and heat seal or otherwise seal the ends of the tubes to the catalyst preform in spaced relationship so that upon the application of pressure like that from a concrete element being placed thereover, the tubes will burst and emit the styrene monomer over the crystals of benzoyl peroxide. Such combination packaging inbetween layer of preimpregnated resinous fiber glass constructions provide catalyzing means.

Another means I find useful is to combine a dry powdered polyester resin like Atlac 382 (Atlas Powder Co., Wilmington, Del.) with a dry benzoyl peroxide and package between two layers of fiber glass mat. In the field styrene monomer can be added to the sheet by placing the right quantity per square foot of surface in a level pan and immersing the sheet containing the powdered polyester resin to combine the crystals with the liquid. The mat acts as a sponge and draws the styrene monomer into combination with the polyester-catalyst powder mixture.

When the lamination is thick I find that multiple layers make a better combination rather than heavier single layers.

The use ofg Lupersol DDM or Cadox MDP, methyl-will in themselves suggest means for packaged constructions adapted to combination at a later time or under process conditions unique to any one type of designed construction.

In making cable and belt type reinforcements parallel spaghetti-like tubes of cataylst and resin filled tubes interspaced inbetween the stranded reinforcements make reliable constructions of this embodiment of the invention. When tension stressing is applied to the fiber glass cables the enveloped covers of the catalyst are ruptured and releases the resin and the catalyst and the movement of displacement of the members acts to mix them together. When heating wires or other means are used film materials softened or melted at a lower temperature than the setting temperature of a resin is advantageously employed.

The use of Lupersol DDM or Cadox MDP, methyl-ethyl ketone peroxide in dimethyl phthalate, because of its being a liquid, is advantageously packaged in glass spaghetti-type packages or in ampules of glass which can be readily crushed in the body of a laminate by the weight of the concrete or other compression component of the construction. It is well to "work" a laminate as soon as the catalyst is emitted to mix it into the laminate. Pressure, rolling an object over it and various means can be used to insure mixture. On my reel-units the unrolling operation aids in mixing the packaged catalysts into the laminate. The reel-units are disclosed and claimed in the parent application Serial No. 340,642, filed January 16, 1953, and a portion of which is now Patent No. 2,951,006.

The packaged catalyst constructions advantageously are engineered to work cooperatively with different resin compositions that I use in the packaged constructions. A resin, e.g., an unsaturated polyester resin composition, which I use may be one which has high shrinkage after preliminary setting. It can be one which has extraordinarily high adhesive bond strength or can be one so anchored and embedded and enmeshed in the porous structure of the concrete, or the like, that the shrinkage imposes and maintains the desired pre-stress on the concrete without pulling away from its surface. The resin composition which is anchored into the concrete may, with advantage, effect its major shrinkage before an overlying layer of resin composition. This may be either by use of a faster setting resin composition (more catalyst or promoter) in the layer which impregnates the porous structure than in the overlying layer, or by applying the impregnating layer in advance and pregelling it, so that in its final setting and high shrinkage period the layer of resin above it will still be sufficiently soft so that it can be sucked down to accommodate itself to the shrinkage of the impregnating layer. By packaging such resin compositions with controlled catalyst features, or by process timing in sequential operations, the different process requirements and separated stressing and shrinkage structurally induced prestressed preloads can only be done by combining packaged elements of the invention. Time of catalyzation and time of shrinkage force induction are frequently means of getting final end product production having certain predetermined features. The transfer of stress through the interface between concrete components and reinforced fibrous plastic resin constructions can be controlled by releasing characteristics of film packaged catalysts into resin compositions. An osmotic release may take days and the cure characteristics of the resin composition result in features of the construction of a predetermined nature. A quick release, like a pull string release can provide a different condition and each structural engineered requirement must be chemically engineered for its designed force and setting characteristics. Once established the individual product can be mass produced but to arrive at this point the resin structure and the catalyst system must be "tailor-made" and in harmony with an overall engineering design.

The packaged resin compositions may be advantageously a thin layer at the surface, which is applied from a package onto the face of a mold and which is also faster setting or applied and gelled in advance so that here also its shrinkage will be accommodated by flow of the still unset resin composition of the intermediate layer. When the intermediate layer finally does set its shrinkage is imposed against both the surface layer and the impregnating layer so that both are reinforced against tensile stresses; and since it is this intermediate layer which carries the fiber reinforcement, it is most advantageous that it should thus carry the severe tensile stress.

The integration of the resin composition with the concrete under the influence of external pressure or suction exerted through, e.g., a block of concrete, and/or capillary action, is extended into the interstices of the concrete, thereby reaching around and gripping the grains and particles of the concrete, like fingers, and at the same time adhesively bonding said particles and grains into a strong cemented composite stone. The capillary action of preheated concrete on the resin composition can be very strong. The pores may be filled completely, or frequently the resin may be porous tube-like bodies in the porous structure of the concrete. This is done as explained in my copending applications of record by including in the resin composition a solvent or blowing agent or a substance which is volatile under conditions encountered within the block, so that bubbles or channels are blown by gas or vapor released by the heat of the block when the resin composition is still fluent. In some formulations of my invention, styrene monomer serves this function as well as cross-bonding the polyester. The escaping styrene vapors push the fluent resin along the walls of the larger pores and into the smaller pores.

This filling and/or lining of the pores of the body of structural material not only integrates the surfaces high tensile layer, but also greatly increases the strength of the structural body itself in the zone-of-penetration and permeation—in tensile, shear and torsion as well as in compression. This integrated structure can be extended to any desired depth, a 1/32" in depth, 1/4" in depth, 1" in depth, 3" in depth, or even all the way through at least a portion of a member. This is a most important feature of my inventions and packaged catalyst systems together with packaged reinforced fibrous resin composition constructions provide me a way to control chemical engineering features of rates of polymerization, heats of polymerization and other characteristic features encountered in the combination in the varied structures I make. The control over time alone, well pays for packaged catalysts in the assurance of mass produced identical elements ready-for-use in constructions built under a variety of environments by labor not interested or skilled in precise chemical formulations.

The epoxy resins, e.g., commercial resins of diglycidyl ether of bisphenol A compounded into formulations useful in the present invention for systems embodied in castings and for sealing are exampled below, but are not limited thereto.

*Example IX.—Low Temperature Compound*

| | | |
|---|---|---|
| 0.005 dia. glass beads | parts by weight | 100 |
| Epoxy resin | do | 18 |
| Butyl glycidyl ether | do | 2 |
| Diethylamino propylamine | do | 2 |

*Example X.—Flame Resistant Compound*

| | | |
|---|---|---|
| Epoxy resin | parts by weight | 100 |
| Chlorendric anhydride | do | 90 |

*Example XI.—Elastomeric Compound*

| | | |
|---|---|---|
| Epoxy resin | parts by weight | 100 |
| Allyl glycidyl ether | parts | 10 |
| Polysulfide | do | 10 |
| Tridimethyl amino methyl phenol | do | 10 |

*Example XII.—Low-Viscosity Compound*

| | | |
|---|---|---|
| Epoxy resin | parts by weight | 100 |
| Calcium carbonate | do | 50 |
| Hexahydrophthalic anhydride | do | 80 |
| Benzyldimethylamine | do | 1 |

*Example XIII.—Low-Exotherm Compound*

| | | |
|---|---|---|
| Epoxy resin | parts by weight | 100 |
| Silica | do | 100 |
| Phthalic anhydride | do | 30 |

*Example XIV.—Flexible Compound*

| | | |
|---|---|---|
| Epoxy resin | parts by weight | 100 |
| Polysufide | do | 50 |
| Triethylene tetramine | do | 10 |

*Example XV.—Electrical Encapsulating Compound*

| | | |
|---|---|---|
| Epoxy resin | parts by weight | 100 |
| Uncompressed silica | do | 5 |
| Clay | do | 75 |
| Diethylene triamine | do | 12 |

*Example XVI.—Machinable Compound*

| | | |
|---|---|---|
| Epoxy resin | parts by weight | 100 |
| Allyl glycidyl ether | do | 10 |
| Powdered aluminum | do | 200 |
| Diethylene triamine | do | 11 |

*Example XVII.—High-Thermal-Conductivity Casting Compound*

| | | |
|---|---|---|
| Epoxy resin | parts by weight | 100 |
| Silica | parts | 100 |
| Metaphenylene diamine | do | 14 |

*Example XVIII.—Low-Exotherm Casting Compound*

| | | |
|---|---|---|
| Epoxy resin | parts by weight | 100 |
| Powdered aluminum | do | 80 |
| Pumice | do | 70 |
| Polysulfide | do | 25 |
| Dimethylamino methyl phenol | parts | 10 |

Some of the embodiments shown in the present invention require in whole or in part of their composition various epoxy-resin formulations which are suitable for use in foaming applications to provide rigid structures with good insulating properties against heat or vibratory loading, etc., but with significantly reduced weights. The excellent adhesive properties of the epoxies make them very useful for foam in place applications, particularly when packaged as in the present invention. Chemical foams are formed during cure by the action of the curing agent involved or of a blowing agent incorporated to release gases which perform the foaming reaction. Ammonium carbonate is one such foaming agent used. The blowing agent is used in the resin mix in amounts on the order of 2 phr. A typical proprietary commercial material is "Celogen," a product of Naugatuck Chemical, a Division of U.S. Rubber Co. Primary aliphatic amines are employed as curing agents, the less reactive amines are used for larger volumes of foam. Atlas Powder Co., wetting agent, Tween 20 (or any other suitable agent), is used in low concentration to provide for a fine and uniform dispersion of the gas bubbles. A solvent is used to dilute the resin and control the foaming process by absorbing excessive heats of reaction. Epoxy resins which are either liquid or solid can be used because the reaction is carried on at an elevated temperature.

*Example XIX.—A Typical Foaming Type Epoxy Formulation*

| | | |
|---|---|---|
| Epoxy resin, 450 molecular weight | grams | 100 |
| Celogen | do | 2 |
| Tween 20 | drops | 2 |
| Toluene | grams | 5 |
| Diethylene triamine | do | 6 |

The packaging means including the heating means is advantageously used in this type of structure, the resin being heated to about 110° C. Separate enveloped packaging of the resin, the wetting agent, blowing agent and solvent individually, or in compatible transportable combination packaging, is a feature particularly useful. Such formulations can be thoroughly mixed in the packaged constructions after which the curing agent which is also inclosed in the total package, e.g., in glass ampules or crushable envelopes, can be quickly mixed in by crushing the said curing agent containers. The composition thus handled will foam in place in about 30 seconds. Such a formulation as exampled will yield a foam having a density of about 7 lbs. per cu. ft. Heating means in the package can provide adequate curing and post-curing at temperatures of from 75 to 100° C. being cured for about 1 to 2 hours. The density of the foam may be determined by regulating the parameters involved. The specific ultimate properties are a function of the density, the effect of varying solvent content, blowing agents, curing agent concentration, initial temperature and the type of epoxy resin used indicates that all these variables have a marked influence on the strength of the foam and the density of the foam construction made. Generally it has been found that concentration of curing agent is critical and less than stoichiometric amounts provide superior products in terms of strength and color. The minimum amount of diethylene triamine required to achieve a cured system is 6 phr. Increasing this percentage only serves to reduce the properties of the ultimate composition. It does not affect the density of the product. Density and strength are inversely proportional to the amount of blowing agent and solvent employed. The temperature of 110° C. is the best temperature for the above formulation, higher temperatures might scorch the foam, particularly in an enclosed enveloped construction.

Another method for producing foamed epoxies involves the utilization of microscopically small hollow spheres made of phenolic resin and filled with nitrogen gas. The insulating properties of such spheres and their size (an average diameter of 0.0013 in.) find good use in foams. The preparation of such lightweight syntactic foams as low in density as 8 lbs. per cu. ft. are produced depending upon the concentration of phenolic spheres. The upper limit of concentration is about 40 phr. to no more than about 70 percent by volume. Mixing is done best by automatic agitation with fluidized resins being employed, the resin epoxy being catalyzed by an aliphatic amine. Puttylike in consistency, uncured syntactic foam can be molded to shape, troweled onto a suitable surface, and forced into cavities as well as pressed into sandwich cores.

Epoxy resins possess outstanding adhesive properties which properties can be improved selectively by the addition of specific or suitable fillers, extenders or pigments, diluents and/or resin modifiers. Such versatile resin compositions, depending upon the type of formulation, provide bonds that may be rigid or flexible or rubbery to many different degrees of versatility. The art of resin compounding of epoxies have studied a monomolecular layer of diglycidyl ether of bisphenol A and its homologs at an air-water interface to understand the nature of the adhesive bond which study indicated that the adhesion to the aqueous subsurface seemed primarily dependent upon the polar hydroxyls, with the unreacted epoxy groups exerting a strongly cohesive effect on the resin chains. The study suggested that the epoxy groups assist in adhesion to solid surfaces.

The better adhesion obtained with higher-weight polymers (containing initial hydroxyl groups) is further enhanced by the cohesive forces attributable to the intertwining of the chain molecules as known in the art. Optimum adhesion is often obtained with mixed polymers, containing both low-weight and higher-weight species, probably because of the better over-all wetting action achieved with the reduction in viscosity. Improved adhesive bond can also be had by mechanical action of roughened surface, the pores structure of a porous structural body, e.g., a concrete precast member or a block of concrete. Curing of epoxy resin systems used as adhesives have slight shrinkage and high strength, e.g., tensile strength.

The various adhesive systems using epoxy resin or epoxy resins in compatible combination with other resins, rubbers or elastomeric substances may be used either as liquids or as hot melts and can be one or two or more container type systems. The latent curing system agents are particularly useful in the present invention and give bonds of excellent strength and can be provided as formulations of extremely convenient one-container 100 percent solids systems. However, consideration must be given to the curing temperatures to be accommodated.

The amines used to catalyze epoxies are known to have a relatively short pot life, i.e., with most amines. Much work has been done to develop a long or indefinite pot life curing agent other than dicyandiamide. The method of approach has been to block off the nitrogen or other reactive groups in a manner so that the reactivity at room temperature is destroyed. After application, heat may be applied to remove the chemical block, freeing the group and allowing the cure to be initiated. Three principal types have been employed: amine salts, boron trifluoride amine complexes and amine-borate complexes. The first method, as representative of amine salts is the tri-(2-ethylhexoic) acid salt of tridimethyl amino methyl phenol, while improving cure characteristics, does not result in indefinite pot life because of the esterification of the acid by the epoxy groups at room temperature, thus freeing the tertiary amines. The second is represented by the boron trifluoride complex of various amines of which about 15 are known in the art. In this case, higher temperatures disassociate the complex, and cure proceeds catalytically under the influence of the $BF_3$ and the amine. Boron trifluoride-amine complexes are tightly associated. The amine is inactivated and the boron satisfied, so that neither base or acid is present. This accounts for the long pot life experienced with such compounds. While not providing indefinite pot life, the $BF_3$ complexes do prolong pot life considerably and are suitable for some embodiments of the present invention. Of the various $BF_3$ complexes available, only $BF_3$ monoethylamine has found extensive use in liquid epoxy resin systems. Complexes of $BF_3$ and such amines as piperidine, pyridine, diethylaniline, etc., are under investigation by research groups and may prove helpful in the present invention. The $BF_3$ monoethylamine is considered in the art as a slow catalyst rather than a latent catalyst. Borates such as triethanolamine borate can be used as latent curing agents. In embodiments of the present invention having its own heat source as a part of the package or adjacent to the package, ultimate properties of the epoxy resin system can be attained with triethanolamine borate by fairly long cures with a slow gelation and with fairly high temperatures. Gelation can be hastened by using chromium acetylacetonate at 0.5 phr. as an accelerator.

One-container adhesive solutions may be formulated with high-weight epoxy resins but care must be used so that the retained solvents in the adhesive layer are handled correctly and the reaction does not blister in the glue line. A similar hot melt system could have 15% more strength but certain embodiments require design with solvent systems.

Both supported and unsupported tapes may be employed. The tapes virtually eliminate handling difficulties and provide highly reproducible results on production lines. Refrigerated storage is generally required if long storage is considered.

One-container adhesive powders are available in the art and prove useful for bonding larger areas or in specific embodiments.

Solid heat-flowing adhesive solders are useful for a number of structural applications and provide economical bonded joints for some of the embodiments of the present invention.

The joinery of concrete bodies and the enveloped constructions of reinforcement of the present invention can be advantageously used when solid two-part adhesive systems are formulated therefor. This type of formulation involves the preparation of a high-weight resin adduct curing agent soluble in acetone. This is applied in solution coating to one bonding surface, e.g., the joint face of a concrete member. A solution coating of a higher-molecular-weight homolog of diglycidyl ether of bisphenol A is applied to the second bonding surface. The prepared system is indefinitely stable at room temperature, but if the two layers are joined under heat and pressure, good bonds may be obtained. Another feature can be had by packaging reinforcement fibers encased in plastic resin composition in its unpolymerized state further enclosed in such an adhesive system as just described so that component parts can be adhesively joined to porous structural members. The weight of porous structural bodies such as concrete plus the use of the incorporated or adjacent heating means described herein provide the elements advantageously used in epoxy resin systems of reinforcement and joinery of such concrete or porous structural bodies.

The use of polyamides which are excellent thermoplastic adhesives and contain polar amine, carboxyl and amide groups as polymeric flexibilizers is known in the art. As flexibilizers which react directly with the epoxies, the polyamides become an integral part of the cured resin-epoxy system and find use in the present invention in constructions designed to distribute stresses and impact loads throughout the adhesive bonds. As media for the change of phase of vibratory loads and shock impacts the epoxy-polyamides blends are very advantageously used in constructions of the present invention. The degree of rigidity to flexibility is a matter of formulation, a rigid bond being e.g., 40 phr. polyamide to epoxy. Shear strengths depend upon the formulation used and penetration and permeation characteristics of bonded materials.

The bond strength of a typical epoxy-polyamide formulation for cold-roll steel, analogous to steel reinforcement components of the present invention, is about 2,880 p.s.i. to 3,000 p.s.i. in shear. Such a formulation is as follows:

*Example XX*

| | Parts by weight |
|---|---|
| Polyamide (amine value 210–230) | 50 |
| Epoxy resin (fluidized) | 50 |
| Tabular alumina | 20 |

The effect of fillers is infinitely designable and the various fillers offer distinct properties. Shear strength as one property is important but other features such as rigidity, flexibility, chemical inertness, etc., must be a part of designed adhesive constructions. Aluminum powder, carbon black, short-fiber asbestos, ignited $Al_2O_3$, sand, silica, zinc dust, stainless steel particles, crushed rocks, fire expanded shale, fire expanded clay, are some of the fillers used.

A high temperature adhesive can be made by using Epon 422J, a Shell Oil Co. resin epoxy as follows:

*Example XXI*

| | Parts by weight |
|---|---|
| Epoxy resin (molecular weight 1,000) | 100 |
| Phenolic resin | 49 |
| Aluminum dust | 149 |
| Dicyandiamide | 9 |
| Copper 8-quinolinate | 1.5 |

A typical paste solder, i.e., a mortar like substance that can be made as follows:

*Example XXII*

| | Parts by weight |
|---|---|
| Epoxy resin (molecular weight 400) | 100 |
| Diethylene triamine | 11 |
| Aluminum powder | 30 |
| Uncompressed silica—can be varied as required. | |

The above formulations are intended as examples only and are usually used in cooperation with other components in the packaged constructions of the invention to act as binders, adhesive and integrating media, etc.

The laminated constructions of the present invention include fiber glass cloth, fiber glass mat (both unidirectional and multidirectional fibers types) polyester cloth, polyester fibers, acrylic fibers, mica, sheets of various resilient materials that have specific properties and strengths. Epoxy resins or epoxy-phenolic or epoxy-polyamide systems, etc., provide the binders. Two methods are available that are used to prepare commercial laminated constructions. Wet lay-ups involve the impregnation of the fibrous reinforcement and use a 100 percent solids non-solvent-containing epoxy resin composition which usually must be applied into its final use at once. The packaged constructions of my reel-unit can be made this way. The lower viscosity resins, such as commercial-grade diglycidyl ether of bisphenol A, are most often used, since the higher-molecular-weight epoxy resins are too viscous and do not satisfactorily wet out the fibrous reinforcement unless they are worked hot.

Dry lay-ups involve the impregnation of the fibrous reinforcements with either a 100 percent solids or a solvent-containing system in advance of the production operation. A B-staged i.e., an epoxy resin having a curing agent therefor in an intermediate stage of cure dry tack-free fibrous reinforcement or cloth of e.g., fiber glass is made, the resin being gelled in the B-stage and controllable for cure at an elevated temperature. The art is well developed on resin-fiber formulations, the amount of resin to fiber ratio being the important design matter in a structural design. The more fiber, e.g., fiber glass the higher the strength in e.g., tension, but the greater amount of pressure is required to get substantially air free laminates, however, the pressure is still in the low pressure range.

At 50% to 60% resin content of epoxy resin, e.g., flexural strength will be from 30,000 to 45,000 p.s.i. An increase from 30 to 300 p.s.i. pressure increases the flexural strength from about 67,000 to 70,000 p.s.i. when the amount of epoxy resin is held to a constant amount.

*Example XXIII.*—*Typical Mechanical Properties of Laminate Cured with 4,4′ Methylene Dianiline*

[Epoxy resin: molecular weight 350 to 400. Cure cycle: pressed 1 hour at 160° C.; post cured 2 hours at 150° C.; plus 6 hours at 200° C.]

PROPERTIES

| | |
|---|---|
| Tensile strength, p.s.i. | 50,000–58,000 |
| Tensile modulus, p.s.i $\times 10^{-6}$ | 3.3–3.6 |
| Compressive strength, edgewise, p.s.i. | 49,000–51,000 |
| Compressive modulus, edgewise, p.s.i $\times 10^{-6}$ | 3.3–3.6 |
| Flexural strength, p.s.i.: | |
| At 25° C. | 79,000–89,000 |
| At 127° C. | 52,000–60,000 |
| At after 2 hours in 100° C. water | 77,000–82,000 |
| Flexural modulus, p.s.i. $\times 10^{-6}$: | |
| At 25° C. | 3.6–3.9 |
| At 127° C. | 3.0–3.5 |
| At after 2 hours in 100° C. water | 3.2–3.6 |
| Impact strength, Izod | 12–15 |
| Hardness, Rockwell M | 115–117 |
| Water absorption, 24 hours at 25° C., weight gain, percent | 0.05–0.07 |

The following commercial epoxy resins and commercial resin components are exampled by these products:

| Epon Resins—Shell Oil Co. | Melting Point, °C. | Viscosity, Poises at 25° C. | Epoxide Equivalent | Weight per gal. lbs. |
|---|---|---|---|---|
| Epon 815 | Liquid | 5–9 | 175–205 | 9.5 |
| Epon 820 | do | 40–100 | 185–205 | 9.7 |
| Epon 828 | do | 135–195 | 185–205 | 9.7 |
| Epon 834 | do | 3.5–9.0 | 225–290 | 9.7 |
| Epon 864 | 40–45 | 0.3–0.6 | 300–375 | 9.9 |
| Epon 1001 | 64–76 | 0.9–1.6 | 450–525 | 9.9 |

EPON CURING AGENTS

Diethylenetriamine (DTA), Triethylenetetramine (TETA)—Used for fast cures or room temperature cures.

Epon Curing Agent T, normally used in low viscosity blends with Epon 815 for general laminating at room temperature.

Epon Curing Agent U, a modified amine curing agent, used with 815 or 820 for very rapid cures at room temperature.

Diethylaminopropylamine, Epon Curing Agent A—requires heat curing @ 180–200° F. With Epon 815, 820, and 828, has a longer pot life. With Epon 834, cures at room temperature but slowly, i.e., several days.

Epon Curing Agent D, used with Epon 828 and 834 for room temperature cures but at 120° F. or higher cures quite rapidly.

Dicyandiamide, a solid amine curing agent used in preparing dry lay-ups and laminates with Epon 1001. Excellent cures at 345° F. Fibrous reinforcement impregnated with Epon 1001-dicyandiamide system can be stored up to two years before conversion into laminates.

Metaphenylene diamine, Epon Curing Agent CL, when combined with Epon 288, provides the best chemical resistance if any cured epoxy resin system and good retention of physical and electrical properties at temperatures as high as 300° F.

Epon Curing Agent Z, a liquid of approximately 20-poise viscosity blended readily with Epon resins at room temperature.

Diaminodiphenylsufone (DDS), blends with Epon 828 for laminates for use at elevated temperatures (300–350° F.). DDS cures slowly even at elevated temperatures, unless an accelerator, e.g., BF3–400 Curing Agent being effective for this purpose Epon Curing Agent BF3–400 gives Epon resin blends which are stable for several months at room temperature. Curing of these materials is carried out at 200–300° F. with post-curing at temperatures up to 400° C. is generally desirable.

Anhydride Curing Agents, D, T, U, Z and BF3–400 are all Shell Co. products as anhydride blends, require heat cures.

Flexibility Agents include long-chain reactive compounds such as polysulfides, Thiokol liquid polymers, Thiokol Chemical Co., Trenton, N.J.), amine-terminated polyamides (Versamid resins, General Mills Corp., Chemical Division, Minneapolis, Minn., and epoxy-terminated natural oils (Cardolite, Irvington Varnish Div., Minnesota Mining and Mfg. Co.). Dibutyl phthalate can also be used to soften Epon resins.

Hysol #6111, Houghton Laboratories, Inc., Olean, N.Y., a two component system, a base to which an activator (F–1) is added prior to application. Mixture thus made has a working time of 5–20 hrs. At room temperature set up hard in 12–15 hours and cures completely in 7 days.

At 140° F. will cure in 90 minutes, or in 30 minutes at 140° F. plus 24 hours at room temperature.

At 300° F. will cure in 7 minutes.

At 400° F. will cure in 2 minutes.

Araldite—Cinder Block Coating—Glaze finish. Ciba Company, Inc.,

| | Lb. | Gal. |
|---|---|---|
| Part A (Resin Portion)—Materials: | | |
| Araldite 571 KX(75%) | 463 | 52.0 |
| Xylol | 38 | 5.3 |
| MIBK | 3 | 0.4 |
| Cellosolve | 78 | 10.0 |
| Beetle 216–8 | 18 | 2.1 |
| Part B (Amine-Adduct Portions): | | |
| Araldite 571 KX(75%) | 95 | 10.7 |
| Xylol | 58 | 8.0 |
| Methyl isobutyl carbinol | 58 | 8.6 |
| Stir—Add slowly while stirring Triethylene tetramine | 29 | 3.5 |
| Let stand 24 hours. | | |
| | 840 | 100.6 |

Properties of Parts A and B:
  Weight per gallon, Part A _____ lb __ 8.6
  Weight per gallon, Part B _____ do __ 7.95
  Viscosity, Part A _____ 61KU
  Viscosity, Part B _____ 74KU Mixing Ratio:
  Mix Part B into Part A. Let stand for 1 hour. Thin for spraying viscosity with mixture of 2 p.b.w. Xylol with 1 p.b.w. Diacetone alcohol.

Araldite CN 502:
  Properties of Uncured Resin—
    Specific gravity (23° C./23° C.) __ 1.12–1.18
    Viscosity, c.p.s. at 23° C. Brookfield Viscometer _____ 3,000–6,000
    Epoxy value—Eq./100 g _____ 0.355–0.400
    Storage Life (in closed tight containers) _____ About 1 yr.
    Flash Point (Cleveland Open Cup)   435° F.

Hardening agent: HN–951 amine type hardner.

Casting application:
  Araldite 502 _____ parts by weight 100
  Hardner HN–951 _____ do ____ 10

TECHNICAL PROPERTIES OF THIS CURED RESIN.—PHYSICAL PROPERTIES

| Property | Test Method | Values |
|---|---|---|
| Tensile Strength, p.s.i. | ASTM D638-49T | 8,000–9,000. |
| Compressive Strength, p.s.i. | ASTM D695-49T | 16,000–18,000. |
| Flexural Strength, p.s.i. | ASTM D790-49T | 14,000–15,000. |
| Impact Strength, Izod, ft.lbs./in. | ASTM D256-49T | 0.39. |
| Modulus of Elasticity, in tension, p.s.i. | ASTM D638-49T | $0.45 \times 10^6$. |
| Thermal Conductivity, (cal./sec./cm.$^2$/° C./cm.) | Cencofitch Lab. Method | $4.0 \times 10^{-4}$. |
| Thermal Coefficient of Expansion (linear/° C.) | ASTM D696-44 | $9.0 \times 10^{-5}$. |
| Thermal Shock | MIL Spec C16923A | Type B. |
| Rockwell Hardness | ASTM D785-48T | M81–M83. |
| Flammability (in./in.) | ASTM D635-44 | 0.34. |
| Shrinkage During cure (linear, percent) | CIBA | 2%. |
| Water Absorption (24 hr. immersion, percent) | ASTM D570-42 | 0.12–0.13. |
| Moisture Vapor Transmission (100° F. R.H. 95%) gms.ft.$^2$/ 24 hrs./in. thickness). | ASTM D697-42T | 0.01. |
| Resistance to weathering | | Excellent. |
| Specific Gravity (23° C./23° C.) | | 1.15–1.20. |

Modified Epoxy resins with Polysulfide liquid polymers (Thiokol) in spraying applications, as coatings or as fluidized flowable compositions are exampled by the following formulations:

| Formula | Spray T140-1 | | Spray T140-2 | | Spray T140-3 | | Spray T140-4 | |
|---|---|---|---|---|---|---|---|---|
| | Part A | Part B | Part A | Part B | Part A | Part B | Part A | Part B |
| Thiokol LP-3 [1] | 100 | | 100 | | 100 | | 100 | |
| Epons 828, 1007, 60/40 [2] | | 200 | | 200 | | | | 200 |
| Araldites 6020, 6075, 60/40 [3] | | | | | | 200 | | |
| Epons 828, 1001, 60/40 [2] | | | | | | | 50 | |
| Titanium Dioxide, Rutile | | 18 | | 18 | | 18 | | 18 |
| Beetle 216-8 [4] | 20 | | 20 | | 20 | | 20 | |
| DMP-30 [5] | 33 | 88 | 18 | 58 | 31 | 48 | 10 | 100 |
| Methyl Ethyl Ketone | 1/2 | 1/2 | 1/2 | 1/2 | 1/1.75 | 1/1.75 | 1/1.75 | 1/1.75 |
| Part A/Part B Ratio | | | | 72 | | 79 | | 77 |
| Solids Content for spraying, percent | | | | 80 | | | | |
| Pot life, hours | | 1.5 | | 2 | | 2 | | 1 |

[1] Thiokol LP-3, polysulfide liquid polymer manufactured by Thiokol Chemical Corp.
[2] Epons 828, 1001, 1007, are epoxy resins manufactured by Shell Chemical Co.
[3] Araldites 6020, 6075 are epoxy resins manufactured by Ciba Company, Inc.
[4] Urea formaldehyde solution of 60% solids used to decrease surface tension and aid leveling properties.
[5] 2,4,6-tri(dimethylaminomethyl) phenol. Manufactured by Rohm & Haas Company.

As Room Temperature cured films approximately 5 mils thick the:

| Set time, minutes | 30–40 | 60–70 | 95–110 | 30–40 |
|---|---|---|---|---|
| Tack time, free, hrs | 1 | 2.5 | 3 | 1 |
| Cure time to handle, hrs | 2–3 | 4 | 5 | 2–3 |
| Optimum cure, days | 3 | 3 | 3 | 3 |

A modified Epoxy-polysulfide resin composition resistant to severe corrosion conditions from bulk chemicals, e.g., gypsum, muriate of potash, sodium sulfate, borax, boric acid, etc., is made as follows:

| | Part A | Part B |
|---|---|---|
| Thiokol LP-3 | 100 | |
| Epons 828, 1007, 60/40 | | 150 |
| Ti Pure R610 | 100 | |
| Micronex Std | 5 | |
| Beetle 216-8 | | 20 |
| MEK | 45 | 95 |
| DMP-30 | 15 | |
| Pot life—3 to 3½ hours | | |
| Flexibility, percent Elongation, Conical Mandrel | 38 plus | |
| Impact Resistance, Gardner Variable, in.-lbs | 48 plus | |
| Resistance to Cycling: 4 hours, 40° F.; 4 hours, 210° F.; after 48 cycles | excellent | |
| Adhesion good | good | |

A modified Epoxy-polysulfide resin composition resistant to sea-water corrosion, and also resiliently resistant to caviation and erosion is made as follows:

| | Part A | Part B |
|---|---|---|
| Thiokol LP-3 | 100 | |
| Epons 828, 1007, 60/40 | | 200 |
| Beetle 216-8 | | 18 |
| DMP-30 | 20 | |
| Methyl Ethyl Ketone | 33 | 88 |
| Part A/Part B | ½ | ½ |
| Solids, percent by weight | 72 | 72 |
| Pot life about 1.5 to 2 hours. | | |

A modified Epoxy-polysulfide resin compound suitable for troweling:

| | Part A | Part B |
|---|---|---|
| Thiokol LP-3 | 100 | |
| Epon 828 | | 125 |
| Zinc Sulfide (ZS-800) | 52.8 | |
| Bentone 34 | 34.7 | 32.9 |
| DMP-30 | 12.5 | |
| Part A/Part B Ratio | 100/79 | 100/79 |

A modified Epoxy-polysulfide resin composition resistant to sea-water:

| | Part A | Part B |
|---|---|---|
| Thiokol LP-3 | 100 | |
| Epons 828, 1007, 60/40 | | 200 |
| Zinc Sulfide (ZS-800) | 150 | |
| Beetle 216-8 | | 24 |
| DMP-30 | 20 | |
| Methyl Ethyl Ketone | 40 | 86 |
| Part A/Part B Ratio | 100/100 | 100/100 |
| Solids, percent by weight | 78 | 78 |

Thiokol LP-205 may be used to give ultimate low temperature properties the polysulfide liquid being converted from a polymer through reaction with the mercaptan terminals.

Obviously many different formulations are available to one skilled in the art of resin compounding, the several formulations hereinabove given only serving to example and suggest useful formulations as known in the art. The feature of being able to provide two part systems, e.g., Epoxy-polysulfide resin compositions, in the present invention are found to be most advantageous. Separate packaging of the epoxy and the polysulfide parts A and B and separate packaging of fibrous reinforcement, fillers, extenders, pigments, and any other used ingredient, or compatible combinations of any of them, in a transportable, predesigned, packaged laminated or otherwise compounded construction, provides a reinforcement package for direct reinforcement as conventionally designed or as prestressed designed. The responsibility for correct chemical proportions can be most adequately kept in the hands of skilled personnel so that uniformity of final product is obtained by mass production methods at the low cost such mass products require for wide distribution. Film packaging is economical and proven and wide spread use already obtained so that the specifics of the products of the instant invention may be provided in the compositions and combinations of resins, rubbers and elastomeric substances and fibrous reinforcements or metal reinforcements in a specific use embodiment in packaged assembly ready-for-use.

Polyester resins useful as impregnating resins are exampled as follows:

| | |
|---|---|
| Atlac 382 (powder; for preimpregnating) | Atlas Powder Co. |
| Atlac 370–32Z (low-solubility powder binder) | Atlas Powder Co. |
| Atlac LV—emulsion binder | Atlas Powder Co. |
| IC–524—emulsion binder | Interchemical Corp. |
| IC–553–nonvolatile emulsion binder | Interchemical Corp. |
| Laminac 4128—emulsion binder | American Cyanamid Co. |
| Laminac 4171—powder for preimpregnating | American Cyanamid Co. |
| Plaskon 920—DAP resin-emulsion binder | Allied Chem. & Dye Corp. |
| Paraplex Binder P–800-emulsion binder | Rohm & Haas Co. |
| Selectron 5930-preform binder | Pittsburgh Plate Glass Co. |
| Vibrin X–1055—for preimpregnating | Naugatuck Chemical, Div. of U.S. Rubber Co. |

The Examples I through VIII are not limited to the resin or plastic compositions hereinabove given. The various formulations following these examples may be substituted in specific designs, or modifications or combinations of any of them adapted to a specific constructions project. The important thing is to consider the resins, rubbers and elastomers as structural engineering materials and apply the art of chemical engineering, in its many ramifications, to the civil and structural enginering uses of the present materials of invention.

Resin solutions comprised of epoxy resin in xylol are exampled below. This type of resin solution may be used in combination with other modifying resins to produce interior and exterior finishes having excellent chemical and physical resistance properties. This solution may be blended with other epoxy resin solutions to obtain desired viscosities and solid contents.

Properties of a typical Epoxy-Xylol solution: Araldite 6040–540X–90%:

Color (Gardner) _____ 5
Specific gravity 25° C. (77°)_____ 1.14
Pounds per gallon 77° C. _____ 9.5
Viscosity (Gardner-Holdt) _____ $Z_4$
Solids content _____percent__ 90
Resin epoxy—Araldite 6040
Solvent composition—100% xylol.
Storage life—at least one year.
Storage conditions—tightly closed containers in a dry place.
Shipping containers—metal.

Properties of a typical Epoxy-Toluol and Cellosolve acetate: Araldite 6097–597 CT–55%:

Color (Gardner) _____ 4
Specific gravity 25° C. (77° F.)_____ 1.04
Pounds per gallon 25° C. (77° F.) _____ 8.7
Viscosity (Gardner-Holdt) _____ $Z_2$
Solids content _____percent__ 55
Resin epoxy—Araldite 6097.
Solvent composition—50% toluol, 50% Cellosolve acetate.
Storage life—at least one year.
Storage conditions—tightly closed containers in a dry place.
Shipping containers—metal.

Resin and rubber compositions useful in the invention are exampled by phenol formaldehyde resin used as a Butyl rubber vulcanizing agent. Patent No. 2,701,895 assigned to the United States Rubber Co., discloses curing Butyl rubber by means of dimethylol phenol type of curing system. Heat reactive dimethylol phenol resins as vulcanizing agents for Butyl rubber include the following:

| | |
|---|---|
| Ambersol ST–137 | Rohm and Haas Company. |
| CKR–1282 | Bakelite Company. |
| CKR–1634 | Bakelite Company. |
| CKR–5360 | Bakelite Company. |
| Resin 9273 | Catalin Corporation of America. |
| SP–1045 | Schenectady Varnish Company. |
| Super Beckacite 1001 | Reichhold Chemicals, Inc. |
| Super Beckacite 1003 | Reichhold Chemicals, Inc. |
| AO–14 | German Resin (Cumylphenol dimethylol). |

A base formula as known in the art is as follows:

| | 1 | 2 |
|---|---|---|
| Butyl 325 | 100 | 100 |
| HAF Black | 50 | 50 |
| Stearic Acid | 1 | 1 |
| Hypalon S–20 (Dupont) | 10 | --- |
| Zinc Oxide | 5 | --- |
| Stannous Chloride (Disp.) 75% dispersion (in Circo Oil—Ware Chem. Co.) | --- | 4 |
| | 166 | 155 |

Dimethylol phenol resins prepared with elastomeric catalyst formulation:

Base Formula #1 _____ 166.00
Dimethylol phenol resins _____ 12.00
Base Formula #2 _____ 155.00
Dimethylol phenol resins _____ 7.50

All of the above dimethylol phenol resins impart substantial heat resistance as a characteristic of the system. With the elastomeric catalyst, these resins exhibited a wide variance of activity as indicated by the compression set values, and the physical properties obtained. However, this variation in cure activity had very little effect on heat resistance. With stannous chloride as the catalyst, differences in activity between resins appeared much less evident, although compression set data indicate differences still exist. These values generally correlate with those obtained with Hypalon (Dupont), although the variation span is very narrow in comparison. The Mooney scorch test suggests equal activity, since reduced resin concentration has little effect in controlling Mooney scorch test values. At this point in the development of the art results indicate generally that Ambersol ST–137, Schenectady SP–1045, and Catalin Resin 9273 are quite similar in the effects produced in a vulcanized Butyl rubber compound. The choice of resin depends upon the type of catalyst used in the ultimate properties desired in the finished construction.

As example, but not limited thereto, properties such as tensile strength, p.s.i., 2175; 200% modulus, p.s.i., 1075; percent elongation 350; Hardness, Shore A, 67; and after heat aging for one week in circulating air oven at 300° F., tensile strength, p.s.i., 1325; percent elongation, 90; Hardness, Shore A, 80. In the present invention as hereinbefore disclosed such elastomeric-resin compositions find substantial use.

One of the important elements is the shrinkage factor of each resin or combination of resins or discrete components used in the formulations containing resins since the forces developed by the shrinkage are put to work to prestress the constructions. Another important element is the adhesive and bonding strengths developed by the resins and other discrete components. The penetrating and permeating characteristics from manually, mechanically or capillarily induced forces are factors in the structural design of constructions. The relationship to temperature and changes thereof and particularly ambient temperature will partly determine selection of resins used for specific constructions.

The envelopes as disclosed in my invention are subject to stress analysis and each use dictates selection based on cost, availability of components, and strength characteristics of the components of the envelopes. The envelope may be made of many materials as disclosed herein.

The fibers selected are subject to stress analysis and each use dictates selection based on cost, availability and strength characteristics. Fiber glass, at present, is preferred as the highest strength economical material (300,000 to 1,000,000 p.s.i. ultimate in tension) with respect to tension loading. Fiber glass has other definite advantages and characteristics inherent to its nature.

Concrete is a variable material depended upon almost universally. There are many aggregate sources by which the engineer can design and construct good concrete qualities. Other materials possessing qualities like concrete or from which concrete or porous structural material can be made are commercially available in areas all over the world.

The examples and alternatives given should not be regarded as exhaustive or limiting of the invention but, on the contrary, are given for the purpose of instructing others in the best manner of using and applying the invention and so far as to explain and illustrate the principles whereof that others will be enabled to use the invention in many modifications and various embodiments, each as may be best adapted to the requirements of a particular use.

The foregoing description of this invention is for the purpose of illustration only and there is no intention of limiting the scope of the invention which is set forth in the claims, wherein I claim:

1. A building construction unit for securement to a concrete surface at the site of use comprising; a thin metallic envelope, one face of said envelope being readily detachable from the body thereof to expose a facing layer of surfacing material comprising a fiber glass surfacing mat embedded in a mass of polymerizable transparent polymeric resin composition covering an extra perforated thin sheet of metallic foil disposed over a layer of fiberous reinforcement embedded in a mass of polymerizable polymeric resin composition capable of passing a portion of the plastic resin through the performations after removal of said detachable face and upon application of pressure to the envelope said facing layer of surfacing material and said layer of fibrous reinforcement embedded in said mass of polymerizable polymeric resin composition being adapted to being bonded together by means of said resin compositions after said application of pressure and on being polymerized and cured to a set state at the time of use.

2. A packaged ready-for-use polymerizable polymeric resin composition fiber reinforced reinforcement and supporting member provided for use as decorative structural surface construction layer and an internal reinforcement cooperatively co-acting together as a reinforcing means providing a decorative exterior surface face for a precast prestressed concrete structure comprising a package made of packaging material comprising laminated reinforced kraft paper sheet and heat sealable polyethylene resin film adhered to said sheet and having fiber glass strands disposed in said polyethylene resin as said reinforcement to said packaging material, said polymerizable polymeric resin composition fiber reinforced reinforcement and supporting member comprising a plurality of continuous wound fiber glass strands oriented longitudinally of said reinforcement and having an additional plurality of strands of fiber glass fibers disposed angularly in opposing arrangement diagonally across said layer of longitudinally oriented fiber glass strands, said reinforcement strands being protected by, covered with and embedded in a mass of polymerizable polymeric resin composition comprising an unsaturated polyester resin composition having fire resistant and self-extinguishing capabilities, a heat resisting filler therefor comprising a hard mineral filler having a hardness in the range of 4.0 to 8.0 on Moh's scale of hardness, said unsaturated polyester resin composition having a catalyst therefore stable at ambient temperatures and activated by means above ambient tempreatures comprising a benzoyl peroxide containing catalyst and having an inhibitor activated at elevated temperatures, said combination of materials providing said decorative-structural surface construction layer, said surface construction layer having connected to its midpoint at least one reinforcement cable-form comprising a plurality of fiber glass unidirectional fiber stranded into a wound endless cable-form having end-eye-like loops at its ends, said cable-form being encased in a thin polyethylene resin film packaging material and having said fibers of said cable-form embedded in an unsaturated polyester resin composition having a catalyst to be activated at an elevated temperature and having a discrete shrinkage when activated, said packaged combination reinforcement being adapted to being integrated, bonded and combined with at least one porous structural component to form said precast prestressed concrete structure, said fibers and said resin composition being reinforcement provided for the induction and retention of induced prestressed preloads in said composite precast prestressed concrete structure and a portion of said reinforcing materials providing a decorative-structural surface construction layer, said features being provided when said packaged ready-for-use polymeric resin composition fiber reinforcement and supporting member is combined with said concrete of said porous structural component of said percast prestresed concrete structure, said composite reinforcement provided in said package in ready-for-use state.

3. A construction unit composite member providing means for joinery and prestressing concrete structures provided in a packaged-ready-for-use-member in a light-proof fluid-sealed protective covering envelope as a composite load-bearing and joinery layer means to be located when used by being placed between at least two precast concrete members and having components thereof providing tensile, shear and torsion reinforcement to said precast concrete members and additionally providing means to internally stress prestressed preloads in adjacent faces of said precast concrete members and providing means to capture said prestressed preloads in said precast concrete members joined together by said composite member, which comprises a centrally disposed layer of load-bearing polymerizible polymeric resin composition material embedded fibrous reinforcement having included tensile reinforcing means oriented longitudinally of the member, said polymerizable polymeric resin composition material comprising a rubber-like extensible and contractible polymerizable polymeric resin composition in its set state having not less than substantially at least the same extensible and contractible characteristics as said oriented longitudinally disposed fibrous reinforcement, said centrally disposed layer being encased in a fiber reinforced high strength bonding flexibly-modified-rigid polymerizable polymeric resin composition capable of penetrating, permeating, and adhering to said adjacent surfaces of said precast concrete members in use and to set with substantial shrinkage to said tensile reinforcing member, said composite layer providing joinery and reinforcing and prestressing for said precast concrete members, said composite member provided in means packaging said materials in ready-for-use-state, said means of packaging comprising enclosing said composite layer in a sealed packaging means comprising a laminated sheet of kraft paper having a metallic foil sheet laminated thereto and having a sealable resin film covering at least the sealing edges of that portion of said metallic foil used to seal said packaging materials to a light-proof and fluid-sealed protective envelope covering said materials in prepared-for-use-state in a unitary readily transportable package.

4. A construction unit composite member as in claim 3, in which said fibrous tensile reinforcement comprises a plurality of single fiber glass unidirectional strands wound in continuous fashion providing an endless belt-form reinforcing layer having said plurality of single unidirectional strands of fiber glass embedded and layed in a mass of thermosetting polymerizable resin protecting said strands from chafing and damage from deleterious substances and said strands layed in a parallel arrangement providing said plurality of strands in discrete length, and portions of said plurality of continuous strands being formed into unitary eye-like-loops at their opposite ends adapted to provide anchorage means and bearing members, said fiber glass of said loops and shanks therefor for a discrete length of said reinforcement being impregnated and covered with high strength polymeric resin set and cured to a rigid bearing component of said reinforcement at its ends adapted to hold said reinforcement in fixed position for induction of internally stressed prestressed preloads provided by thermal means and chemical means cooperatively co-acting when said polyerizable polymeric resin composition is polymerized, set and cured at time and place of use.

5. A construction unit composite member as in claim 4, in which said fibrous tensile reinforcement comprises a plurality of fiber glass strands encased in an outer layer of polyethylene terephthalate fibers and wound in continuous fashion providing an endless cable-form reinforcement means in ready-for-use-state.

6. A construction unit composite member as in claim 5 in which said rubber-like extensible and contractible polymerizable polymeric resin composition comprising said reinforcing resin means, comprises an epoxy resin composition having a curing agent therefor providing said rubber-like properties.

7. A construction unit composite member as in claim 3, in which said layer encasing said central layer reinforcement means comprises a high strength flexibly-modified-rigid-polymerizable-unsaturated-polyester resin composition having a filler therefor and a catalyst therefor stable at ambient temperatures and activated by heat comprising a benzoyl peroxide catalyst having an inhibitor retarding polymerization reaction at ambient temperatures and activated by heat, said encasing layer including at least one multi-directionally oriented fibered fiber glass mat.

8. A construction unit composite member as in claim 3, in which said centrally disposed layer of load bearing polymerizable polymeric resin composition material is encased and packaged in a thermoplastic elastomeric resinous film adapted to melt and combine with said load-bearing polymerizable polymeric resin composition at time of use.

9. A construction unit composite member as in claim 3, in which said metallic foil of said package is fitted with means for connecting to a source of electrical energy which when actuated utilizes said foil as a resistance heating means providing heat for actuating the polymerization reaction of said polymeric resin compositions when used at site of use.

10. A construction unit composite member as in claim 4, in which said unitary eye-like-loops are fitted with substantial strength steel bearings comprising hollow steel cylinders, said eye-like-loops and shanks therefor embedded in epoxy resin composition and laminated to said hollow steel cylinders in set and cured ready-for-use state by said epoxy resin composition.

11. A construction unit comprising a tubular construction comprising at least two closed boundary units with one being placed inside of the other and having discrete distance between the walls of said units, the space between said walls being filled with a material comprising a mixture of expandable polymerizable polymeric resin composition having a filler therefor, said filler comprising light-weight expanded-fired aggregate particles of mineral material, said expandable polymerizable polymeric resin composition having fire resistant capabilities, and being packaged in flexible packaging means in which is also packaged polyurethane forming polyester resin, and in separate compartments isocyanate forming resin composition comprising diisocyante cross-linking and blowing agent and means providing discrete amounts of water, all said means when opened by means inside of said outer package wall, causing said resin composition materials and filler therefor to polymerize and cure, but being retained by said inner package walls, said opening means comprising an external pressure inflating the inner closed boundary unit causing its wall to provide crushing means opening said expandable composition and actuating the polymerization of the resin substances and bind the light-weight expanded-fired aggregate into a concrete-like light-weight core, said internal pressure means being provided by means external to said package but connected to it for the period of providing said internal pressure.

12. A construction unit comprising a tubular construction comprising at least two closed boundary units with one being placed inside of the other and having discrete distance between the walls of said units, the space between said walls being filled with a material comprising a mixture of expandable polymerizable polymeric resin composition having a filler therefor comprising light-weight expanded-fired aggregate particles of mineral material, said expandable polymerizable polymeric resin composition having fire resistant capabilities and being packaged in flexible packaging means in which means is also packaged polyurethane forming polyester resin and in separate compartments isocyanate forming resin composition comprising diisocyanate cross-linking and blowing agent and means providing discrete amounts of water, all said means when opened by means inside of said outer package wall causing said resin composition materials and filler therefor to polymerize and cure, but being retained by said inner package walls, said opening means comprising an internal pressure inflating the inner close boundary unit causing its wall to provide crushing means opening said expandable composition and actuating the polymerization of the resin substances and bind the light-weight expanded-fixed aggregate into a concrete-like light-weight core, said internal pressure means being provided by means external to said package but connected to it for the period of providing said internal pressure, said light-weight expanded-fired aggregate particles of mineral material including impact resisting fire-expanded-clay particles, and said unit being fitted with an articulative bearing member adapted to anchorage to the earth and providing very substantial resistance dissipating dynamically imposed forces.

13. A construction unit comprising a packaged-ready-for-use composite construction comprising a surface construction layer and at least one tensile reinforcing member which includes a polymerizable polymeric resin composition material adapted to adhere to a concrete structure and to set with substantial shrinkage, said tensile reinforcing member comprising a cable-form-reinforcement comprised of a plurality of evenly wound unidirectional fiber glass strands embedded in a portion of said polymerizable polymeric resin composition and which strands are provided in a plurality of windings of substantially equal length and having means at each end of said cable-form-reinforcement for anchorage in restraint in a porous structural member comprising a portion of said concrete structure, said cable-form-reinforcement adapted to provide internally stressed prestressed preload by said substantial shrinkage provided by said polymeric resin, said anchorage means comprising an end-loop-and-shank-therefor which anchorage means comprises a portion of said strands embedded in a set polymeric resin composition forming said anchorage-end-loop means, and said surface layer construction provided in a cured and finished state having means for bonding and integration to and with said cable-form-reinforcement, said surface layer construction comprising a decorative-structural layer of bonded fiber glass surfacing mat embedded in a substantially clear and transparent set polymeric resin layer having attached at and to its inner surface a bonding layer of compatible polymerizable polymeric resin composition impregnated fiber glass mat, said polymerizable polymeric resin composition having a catalyst stable at ambient temperatures and capable of being activated by an elevated temperature to a state of cure without affecting the surface layer construction properties other than increasing its state of cure, and means to package said materials of said surface layer construction and said tensile reinforcing member in prepared-for-use state in a unitary readily transportable package, said package comprising a light-proof impervious packaging means as exampled by a composite sheet of kraft-paper-laminated-polyethylene-resin-aluminum-foil having resistance heating means for providing heat for activation of polymerization and cure of said polymerizable polymeric resin composition at site of use.

14. A construction unit adapted for prestressing concrete structure which comprises a polymerizable plastic resin composition material encased fiber reinforced reinforcement adapted to adhere to a concrete structure and to set, with substantial shrinkage, a tensile reinforcing member comprising a cable-form-reinforcement, said cable-form-reinforcement being comprised of a plurality of evenly wound unidirectional fiber glass strands provided in a plurality of windings of equal length and having anchorage means at each end of said cable-form-reinforcement for anchorage in restraint in a porous structural member comprising a portion of said concrete structure, said polymerizable plastic resin composition encasing said plastic fiber reinforcements being stable in its polymerizable state when under the cover of packaging means but becomes polymerized and cured at the site of use on removal of said packaging means and on exposure of said polymerizable plastic resin composition to sun-light, said anchorage means being an end-loop-and-shank therefor comprising a portion of said strands embedded in a set polymeric resin composition and forming said anchorage-end-loop-means, said cable-form-reinforcement adapted to provide internally stressed prestressed preload by said substantial shrinkage of said polymerizable plastic resin composition material in its polymerization and cure on the removal of said packaging means and exposure on sun-light, said packaging means comprising a light-to sun-light, said packaging means comprising a light-proof-impervious packaging means as exampled by a composite sheet of kraft-paper-laminated-polyethylene-resin-aluminum-foil covering said construction unit in prepared-for-use-state in a unitary readily transportable package.

15. A construction unit adapted for prestressing concrete structure which comprises a polymerizable plastic resin composition material encased fiber reinforced reinforcement adapted to adhere to a concrete structure and to set, with shrinkage to a tensile reinforcing member comprising a belt-form reinforcement, said belt-form reinforcement being comprised of a plurality of windings of equal length of unidirectional fibers and having anchorage means at each end of said belt-form reinforcement for anchorage in restraint in a porous structural member comprising a portion of said concrete structure, said plastic resin composition material encased fiber reinforced reinforcement being provided with a bonding resin composition having a filler therefor and comprising a polymerizable polymeric resin composition catalyzed at the site of use by means, said means comprising a drum of discrete capacity partially filled with said polyerizable polymeric resin composition, said filler therefor provided in a resin film bag in measured amount, and a catalyst adapted to activate at ambient temperature provided in a resin film bag in measured amount, said drum being provided with means for opening said filler and said catalyst bags, said means comprising blade-like means which upon punching into said bags, opens said bags and co-mingles the said filler and said catalyst into and with said polymerizable polymeric resin composition making it ready for use, said belt-form reinforcement having said anchorage means being an end-loop-and shank-therefor comprising a portion of said fibers embedded in a set polymeric resin composition and forming said anchorage means in ready-for-use-state, said belt-form reinforcement provided in a packaging means exampled by a composite sheet of kraft-paper-laminated-polyethylene-resin-aluminum-foil covering said construction unit in a readily transportable package.

16. A building construction unit comprising a packaged-ready-for-use plastic resin encased fiber reinforced reinforcement capable of being integrated into a laminated body and prestressed at the site of use; comprising a plurality of strands permeated and covered with a polymerizable plastic resin in its un-polymerized state adapted to be polymerized, said plastic resin including components thereof providing bacteriostatic and fungistatic "germ-fighting" characteristics, means disposed along and among the strands and the said plastic resin to catalyze the plastic resin and to polymerize the plastic resin to a cured state; said means disposed along and among the said strands and said plastic resin comprising a polymerization catalyst activated by means provided by an external source of heat and which polymerizes the said plastic resin to a cured state at the site of use; said external source of heat comprising a component of a packaging means comprising a resistance wiring circuit adapted to being connected to a source of electrical energy, said wiring circuit being embedded in a plastic resin composition non-bonding packaging film sheet and means to package said materials in prepared-for-use-state, said packaging means comprising said non-bonding packaging film sheet laminated to a light-proof-impervious sheet and bonded to a covering layer of kraft-paper in a unitary package readily transportable for use.

17. A construction unit adapted for prestressing concrete structures which comprises polymerizable plastic resin composition material adapted to adhere to a concrete structure and to set with substantial shrinkage to a tensile member for prestressing said concrete structure, said tensile reinforcing member comprising a cable-form-reinforcement comprised of a plurality of evenly wound unidirectional fiber glass strands provided in a plurality of windings of equal length and having means at each end of said cable-form-reinforcement for anchorage in restraint in a porous structural member comprising a portion of a concrete structure, said cable-form-reinforcement adapted to provide internally stressed prestressed preload by said substantial shrinkage provided by said plastic resin, said anchorage means comprising an end-loop-and-shanktherefor which anchorage means comprises a portion of said strands embedded in a set polymeric resin composition forming said anchorage-end-loop-means, said plurality of strands includes as the layer exposed as the outside finished surface in the completed construction unit in its final use state a layer of bonded fiber reinforcement adapted to provide said finished surface, said fiber reinforcement comprising a mat of acrylic fiber exposed at the surface by means, one such means being providing the said surface of bonded acrylic fiber mat sanded to expose said fiber, which fiber at time of final use is provided with a wipe-seal comprising 75% ethylene carbonate and 25% propylene carbonate provided wiped over the exposed fibers and surface and providing a smooth, satin-like surface finish, and means to package said materials in prepared-for-use state in a unitary readily transportable package, said package comprising a light-proof-impervious packaging means as exampled by a composite sheet of kraft-paper-laminated-polyethylene-resin-aluminum-foil enclosing said materials in ready-for-use state.

18. A construction unit in prepared ready-for-use state which comprises a polymerizable plastic resin composition material adapted to adhere to a concrete structure and to set with substantial shrinkage to a tensile member for prestressing said concrete structure, and in which said plastic resin composition includes polymerizable polymeric resin, filler therefor, viscosity control agent and catalyst, said composition being in ready-for-polymerization-state, and being packaged in an envelope that is waterproof, of soft yet strong material capable of being deformed but not broken when embedded in poured concrete, said tensile reinforcing member comprising a cable-form-reinforcement comprised of a plurality of evenly wound unidirectional fiber glass strands provided in a plurality of windings of equal length having means at each end of said cable-form-reinforcement for anchorage in restraint in a porous structural member comprising a portion of said concrete structure, said strands of the reinforcement being protected against abrasion by the said envelope and said resin composition, and having means for catalyzing the said polymerizable polymeric resin composition, said means comprising a heat activated catalyst, said cable-form-reinforcement adapted to provide internally stressed prestressed preload by said substantial shrinkage provided by said resin, said anchorage means comprising an end-loop-and-shank-therefor which anchorage means comprises a portion of said strands embedded in a set polymeric resin composition forming said anchorage-end-loop-means, and means to package said materials in prepared-for-use-state in a unitary readily transportable package, said package comprising a light-proof-impervious packaging means as exampled by a composite sheet of kraft-paper-laminated-polyethylene-resin-aluminum-foil, said heat for activating said catalyst provided by means comprising said aluminum-foil of said packaging means materials having means for connecting to a source of electrical energy and providing heat energy when activated, said reinforcement when said plastic resin comprising said polymerizable polymeric resin is polymerized and in its set and cured state comprises a construction of substantial strength whose bond with the concrete is achieved by the physical irregularities of the surface of the packaged reinforcement as deformations thereof provided by the poured concrete before its set state.

19. A construction unit in prepared-ready-for-use state which comprises a polymerizable plastic resin composition material adapted to adhere to a concrete structure and to set with substantial shrinkage to a tensile member for prestressing said concrete structure, and in which said plastic resin composition includes polymerizable polymeric resin, filler therefor, viscosity control agent and catalyst, said composition being in a ready-for-polymerization-state, and being packaged in an envelope that is waterproof, of soft yet strong material capable of being deformed but not broken when embedded in poured concrete, said tensile reinforcing member comprising a plurality of evenly wound unidirectional fiber glass strands provided in a plurality of windings of equal length having means at each end for anchorage in restraint in a porous structural member comprising a portion of said concrete structure, said strands of fiber glass being protected against abrasion by said envelope and said resin composition, and having means for catalyzing the said polymerizable polymeric resin composition, said means comprising a heat activated catalyst, said strands of fiber glass adapted to provide internally stressed prestressed preload by said substantial shrinkage provided by said resin, said anchorage means comprising an end-loop-and-shank-therefor which anchorage means comprises a portion of said strands embedded in a set polymeric resin composition forming said anchorage-end-loop-means, and means to package said materials in prepared-for-use-state in a unitary readily transportable package, said package comprising a light-proof-impervious packaging means including a resin film which is waterproof and upon activation of the polymerization of said polymeric resin composition melts into a fluid and enters into the concrete in its set and cured state, said heat for activating said catalyst provided by means comprising resistance heating means of said package adapted to provide said heat and polymerize and cure said resin composition, said reinforcement when said plastic resin comprising said polymerizable polymeric resin is polymerized and in its set state and cured comprises a construction of substantial strength whose bond with the concrete is achieved by the physical irregularities and penetration and permeation of the concrete by said melted resin composition in the said concrete in its set and cured state.

20. A packaged ready-for-use parachute-controllable-plastic-resin-fiber-glass-reinforced-protective-construction-unit adapted for inflation in transit to a predetermined shape and capable of being released from a carrying vehicle operating above the surface of the earth and controllable in rate of descent by said parachute means, comprising a portion of the said construction, said shape comprising an egg shaped upper section having means of entry and exit and connected integrally to a pontoon shaped skirt adapted for flotation on water and resistant to impact on any surface, said construction unit comprising at least two closed boundary units with one being placed inside of the other and having discrete distance between the walls of said units, the space between said walls being filled with a material comprising a mixture of expandable polymerizable polymeric resin composition having a filler therefor, said filler comprising light-weight expanded fired aggregate particles of mineral material, said expandable polymerizable polymeric resin composition having heat resistant capabilities, and being adapted to resistance to dynamic loading, said composition being packaged in flexible packaging means in which also is packaged polyurethane forming polyester resin and in separate compartments, isocyanate forming resin composition comprising diisocyanate cross-linking and blowing agent and means providing discrete amount of water, all said means when opened by means inside of said outer wall of said construction causing said resin composition materials and filler therefor to polymerize and cure to an expanded shape defined and retained by said inner wall of said construction, said inflated construction having substantial resistance to dynamic loading and impact-impulse loading in its set and cured state and being protective of any contents carried inside of said construction.

References Cited in the file of this patent

UNITED STATES PATENTS

| | | |
|---|---|---|
| 2,075,633 | Anderegg | Mar. 30, 1937 |
| 2,155,121 | Finsterwalder | Apr. 18, 1939 |
| 2,241,312 | Lutz | May 6, 1941 |
| 2,412,243 | Neff | Dec. 24, 1946 |

(Other references on following page)

UNITED STATES PATENTS

| | | |
|---|---|---|
| 2,413,990 | Muntz | Jan. 7, 1947 |
| 2,414,011 | Billner | Jan. 7, 1947 |
| 2,425,883 | Jackson | Aug. 19, 1947 |
| 2,470,009 | Wilhelm | May 10, 1949 |
| 2,474,660 | Fitzpatrick | June 28, 1949 |
| 2,512,996 | Bixler | June 27, 1950 |
| 2,605,680 | Yeoman | Aug. 5, 1952 |
| 2,639,252 | Simon et al. | May 19, 1953 |
| 2,639,808 | Barry et al. | May 26, 1953 |
| 2,644,198 | Crawford | July 7, 1953 |
| 2,671,158 | Rubenstein | Mar. 2, 1954 |
| 2,705,223 | Renfrew et al. | Mar. 29, 1955 |
| 2,738,060 | Battista et al. | Mar. 13, 1956 |
| 2,751,775 | Sergovic | June 26, 1956 |
| 2,752,275 | Raskin et al. | June 26, 1956 |
| 2,760,630 | Lakso | Aug. 28, 1956 |
| 2,816,323 | Munger | Dec. 17, 1957 |
| 2,850,890 | Rubenstein | Sept. 9, 1958 |
| 2,864,492 | Lappala | Dec. 16, 1958 |
| 2,902,396 | Reynolds | Sept. 1, 1959 |
| 2,921,463 | Goldfein | Jan. 19, 1960 |